(12) United States Patent
Takahashi et al.

(10) Patent No.: US 6,256,417 B1
(45) Date of Patent: Jul. 3, 2001

(54) IMAGE CODING APPARATUS, IMAGE DECODING APPARATUS, IMAGE CODING METHOD, IMAGE DECODING METHOD, IMAGE CODING PROGRAM RECORDING MEDIA, IMAGE DECODING PROGRAM RECORDING MEDIA

(75) Inventors: Jun Takahashi, Katanoshi; Choong Seng Boon, Moriguchishi, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/497,218

(22) Filed: Feb. 3, 2000

Related U.S. Application Data

(62) Division of application No. 08/886,128, filed on Jun. 30, 1997, now abandoned.

(30) Foreign Application Priority Data

Jun. 28, 1996 (JP) .................................................... 8-169196
Oct. 29, 1996 (JP) .................................................... 8-286340

(51) Int. Cl.⁷ .................................................. G06K 9/36
(52) U.S. Cl. ............................................................ 382/232
(58) Field of Search .................................... 382/232, 233, 382/236, 238, 240, 242, 248, 250; 358/432, 433; 348/384, 394, 395, 400, 401–404, 407–416, 420, 421, 425, 430, 431, 699

(56) References Cited

U.S. PATENT DOCUMENTS

| | | | |
|---|---|---|---|
| 5,043,809 | * | 8/1991 | Shikakura et al. .................. 382/238 |
| 5,117,287 | * | 5/1992 | Koike et al ........................... 382/238 |
| 5,146,325 | * | 9/1992 | Ng ......................................... 382/238 |
| 5,317,397 | * | 5/1994 | Odaka et al. ......................... 382/238 |
| 5,333,012 | * | 7/1994 | Singhal et al. ....................... 382/238 |
| 5,371,549 | | 12/1994 | Park . |
| 5,717,465 | | 2/1998 | Kim . |
| 5,764,805 | * | 6/1998 | Martucci et al. .................... 382/238 |

FOREIGN PATENT DOCUMENTS 97-10786    5/1994   (KR) .
95-30680   11/1995   (KR) .

OTHER PUBLICATIONS

Library of Congress Cataloging–in–Publication Data, Netravali, Arun N., "Digital Pictures : Representation, Compression, and Standards", pp. 625–626.

IEEE Transactions on Circuits and Systems for Video Technology, vol. 5, No. 1, Feb. 1995, "Shape–Adaptive DCT for Generic Coding of Video", Thomas Sikora et al., pp. 59–62.

* cited by examiner

Primary Examiner—Jose L. Couso
(74) Attorney, Agent, or Firm—Parkhurst & Wendel, L.L.P.

(57) ABSTRACT

An image coding apparatus for coding an input signal including an image signal of an array of pixels having pixel values and a significant signal showing whether the image signal is significant is characterized by a prediction image generating device for specifying, as a target area, and area of the input image signal to be the target of coding, on the basis of the input significant signal, and generating a prediction image for the target area, using locally reproduced image. In accordance with the invention, the influence of the pixel values of the insignificant pixels on the coding process is reduced, whereby the coding efficiency is improved.

77 Claims, 35 Drawing Sheets

$A=(X+Y+Z+t+u+v)/6$ $A3=A+(X-A+1)/2$
$A2=A+(Y-A+1)/2$
$A1=A+(Z-A+1)/2$

IMAGE CODING APPARATUS, IMAGE DECODING APPARATUS, IMAGE CODING METHOD, IMAGE DECODING METHOD, IMAGE CODING PROGRAM RECORDING MEDIA, IMAGE DECODING PROGRAM RECORDING MEDIA

This application is a Rule 1.53(b) Division of U.S. patent application Ser. No. 08/886,128 filed Jun. 30, 1997 now abandoned.

FIELD OF THE INVENTION

The present invention relates to image coding apparatuses, image decoding apparatuses, image coding methods, image decoding methods, image coding program recording media, and image decoding program recording media. More particularly, the invention relates to coding of a color signal representing a color shape of an object and an image signal comprising transparency information and the like, which represents the ratio of each image when plural images are synthesized, for sufficient transmission and storage of these signals.

BACKGROUND OF THE INVENTION

Generally, image data produced by digitizing an image, especially a moving picture, has a great amount of data, so information compression is performed by coding when the data is transmitted or recorded. Such information compression is carried out on the basis of the partial or temporal correlation of the image data.

As an example of compression coding, there is "prediction coding" in which prediction is performed on the basis of an image close in time to an image being the target of coding (target image), a difference between the target image and the prediction image is obtained as differential data, and the differential data is coded. In the prediction, motion compensation is carried out using a motion vector obtained by motion detection of the image. Generally, the higher the correlation is, the higher the coding efficiency of the differential data is.

On the other hand, in order to transmit or store a moving picture with high efficiency, there is proposed a method in which moving picture data is divided into plural layers corresponding to individual objects included in the picture, and each layer is coded. For example, in the case of coding an image composed of a person and a background, initially, an image coding apparatus divides the image into two layers for the person and the background, respectively, encodes the respective layers, and transmits the coded data of the respective layers. On the other hand, in an image decoding apparatus, the transmitted coded data of the respective layers are decoded, and decoded images of the respective layers are synthesized using a prescribed method and displayed.

Further, in the above-mentioned synthesis process, information showing, pixel by pixel, whether the background object is hidden or not by the overlapping of the images, is required. This information is called "a significant signal", and pixels hiding the background are called "significant pixels". A large value of the significant signal means that the ratio of synthesis is large and the signal is important visually. To the contrary, a small value of the significant signal means that it is hardly used for synthesis, i.e., it is almost transparent.

As described above, a significant signal shows the shape of an image synthesized with a background, and only significant pixels influence on the quality of the synthesized image. In other words, insignificant pixels have no relation with the image quality, so that the efficiency in coding can be improved by coding only significant pixels.

Meanwhile, a method for orthogonally transforming only significant pixels, called "Shape Adaptive Orthogonal Transform (SADCT)", is disclosed in IEEE Transactions on Circuits and Systems for Video Technology vol.5, No.1, February 1995. In this method, only significant pixels are subjected to orthogonal transform.

On the other hand, as a method for generating a prediction image, "Overlap Motion Compensation" is disclosed in ITU-T Recommendation H.263, pp. 42–44, October 1995. In this method, an optimum prediction area is calculated by interpolating plural small areas within a prediction image.

However, since compression by coding is based on spatial or temporal correlation in an image, if insignificant pixels are coded as the target of coding together with significant pixels, the coding efficiency is reduced. For example, when all the significant pixels are black, if the insignificant pixels are black as well, the coding efficiency is not reduced. However, if the insignificant pixels are white, since the correlation is reduced, the coding efficiency is reduced. Generally, when insignificant pixels are included in an area surrounded by significant pixels, the inter-pixel correlation is reduced, whereby the coding efficiency is reduced.

Further, also in the above-mentioned SADCT, when, in a target image, insignificant pixels are included in an area surrounded by significant pixels, the correlations in the vertical and horizontal directions are reduced, whereby the coding efficiency is reduced.

As described above, although the pixel values of insignificant pixels do not have much influence on the quality of reproduced image, these pixel values adversely affect the coding efficiency. Therefore, when coding is performed, the pixel values of insignificant pixels must be considered. In the prior art methods, however, this matter has not bee considered at all.

SUMMARY OF THE INVENTION

An object of the present invention is to provide an image coding apparatus that can avoid a reduction in coding efficiency due to pixel values of insignificant pixels when an image signal is coded, thereby to improve the coding efficiency.

Another object of the present invention is to provide an image coding apparatus in which, when coding is performed receiving an image signal and a significant signal that shows whether pixels in the image signal are significant or not, the significant signal is effectively utilized to improve the coding efficiency.

A further object of the present invention is to provide an image decoding apparatus that can perform decoding adaptively to signals which have been effectively coded by the above-mentioned image coding apparatus.

Another object of the present invention is to provide an image coding method that can avoid a reduction in coding efficiency due to influence of pixel values of insignificant pixels, thereby to improve the coding efficiency.

Still another object of the present invention is to provide an image decoding method that can perform decoding adaptively to signals which have been effectively coded by the above-mentioned image coding method.

Yet another object of the present invention is to provide a recording medium in which an image coding program is recorded, which program can realize the above-mentioned image coding apparatus in a general apparatus, such as a personal computer or a work station.

A still further object of the present invention is to provide a recording medium in which an image decoding program is recorded, which program can realize the above-mentioned image decoding apparatus in a general apparatus, such as a personal computer or a work station.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a 1st aspect of the present invention, there is provided an image coding apparatus for coding an input signal comprising an image signal being an array of pixels having pixel values and, a significant signal showing whether the image signal is significant or not, and the apparatus comprises: prediction image generating means for specifying, as a target area, an area of the input image signal to be the target of coding, on the basis of the input significant signal, and generating a prediction image for the target area, using a locally reproduced image which is described later; subtraction means for dividing the prediction image into a plurality of small prediction areas, dividing the target area into a plurality of small target areas, subtracting each small prediction area from corresponding small target area, and outputting a differential signal; area dividing means for dividing a rectangle area including significant pixels from the differential signal output from the subtraction means using the significant signal, and outputting the rectangle area as a significant area; pixel generating means for generating a padding pixel value using a prescribed function on the basis of pixel values of the significant pixels in the significant area, replacing pixel values of insignificant pixels in the significant area with the padding pixel value, and outputting a padded signal; coding means for coding the padded signal and outputting a coded signal; decoding means for decoding the coded signal and outputting a decoded signal; addition means for adding the decoded signal and the prediction image to generate a locally reproduced image; and storage means for temporarily storing the locally reproduced image for use in the prediction image generating means. Therefore, efficiency in coding is improved.

According to a 2nd aspect of the present invention, in the image coding apparatus according to the 1st aspect, the area dividing means performs division so that the significant area is a rectangle area having horizontal pixel number and vertical pixel number, which are the n-th power of 2 ($2^n$), and including significant pixels included in the differential signal output from the subtraction means.

According to a 3rd aspect of the present invention, in the image coding apparatus according to the 1st aspect, the pixel generating means employs a function that provides the average of the pixels values of the significant pixels.

According to a 4th aspect of the present invention, there is provided an image coding apparatus for coding an input signal comprising an image signal being an array of pixels having pixel values, and a significant signal showing whether the image signal is significant or not, and the apparatus comprises; prediction image generating means for specifying, as a target area, an area of the input image signal to be the target of coding, on the basis of the input significant signal, and generating a prediction image for the target area, using a locally reproduced image which is described later; subtraction means for dividing the prediction image into a plurality of small prediction areas, dividing the target area into a plurality of small target areas, subtracting each small prediction area from corresponding small target area, and outputting a differential signal; first area dividing means for dividing a rectangle area including significant pixels from the differential signal in a first direction using the significant signal, and outputting the rectangle area as a first significant area; pixel generating means for generating a padding pixel value using a prescribed first function on the basis of pixel values of the significant pixels in the first significant area, replacing pixel values of insignificant pixels in the significant area with the padding pixel value, and outputting a padded signal; first coding means for coding the padded signal and outputting a first coded signal; second area dividing means for dividing an area from the first coded signal in a second direction different from the first direction, and outputting the area as a second significant area; padding component generating means for generating a padding coded component using a second function on the basis of coded components of the first coded signal when the coded components of the first coded signal do not exist in the second significant area, replacing coded components which are not the coded components of the first coded signal in the second significant area, with the padding coded component, and outputting a padded coded signal; second coding means for coding the padded coded signal and outputting a second coded signal; decoding means for decoding the second coded signal and outputting a decoded signal; addition means for adding the decoded signal and the prediction image to generate a locally reproduced image; and storage means for temporality storing the locally reproduced image for use in the prediction image generating means. Therefore, efficiency in coding is improved.

According to a 5th aspect of the present invention, in the image coding apparatus according to the 4th aspect, the first area dividing means and the second area dividing means perform division so that the significant area becomes a one-dimensional area including pixels of the n-th power of 2 ($2^n$) in number.

According to a 6th aspect of the present invention, in the image coding apparatus according to the 4th aspect, the pixel generating means employs a function that provides the average of the pixels values of the significant pixels.

According to a 7th aspect of the present invention, the image coding apparatus according to the 1st aspect further comprises division selecting means for selecting an area division method according to the size of the significant area in the signal being the target of division.

According to an 8th aspect of the present invention, the image coding apparatus according to the 4th aspect further comprises division selecting means for selecting an area division method according to the size of the significant area in the signal being the target of division.

According to a 9th aspect of the present invention, there is provided an image coding apparatus for coding an input signal comprising an image signal being an array of pixels having pixel values, and a significant signal showing whether the image signal is significant or not, and the apparatus comprises: prediction image generating means for specifying, as a target area, an area of the input image signal to be the target of coding, on the basis of the input significant signal, and generating a prediction image for the target area, using a locally reproduced image which is described later; subtraction means for dividing the prediction image into a plurality of small prediction areas, dividing the target area into a plurality of small target areas, subtracting each small prediction area from corresponding small target area, and outputting a differential signal; area dividing means for dividing a rectangle area including significant pixels from the differential signal using the significant signal, and outputting the rectangle area as a significant area; pixel generating means for performing first padding and second padding, the first padding comprising generating a first padding pixel value using a first function on the basis of pixel values of significant pixels in the significant area, replacing pixel values of insignificant pixels in the significant area with the first padding pixel value, and outputting a first padded signal, and the second padding comprising generating a second padding pixel value using a second function, and using, as boundary pixels, the replaced pixels abutting on the significant pixels in the significant area, on the basis of pixel values of pixels in the vicinity of the boundary pixels, replacing the pixel values of the boundary pixels with the second padding pixel value, and outputting a second padded signal, the second padded signal being output as a padded signal; coding means for coding the padded signal and outputting a coded signal; decoding means for decoding the coded signal and outputting a decoded signal; addition means for adding the decoded signal and the prediction image to generate a locally reproduced image; and storage means for temporality storing the locally reproduced image for use in the prediction image generating means. Therefore, efficiency in coding is improved.

According to a 10th aspect of the present invention, in the image coding apparatus according to the 9th aspect, the pixel generating means generates the second padding pixel value on the basis of pixel values of significant pixels adjacent to the boundary pixels.

According to an 11th aspect of the present invention, in the image coding apparatus according to the 9th aspect, the pixel generating means employs a function that provides the average of the pixel values of the significant pixels.

According to a 12th aspect of the present invention, there is provided an image coding apparatus for coding an input signal comprising an image signal being an array of pixels having pixel values, and a significant signal showing whether the image signal is significant or not, and the apparatus comprises prediction image generating means for specifying, as a target area, an area of the input image signal to be the target of coding, on the basis of the input significant signal, and generating a prediction image for the target area, using a locally reproduced image which is described later; subtraction means for dividing the prediction image into a plurality of small prediction areas, dividing the target area into a plurality of small target areas, subtracting each small prediction area from corresponding small target area, and outputting a differential signal; pixel generating means for generating a padding pixel value using a prescribed function on the basis of pixel values of the significant pixels in the signal output from the subtraction means, replacing pixel values of insignificant pixels in the significant area with the padding pixel value, and outputting a padded signal; shape adaptive orthogonal transform means for orthogonally transforming only the pixel values of the significant pixels in the padded signal, and outputting a shape adaptive orthogonally transformed signal; coding means for coding the shape adaptive orthogonally transformed signal and outputting a shape adaptive coded signal; decoding means for decoding the shape adaptive coded signal and outputting a shape adaptive decoded signal; inverse orthogonal transform means for inversely and orthogonally transforming the decoded signal and outputting a shape adaptive inversely and orthogonally transformed signal; addition means for adding the shape adaptive inversely and orthogonally transformed signal and the prediction image to generate a locally reproduced image; and storage means for temporarily storing the locally reproduced image for use in the prediction image generating means. Therefore, efficiency in coding is improved.

According to a 13th aspect of the present invention, there is provided an image coding apparatus for coding an input signal comprising an image signal being an array of pixels having pixel values, and a significant signal showing whether the image signal is significant or not, and the apparatus comprises: prediction image generating means for specifying, as a target area, an area of the input image signal to be the target of coding, on the basis of the input significant signal, and generating a prediction image for the target area, using a locally reproduced image which is described later; subtraction means for dividing the prediction image into a plurality of small prediction areas, dividing the target area into a plurality of small target areas, subtracting each small prediction area from corresponding small target area, and outputting a differential signal; area dividing means for dividing a rectangle area including significant pixels from the differential signal output from the subtraction means using the significant signal, and outputting the rectangle area as a significant area; pixel generating means for generating a padding pixel value using a prescribed function on the basis of pixel values of the significant pixels in the significant area, replacing pixel values of insignificant pixels in the significant area with the padding pixel value, and outputting a padded signal; shape adaptive orthogonal transform means for orthogonally transforming only the pixel values of the significant pixels in the padded signal, and outputting a shape adaptive orthogonally transformed signal; coding means for coding the shape adaptive orthogonally transformed signal and outputting a shape adaptive coded signal; decoding means for decoding the shape adaptive coded signal and outputting a shape adaptive decoded signal; inverse orthogonal transform means for inversely and orthogonally transforming the decoded signal and outputting a shape adaptive inversely and orthogonally transformed signal; addition means for adding the shape adaptive inversely and orthogonally transformed signal and the prediction image to generate a locally reproduced image; and storage means for temporarily storing the locally reproduced image for use in the prediction image generating means. Therefore, efficiency in coding is improved.

According to a 14th aspect of the present invention, in the image coding apparatus according to the 12th aspect, the pixel generating means employs a function that provides the average of the pixel values of the significant pixels.

According to a 15th aspect of the present invention, there is provided an image coding apparatus for coding an input signal comprising an image signal being an array of pixels having pixel values, and a significant signal showing whether the image signal is significant or not, and the apparatus comprises: prediction image generating means for specifying, as a target area, an area of the input image signal to be the target of coding, on the basis of the input significant signal, and generating a prediction image for the target area, using a locally reproduced image which is described later; subtraction means for dividing the prediction image into a plurality of small prediction areas, dividing the target area into a plurality of small target areas, subtracting each small prediction area from corresponding small target area, and outputting a differential signal; pixel generating means for generating a padding pixel value using a prescribed function on the basis of pixel values of the significant pixels in the differential signal, replacing pixel values of insignificant pixels in the significant area with the padding pixel value, and outputting a padded signal; first coding means for coding the padded signal and outputting a first coded signal; second coding means for deciding the order of coding for coded components included in the first coded signal on the basis of the significant signal, and coding the first coded signal according to the decided order, and outputting a second coded signal; addition means for adding the decoded signal and the prediction image to generate a locally reproduced image; and storage means for temporarily storing the locally reproduced image for use in the prediction image generating means. Therefore, efficiency in coding is improved.

According to a 16th aspect of the present invention, in the image coding apparatus according to the 15th aspect, the second coding means decides the order according to the positions of the significant pixels obtained on the basis of the significant signal.

According to a 17th aspect of the present invention, the image coding apparatus according to the 15th aspect further comprises coding selecting means for selecting a coding method used by the second coding means, with reference to the significant pixels obtained on the basis of the significant signal.

According to an 18th aspect of the present invention, in the image coding apparatus according to the 15th aspect, the pixel generating means employs a function that provides the average of the pixels values of the significant pixels.

According to a 19th aspect of the present invention, there is provided an image coding apparatus for coding an input signal comprising comprises an image signal being an array of pixels having pixel values, and a significant signal showing whether the image signal is significant or not, the apparatus comprises: motion predicting means for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal; prediction image generating means for performing motion compensation using the locally reproduced image and the motion prediction signal, and outputting a prediction image; subtraction means for dividing the prediction image into a plurality of small prediction areas, dividing the target area into a plurality of small target areas, subtracting each small prediction area from corresponding small target area, and outputting a differential signal; coding means for coding the differential signal and outputting a coded signal; decoding means for decoding the coded signal and outputting a decoded signal; addition means for adding the decoded signal and the prediction image to generate a locally reproduced image; and storage means for temporarily storing the locally reproduced image for use in the prediction image generating means. Therefore, efficiency in coding is improved.

According to a 20th aspect of the present invention, in the image coding apparatus according to the 19th aspect, the motion predicting means performs: a prediction image pixel generating process in which small prediction areas, each area having the same size as the target small area, are obtained by division from at least one locally reproduced image; a prediction image padding pixel value is generated using a prescribed function on the basis of pixel values of significant pixels in each small prediction area; pixel values of insignificant pixels in the small prediction area are replaced with the prediction image padding pixel value; and padded small prediction areas are output: and an optimum small prediction area selecting process in which an optimum small prediction area having a smallest error from the target small area is selected from the padded small prediction areas.

According to a 21st aspect of the present invention, in the image coding apparatus according to the 20th aspect, the prediction image pixel generating process employs a function that provides the average of the pixel values of the significant pixels.

According to a 22nd aspect of the present invention, there is provided an image coding apparatus for coding an input signal comprising an image signal being an array of pixels having pixel values, and a significant signal showing whether the image signal is significant or not, and the apparatus comprises: pixel generating means for specifying, as a target area, an area of the input image signal to be the target of coding, on the basis of the input significant signal, dividing the target area into a plurality of small target areas, generating a padding pixel value using a prescribed function on the basis of pixel values of significant pixels in each target small area, replacing pixel values of insignificant pixels in the target small area with the padding pixel value, and outputting a padded target small area; motion predicting means for performing motion prediction to the padded target small area using a locally reproduced image that is described later, and outputting a motion prediction signal; prediction image generating means for performing motion compensation using the locally reproduced image and the motion prediction signal, and outputting a prediction image; subtraction means for dividing the prediction image into a plurality of small prediction areas, subtracting each small prediction area from corresponding small target area, and outputting a differential signal; coding means for coding the differential signal and outputting a coded signal; decoding means for decoding the coded signal and outputting a decoded signal; addition means for adding the decoded signal and the prediction image to generate a locally reproduced image; and storage means for temporarily storing the locally reproduced image for use in the prediction image generating means. Therefore, efficiency in coding is improved.

According to a 23rd aspect of the present invention, in the image coding apparatus according to the 22nd aspect, the motion predicting means performs: a prediction image pixel generating process in which small prediction areas, each area having the same size as the target small area, are obtained by division from at least one locally reproduced image; a prediction image padding pixel value is generated using a prescribed function on the basis of pixel values of significant pixels in each small prediction area; pixel values of insignificant pixels in the small prediction area are replaced with the prediction image padding pixel value; and padded small prediction areas are output: and an optimum small prediction area selecting process in which an optimum small prediction area having a smallest error from the target small area is selected from the padded small prediction areas.

According to a 24th aspect of the present invention, in the image coding apparatus according to the 23rd aspect, the prediction image pixel generating process employs a function that provides the average of the pixel values of the significant pixels.

According to a 25th aspect of the present invention, in the image coding apparatus according to the 22nd aspect, the pixel generating means employs a function that provides the average of the pixel values of the significant pixels.

According to a 26th aspect of the present invention, in the image coding apparatus according to the 1st aspect, the prediction image generating means comprises: motion predicting means for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating means for performing motion compensation using the locally reproduced image and the motion prediction signal, and outputting a compensation image; wherein the compensation image is output as the prediction image.

According to a 27th aspect of the present invention, in the image coding apparatus according to the 4th aspect, the prediction image generating means comprises: motion predicting means for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating means for performing motion compensation using the locally reproduced image and the motion prediction signal, and outputting a compensation image; wherein the compensation image is output as the prediction image.

According to a 28th aspect of the present invention, in the image coding apparatus according to the 9th aspect, the prediction image generating means comprises: motion predicting means for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating means for performing motion compensation using the locally reproduced image and the motion prediction signal, and outputting a compensation image; wherein the compensation image is output as the prediction image.

According to a 29th aspect of the present invention, in the image coding apparatus according to the 12th aspect, the prediction image generating means comprises: motion predicting means for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating means for performing motion compensation using the locally reproduced image and the motion prediction signal, and outputting a compensation image; wherein the compensation image is output as the prediction image.

According to a 30th aspect of the present invention, in the image coding apparatus according to the 13th aspect, the prediction image generating means comprises: motion predicting means for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating means for performing motion compensation using the locally reproduced image and the motion prediction signal, and outputting a compensation image; wherein the compensation image is output as the prediction image.

According to a 31st aspect of the present invention, in the image coding apparatus according to the 15th aspect, the prediction image generating means comprises: motion predicting means for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating means for performing motion compensation using the locally reproduced image and the motion prediction signal, and outputting a compensation image; wherein the compensation image is output as the prediction image.

According to a 32nd aspect of the present invention, in the image coding apparatus according to the 26th aspect, the prediction image generating means further comprises prediction image pixel generating means for generating a prediction image padding pixel value using a prescribed function on the basis of pixel values of significant pixels in the compensation image, replacing pixel values of insignificant pixels in the compensation image with the prediction image padding pixel value, and outputting a padded prediction image, and the padded prediction image is output as the prediction image.

According to a 33rd aspect of the present invention, in the image coding apparatus according to the 27th aspect, the prediction image generating means further comprises prediction image pixel generating means for generating a prediction image padding pixel value using a prescribed function on the basis of pixel values of significant pixels in the compensation image, replacing pixel values of insignificant pixels in the compensation image with the prediction image padding pixel value, and outputting a padded prediction image, and the padded prediction image is output as the prediction image.

According to a 34th aspect of the present invention, in the image coding apparatus according to the 28th aspect, the prediction image generating means further comprises prediction image pixel generating means for generating a prediction image padding pixel value using a prescribed function on the basis of pixel values of significant pixels in the compensation image, replacing pixel values of insignificant pixels in the compensation image with the prediction image padding pixel value, and outputting a padded prediction image, and the padded prediction image is output as the prediction image.

According to a 35th aspect of the present invention, in the image coding apparatus according to the 29th aspect, the prediction image generating means further comprises prediction image pixel generating means for generating a prediction image padding pixel value using a prescribed function on the basis of pixel values of significant pixels in the compensation image, replacing pixel values of insignificant pixels in the compensation image with the prediction image padding pixel value, and outputting a padded prediction image, and the padded prediction image is output as the prediction image.

According to a 36th aspect of the present invention, in the image coding apparatus according to the 30th aspect, the prediction image generating means further comprises prediction image pixel generating means for generating a prediction image padding pixel value using a prescribed function on the basis of pixel values of significant pixels in the compensation image, replacing pixel values of insignificant pixels in the compensation image with the prediction image padding pixel value, and outputting a padded prediction image, and the padded prediction image is output as the prediction image.

According to a 37th aspect of the present invention, in the image coding apparatus according to the 31st aspect, the prediction image generating means further comprises prediction image pixel generating means for generating a prediction image padding pixel value using a prescribed function on the basis of pixel values of significant pixels in the compensation image, replacing pixel values of insignificant pixels in the compensation image with the prediction image padding pixel value, and outputting a padded prediction image, and the padded prediction image is output as the prediction image.

According to a 38th aspect of the present invention, in the image coding apparatus according to the 32nd aspect, the prediction image pixel generating means employs a function that provides the average of the pixel values of the significant pixels.

According to a 39th aspect of the present invention, in the image coding apparatus according to the 33rd aspect, the prediction image pixel generating means employs a function that provides the average of the pixel values of the significant pixels.

According to a 40th aspect of the present invention, in the image coding apparatus according to the 34th aspect, the prediction image pixel generating means employs a function that provides the average of the pixel values of the significant pixels.

According to a 41st aspect of the present invention, in the image coding apparatus according to the 35th aspect, the prediction image pixel generating means employs a function that provides the average of the pixel values of the significant pixels.

According to a 42nd aspect of the present invention, in the image coding apparatus according to the 36th aspect, the prediction image pixel generating means employs a function that provides the average of the pixel values of the significant pixels.

According to a 43rd aspect of the present invention, in the image coding apparatus according to the 37th aspect, the prediction image pixel generating means employs a function that provides the average of the pixel values of the significant pixels.

According to a 44th aspect of the present invention, there is provided an image coding apparatus for coding an input signal comprising an image signal being an array of pixels having pixel values, and a significant signal showing whether the image signal is significant or not, the apparatus comprises: temporally close image applicable prediction image generating means for generating a prediction image using an image of the image signal to be the target of coding and an image signal of an image displayed close in time to the target image; subtraction means for producing a difference between the input image and the prediction image, and outputting a differential signal; coding means for coding the differential signal and outputting a coded signal; decoding means for decoding the coded signal and outputting a decoded signal; addition means for adding the decoded signal and the prediction image to generate a locally reproduced image; and storage means for temporarily storing the locally reproduced image for use in the prediction image generating means. Therefore, efficiency in coding is improved.

According to a 45th aspect of the present invention, in the image coding apparatus according to the 44th aspect, the temporally close image applicable prediction image generating means generates the prediction image by performing: a target area dividing process in which an area of the input image signal to be the target of coding is specified as a target area according to the significant signal, and at least one small target area is divided from the target area; a small prediction area obtaining process in which small prediction areas corresponding to the target small area and at least one small area adjacent to the target small area are obtained using an image signal of an image displayed temporally before or after the image to be the target of coding; a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

According to a 46th aspect of the present invention, the image coding apparatus according to the 45th aspect further comprises: area dividing means for dividing a rectangle area including significant pixels from the differential signal output from the subtraction means using the significant signal, and outputting the divided rectangle area as a significant area; and pixel generating means for generating a padding pixel value using a prescribed function on the basis of pixel values of significant pixels in the significant area, replacing pixel values of insignificant pixels in the significant area with the padding pixel value, and outputting a padded signal; wherein the coding means codes the padded signal.

According to a 47th aspect of the present invention, the image coding apparatus according to the 45th aspect further comprises: motion predicting means for performing motion compensation to the small target area using the locally reproduced image, and outputting a motion prediction signal; and motion compensation means for performing motion compensation using the locally reproduced image and the motion prediction signal, and outputting a compensation image; wherein the subtraction means and the addition means use the compensation image as the prediction image.

According to a 48th aspect of the present invention, the image coding apparatus according to the 47th aspect further comprises: prediction image pixel generating means for generating a prediction image padding pixel value using a prescribed function on the basis of pixel values of significant pixels in the compensation image, replacing pixel values of insignificant pixels in the compensation image with the prediction image padding pixel value, and outputting a padded prediction image; wherein the subtraction means and the addition means use the compensation image as the prediction image.

According to a 49th aspect of the present invention, the image coding apparatus according to the 48th aspect further comprises: area dividing means for dividing a rectangle area including significant pixels from the differential signal output from the subtraction means using the significant signal, and outputting the divided rectangle area as a significant area; and pixel generating means for generating a padding pixel value using a prescribed function on the basis of pixel values of significant pixels in the significant area, and replacing pixel values of insignificant pixels in the significant area with the padding pixel value, and outputting a padded signal; wherein the coding means codes the padded signal.

According to a 50th aspect of the present invention, in the image coding apparatus according to the 44th aspect, the temporally close image applicable prediction image generating means performs: a first prediction process in which a first prediction signal is generated using an image signal of an image displayed temporally before an image of an image signal being the target of coding, and the significant signal; and a second prediction process in which a second prediction signal is generated using an image signal of an image displayed temporally after the image of the image signal being the target of coding, and the significant signal.

According to a 51st aspect of the present invention, in the image coding apparatus according to the 50th aspect, the temporally close image applicable prediction image generating means generates the prediction image by performing: a first padding process in which at least one small area is divided from the first prediction signal; a first prediction padding pixel value is obtained for each first small prediction area that is obtained by the division, on the basis of pixel values of significant pixels in the small area, using a first function; pixel values of insignificant pixels in the small area are replaced with the first prediction padding pixel value to generate a first padded small prediction area; second padding process in which at least one small area is divided from the second prediction signal; a second prediction padding pixel value is obtained for each second small prediction area obtained by the division, on the basis of pixel values of significant pixels in the small area, using a second function; pixel values of insignificant pixels in the small area are replaced with the second prediction padding pixel value to generate a second padded small prediction area; and an averaging process in which corresponding first and second padded small prediction areas are subjected to a weighted averaging process using a third function to obtain an optimum prediction image.

According to a 52nd aspect of the present invention, in the image coding apparatus according to the 51st aspect, a weighted average of significant pixels is obtained, and the pixel values of the insignificant pixels are replaced with the weighted average padding pixel value so obtained.

According to a 53rd aspect of the present invention, in the image coding apparatus according to the 50th aspect, the temporally close image applicable prediction image generating means compares, pixel by pixel, the first prediction signal with the second prediction signal and, when both of the compared pixels are significant, the means employs a weighted average of the pixel values of these pixels and, when either of the compared pixels is significant, the means employs the pixel value of the significant pixel, thereby to generate the optimum prediction image, whereby the prediction image is generated.

According to a 54th aspect of the present invention, the image coding apparatus according to the 44th aspect further comprises shape adaptive orthogonal transform means for orthogonally transforming only pixel values of significant pixels in the differential signal, and outputting a shape adaptive orthogonally transformed signal, wherein the coding means codes the shape adaptive orthogonally transformed signal.

According to a 55th aspect of the present invention, the image coding apparatus according to the 50th aspect further comprises shape adaptive orthogonal transform means for orthogonally transforming only pixel values of significant pixels in the differential signal, and outputting a shape adaptive orthogonally transformed signal, wherein the coding means codes the shape adaptive orthogonally transformed signal.

According to a 56th aspect of the present invention, there is provided an image coding apparatus for coding an input signal comprising an image signal being an array of pixels having pixel values and a significant signal showing whether the image signal is significant or not, the apparatus comprises: motion predicting means for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal; prediction image generating means for performing motion compensation using the locally reproduced image and the motion prediction signal, and outputting a prediction image; prediction image pixel generating means for dividing at least one small prediction area from an area used for coding, generating a prediction image padding pixel value for each small prediction area, using a prescribed function, on the basis of pixel values of the significant pixels in the small prediction area, replacing pixel values of insignificant pixels in the small prediction area with the prediction image padding pixel value, and outputting a padded small prediction area; subtraction means for subtracting the corresponding padded small prediction area from each target small area, and outputting a differential signal; shape adaptive orthogonal transform means for orthogonally transforming only the pixel values of the significant pixels in the differential signal, and outputting a shape adaptive orthogonally transformed signal; quantization means for quantizing the shape adaptive orthogonally transformed signal and outputting a quantized signal; variable-length coding means for coding the quantized signal and outputting a variable-length coded signal; inverse quantization means for inversely quantizing the coded signal and outputting an inversely quantized signal; inverse orthogonal transform means for inversely and orthogonally transforming the inversely quantized signal and outputting an inversely transformed signal; addition means for adding the inversely transformed signal and the padded small prediction area and outputting a locally reproduced image; and storage means for temporarily storing the locally reproduced image for use in the prediction image generating means. Therefore, efficiency in coding is improved.

According to a 57th aspect of the present invention, there is provided an image coding apparatus for coding an input signal comprising an image signal being an array of pixels having pixel values, and a significant signal showing whether the image signal is significant or not, the apparatus comprises: motion predicting means for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal; prediction image generating means for performing motion compensation using the locally reproduced image and the motion prediction signal, and outputting a prediction image; prediction image pixel generating means for dividing at least one small prediction area from an area used for coding, generating a prediction image padding pixel value for each small prediction area, using a prescribed function, on the basis of pixel values of the significant pixels in the small prediction area, replacing pixel values of insignificant pixels in the small prediction area with the prediction image padding pixel value, and outputting a padded small prediction area; subtraction means for subtracting the corresponding padded small prediction area from each target small area, and outputting a differential signal; coding means for coding the differential signal and outputting a coded signal; decoding means for decoding the coded signal and outputting a decoded signal; addition means for adding the decoded signal and the prediction image to generate a locally reproduced image; storage means for temporarily storing the locally reproduced image for use in the prediction image generating means; and coding and outputting means for outputting the coded signal, and coding the prediction image padding pixel value for each small prediction area when insignificant pixels exist in the small prediction area and outputting the coded pixel value as additional information. Therefore, efficiency in coding is improved.

According to a 58th aspect of the present invention, there is provided an image coding apparatus for coding an input signal comprising an image signal being an array of pixels having pixel values, and a significant signal showing whether the image signal is significant or not, and the apparatus comprises: prediction image generating means for specifying, as a target area, an area of the input image signal to be the target of coding, on the basis of the input significant signal, and generating a prediction image for the target area, using pixel values of significant pixels in a locally reproduced image which is described later; subtraction means for dividing the prediction image into a plurality of small prediction areas, dividing the target area into a plurality of small target areas, subtracting each small prediction area from corresponding small target area, and outputting a differential signal; area dividing means for dividing a rectangle area including significant pixels from the differential signal output from the subtraction means using the significant signal, and outputting the rectangle area as a significant area; pixel generating means for generating a padding pixel value using a prescribed function on the basis of pixel values of the significant pixels in the significant area, replacing pixel values of insignificant pixels in the significant area with the padding pixel value, and outputting a padded signal; coding means for coding the padded signal and outputting a coded signal; decoding means for decoding the coded signal and outputting a decoded signal; addition means for adding the decoded signal and the prediction image to generate a locally reproduced image; and storage means for temporarily storing the locally reproduced image for use in the prediction image generating means. Therefore, efficiency in coding is improved.

According to a 59th aspect of the present invention, in the image coding apparatus according to the 58th aspect, the prediction image generating means uses the pixel values of the significant pixels in the locally reproduced image, according to the significant signal.

According to a 60th aspect of the present invention, there is provided an image decoding apparatus for decoding a coded signal including an image coded signal which is obtained by coding an image, and the apparatus comprises: decoding means for decoding the coded signal input to the apparatus, and outputting a decoded signal; prediction signal generating means for generating a prediction signal on the basis of a reference signal described later; addition means for adding the decoded signal and the prediction signal, and outputting a decoded image signal; and storage means for temporarily storing the decoded image signal as a reference signal for use in the prediction signal generating means. Therefore, accurate decoding of efficiently coded data is realized.

According to a 61st aspect of the present invention, in the image decoding apparatus according to the 60th aspect, the input signal is a coded signal output from an image coding apparatus according to any of the above-mentioned 1st to 21st, 24th, and 25th aspects.

According to a 62nd aspect of the present invention, there is provided an image decoding apparatus for decoding a coded signal including an image coded signal which is obtained by coding an image, and the apparatus comprises: decoding means for decoding the coded signal input to the apparatus, and outputting a decoded signal; prediction signal generating means for generating a prediction signal on the basis of a reference signal described later; prediction image pixel generating means for generating a padding pixel value using a prescribed function on the basis of pixel values of significant pixels in the prediction signal, replacing pixel values of insignificant pixels in the prediction signal with the padding pixel value, and outputting a padded prediction signal; addition means for adding the decoded signal and the padded prediction signal, and outputting a decoded image signal; and storage means for temporarily storing the decoded image signal as a reference signal for use in the prediction signal generating means. Therefore, accurate decoding of efficiently coded data is realized.

According to a 63rd aspect of the present invention, in the image decoding apparatus according to the 62nd aspect, the input signal is a coded signal output from an image coding apparatus according to any of the above-mentioned 23rd, 24th, and 32nd to 43rd aspects.

According to a 64th aspect of the present invention, in the image decoding apparatus according to the 62nd aspect, the pixel generating means employs a function that provides the average of the pixel values of the significant pixels.

According to a 65th aspect of the present invention, there is provided an image decoding apparatus for decoding a coded signal including an image coded signal which is obtained by coding an image, the apparatus comprises: decoding means for decoding the coded signal input to the apparatus, and outputting a decoded signal; temporally close image applicable prediction image generating means for generating a prediction image using an image signal of an image which is displayed close in time to an image of a target image signal; addition means for adding the decoded signal and the prediction signal, and outputting a decoded image signal; and storage means for temporarily storing the decoded image signal as a reference signal for use in the temporally close image applicable prediction signal generating means. Therefore, accurate decoding of efficiently coded data is realized.

According to a 66th aspect of the present invention, in the image decoding apparatus according to the 65th aspect, the temporally close image applicable prediction image generating means generates the prediction image by performing: a target area dividing process in which an area of the input image signal to be the target of coding is specified as a target area according to the input significant signal, and at least one small target area is divided from the target area; a small prediction area obtaining process in which small prediction areas corresponding to the target small area and at least one small area adjacent to the target small area are obtained using an image signal of an image displayed temporally before or after the image to be the target of coding; a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

According to a 67th aspect of the present invention, in the image decoding apparatus according to the 66th aspect, the input signal is a coded signal output from an image coding apparatus according to any of the above-mentioned 46th and 47th aspects.

According to a 68th aspect of the present invention, in the image decoding apparatus according to the 65th aspect, the temporally close image applicable prediction image generating means generates a padding pixel value of the prediction image by performing: a target area dividing process in which an area of the input image signal to be the target of coding is specified as a target area according to the input significant signal, and at least one small target area is divided from the target area; a small prediction area obtaining process in which small prediction areas corresponding to the target small area and at least one small area adjacent to the target small area are obtained using an image signal of an image displayed temporally before or after the image to be the target of coding; a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

According to a 69th aspect of the present invention, in the image decoding apparatus according to the 68th aspect, the input signal is a coded signal output from an image coding apparatus according to any of the above-mentioned 48th and 49th aspects.

According to a 70th aspect of the present invention, in the image decoding apparatus according to the 68th aspect, the pixel generating means employs a function that provides the average of the pixel values of the significant pixels.

According to a 71st aspect of the present invention, in the image decoding apparatus according to the 65th aspect, the temporally close image applicable prediction image generating means performs: a first prediction process for generating a first prediction signal using an image signal of an image displayed temporally before an image of an image signal being the target, and a significant signal; and a second prediction process for generating a second prediction signal using an image signal of an image displayed temporally after the image of the image signal being the target, and the significant signal.

According to a 72nd aspect of the present invention, in the image decoding apparatus according to the 71st aspect, the temporally close image applicable prediction image generating means generates the prediction image by performing: a first padding process in which at least one small area is divided from the first prediction signal; a first prediction padding pixel value is obtained for each first small prediction area that is obtained by the division, on the basis of pixel values of significant pixels in the small area, using a first function; pixel values of insignificant pixels in the small area are replaced with the first prediction padding pixel value to generate a first padded small prediction area: a second padding process in which at least one small area is divided from the second prediction signal; a second prediction padding pixel value is obtained for each second small prediction area obtained by the division, on the basis of pixel values of significant pixels in the small area, using a second function; pixel values of insignificant pixels in the small area are replaced with the second prediction padding pixel value to generate a second padded small prediction area: and an averaging process in which corresponding first and second padded small prediction areas are subjected to a weighted averaging process using a third function to obtain an optimum prediction image.

According to a 73rd aspect of the present invention, in the image decoding apparatus according to the 72nd aspect, a weighted average of significant pixels is obtained, and the pixel values of the insignificant pixels are replaced with the weighted average padding pixel value so obtained.

According to a 74th aspect of the present invention, in the image decoding apparatus according to the 71st aspect, the temporally close image applicable prediction image generating means compares, pixel by pixel, the first prediction signal with the second prediction signal and, when both of the compared pixels are significant, the means employs a weighted average of the pixel values of these pixels and, when either of the compared pixels is significant, the means employs the pixel value of the significant pixel, thereby to generate the optimum prediction image, whereby the prediction image is generated.

According to a 75th aspect of the present invention, in the image decoding apparatus according to the 65th aspect, the decoding means includes a shape adaptive inverse orthogonal transform means performing inverse orthogonal transform to coding components obtained by orthogonal transform of only significant pixels in the input signal.

According to a 76th aspect of the present invention, in the image decoding apparatus according to the 71st aspect, the decoding means includes a shape adaptive inverse orthogonal transform means performing inverse orthogonal transform to coding components obtained by orthogonal transform of only significant pixels in the input signal.

According to a 77th aspect of the present invention, in the image decoding apparatus according to the 60th aspect, the input signal is a coded signal output from an image coding apparatus according to the above-mentioned 56th aspect.

According to a 78th aspect of the present invention, there is provided an image decoding apparatus for decoding a coded signal which is obtained by performing compressive coding to an image signal being an array of pixels having pixel values and a significant signal showing whether the image signal is significant or not while referring to the significant signal, the apparatus comprises: area dividing means for specifying a coded area in the compressive coded signal, dividing the significant signal corresponding to the specified area into plural small areas, dividing a small rectangle area including significant pixels from each small area, and outputting the small rectangle areas as small significant areas; decoding means for decoding a compressively coded signal in the image signal corresponding to each small significant area, and outputting image decoded signals; and inverse transform calculating means for deciding an inverse transform calculation base with reference to the small significant areas, performing inverse transform calculation to the image decoded signals to obtain inverse transform calculated signals, combining the inverse transform calculated signals with reference to the significant signal, and outputting a decoded signal. Therefore, accurate decoding of efficiently coded data is realized.

According to a 79th aspect of the present invention, in the image decoding apparatus according to the 78th aspect, the small rectangle area divided from each small area by the area dividing means has the horizontal pixel number of $2^n$ and the vertical pixel number of $2^2$.

According to an 80th aspect of the present invention, there is provided an image decoding apparatus for decoding a coded signal which is obtained by performing compressive coding to an image signal being an array of pixels having pixel values and a significant signal showing whether the image signal is significant or not while referring to the significant signal, and the apparatus comprises: area dividing means for specifying a coded area in the compressively coded signal, dividing the significant signal corresponding to the specified area into plural small areas, dividing a small rectangle area including significant pixels from each small area, and outputting the small rectangle areas as small significant areas; decoding means for decoding a compressively coded signal in the image signal corresponding to each small significant area, and outputting image decoded signals; first inverse transform calculating means for assigning each of the decoded signals to a one-dimensional small area having a first direction with reference to each small significant area, deciding a calculation base for inverse transform decoding of the one-dimensional small area, performing inverse transform calculation using the calculation base, and outputting first inverse transform calculated signals; second inverse transform calculating means for assigning each of the first inverse transform calculated signals to a one-dimensional small area having a second direction different from the first direction with reference to the small significant area, deciding a calculation base for inverse transform decoding of the one-dimensional small areas, performing inverse transform calculation using the calculation base to obtain second inverse transform calculated signals, combining the second inverse transform calculated signals, and outputting a decoded signal. Therefore, accurate decoding of efficiently coded data is realized.

According to an 81st aspect of the present invention, there is provided an image decoding apparatus for decoding a coded signal which is obtained by performing compressive coding to an image signal being an array of pixels having pixel values and a significant signal showing whether the image signal is significant or not while referring to the significant signal, and the apparatus comprises: area dividing means for specifying a coded area in the compressively coded signal, and dividing the significant signal corresponding to the specified area into plural small areas; first decoding means for selecting the coding order according to the positions of the significant pixels in each small area, performing decoding to the compressively coded signal corresponding to the small area, and outputting a first decoded signal; and second decoding means for decoding the first decoded signal and outputting a second decoded signal. Therefore, accurate decoding of efficiently coded data is realized.

According to an 82nd aspect of the present invention, the image decoding apparatus according to the 81st aspect further comprises decoding method selecting means for selecting a decoding method with reference to the significant pixels.

According to an 83rd aspect of the present invention, there is provided an image decoding apparatus for decoding an input signal comprising a coded signal, which is obtained by performing compressive coding to an image signal being an array of pixels having pixel values and a significant signal showing whether the image signal is significant or not while referring to the significant signal, and additional information, and the apparatus comprises: decoding means for decoding the input coded signal, and outputting a decoded signal; prediction signal generating means for generating a prediction signal on the basis of a reference signal described later, with reference to the significant signal; prediction image pixel generating means for generating a padding pixel value on the basis of decoded addition information obtained by decoding the additional information, replacing insignificant pixels in the prediction signal with the padding pixel value, and outputting a padded prediction signal; addition means for adding the decoded signal and the padding prediction signal, and outputting a decoded image signal; and storage means for temporarily storing the decoded image signal as a reference signal for use in the prediction signal generating means. Therefore, accurate decoding of efficiently coded data is realized.

According to an 84th aspect of the present invention, there is provided an image decoding apparatus for decoding a coded signal which is obtained by performing compressive coding to an image signal being an array of pixels having pixel values and a significant signal showing whether the image signal is significant or not, and the apparatus comprises: decoding means for decoding the input coded signal, and outputting a decoded signal; prediction signal generating means for generating a prediction signal for the input signal, using a two-dimensional reference signal described later, with reference to pixel values of significant pixels in the reference signal; addition means for adding the decoded signal and the prediction signal, and outputting a decoded image signal; and storage means for temporarily storing the decoded image signal as a reference signal for use in the prediction signal generating means. Therefore, accurate decoding of efficiently coded data is realized.

According to an 85th aspect of the present invention, there is provided an image coding method for coding an input signal comprising an image signal being an array of pixels having pixel values, and a significant signal showing whether the image signal is significant or not, and the method comprises: prediction image generating step for specifying, as a target area, an area of the input image signal to be the target of coding, on the basis of the input significant signal, and generating a prediction image for the target area, using a locally reproduced image which is described later; subtraction step for dividing the prediction image into a plurality of small prediction areas, dividing the target area into a plurality of small target areas, subtracting each small prediction area from corresponding small target area, and outputting a differential signal; area dividing step for dividing a rectangle area including significant pixels from the differential signal output from the subtraction step using the significant signal, and outputting the rectangle area as a significant area; pixel generating step for generating a padding pixel value using a prescribed function on the basis of pixel values of the significant pixels in the significant area, replacing pixel values of insignificant pixels in the significant area with the padding pixel value, and outputting a padded signal; coding step for coding the padded signal and outputting a coded signal; decoding step for decoding the coded signal and outputting a decoded signal; addition step for adding the decoded signal and the prediction image to generate a locally reproduced image; and storage step for temporarily storing the locally reproduced image for use in the prediction image generating step. Therefore, efficiency in coding is improved.

According to an 86th aspect of the present invention, in the image coding method according to the 85th aspect, the area dividing step performs division so that the significant area is a rectangle area having horizontal pixel number and vertical pixel number, which are the n-th power of 2 ($2^n$), and including significant pixels included in the differential signal output from the subtraction step.

According to an 87th aspect of the present invention, there is provided an image coding method for coding an input signal comprising an image signal being an array of pixels having pixel values, and a significant signal showing whether the image signal is significant or not, and the method comprises: prediction image generating step for specifying, as a target area, an area of the input image signal to be the target of coding, on the basis of the input significant signal, and generating a prediction image for the target area, using a locally reproduced image which is described later; subtraction step for dividing the prediction image into a plurality of small prediction areas, dividing the target area into a plurality of small target areas, subtracting each small prediction area from corresponding small target area, and outputting a differential signal; first area dividing step for dividing a rectangle area including significant pixels from the differential signal in a first direction using the significant signal, and outputting the rectangle area as a first significant area; pixel generating step for generating a padding pixel value using a prescribed first function on the basis of pixel values of the significant pixels in the first significant area, replacing pixel values of insignificant pixels in the significant area with the padding pixel value, and outputting a padded signal; first coding step for coding the padded signal and outputting a first coded signal; second area dividing step for dividing an area from the first coded signal in a second direction different from the first direction, and outputting the area as a second significant area; padding component generating step for generating a padding coded component using a second function on the basis of coded components of the first coded signal when the coded components of the first coded signal do not exist in the second significant area, replacing coded components which are not the coded components of the first coded signal in the second significant area, with the padding coded component, and outputting a padded coded signal; second coding step for coding the padded coded signal and outputting a second coded signal; decoding step for decoding the second coded signal and outputting a decoded signal; addition step for adding the decoded signal and the prediction image to generate a locally reproduced image; and storage step for temporality storing the locally reproduced image for use in the prediction image generating step. Therefore, efficiency in coding is improved.

According to an 88th aspect of the present invention, in the image coding method according to the 87th aspect, the first area dividing step and the second area dividing step perform division so that the significant area becomes a one-dimensional area including pixels of the n-th power of 2 ($2^n$) in number.

According to an 89th aspect of the present invention, the image coding method according to the 85th aspect further comprises division selecting step for selecting an area division method according to the size of the significant area in the signal being the target of division.

According to a 90th aspect of the present invention, the image coding method according to the 88th aspect further comprises division selecting step for selecting an area division method according to the size of the significant area in the signal being the target of division.

According to a 91st aspect of the present invention, there is provided an image coding method for coding an input signal comprising an image signal being an array of pixels having pixel values, and a significant signal showing whether the image signal is significant or not, and the method comprises: prediction image generating step for specifying, as a target area, an area of the input image signal to be the target of coding, on the basis of the input significant signal, and generating a prediction image for the target area, using a locally reproduced image which is described later; subtraction step for dividing the prediction image into a plurality of small prediction areas, dividing the target area into a plurality of small target areas, subtracting each small prediction area from corresponding small target area, and outputting a differential signal; area dividing step for dividing a rectangle area including significant pixels from the differential signal using the significant signal, and outputting the rectangle area as a significant area; pixel generating step for performing first padding and second padding, the first padding comprising generating a first padding pixel value using a first function on the basis of pixel values of significant pixels in the significant area, replacing pixel values of insignificant pixels in the significant area with the first padding pixel value, and outputting a first padded signal, and the second padding comprising generating a second padding pixel value using a second function, and using, as boundary pixels, the replaced pixels abutting on the significant pixels in the significant area, on the basis of pixel values of pixels in the vicinity of the boundary pixels, replacing the pixel values of the boundary pixels with the second padding pixel value, and outputting a second padded signal, the second padded signal being output as a padded signal; coding step for coding the padded signal and outputting a coded signal; decoding step for decoding the coded signal and outputting a decoded signal; addition step for adding the decoded signal and the prediction image to generate a locally reproduced image; and storage step for temporality storing the locally reproduced image for use in the prediction image generating step. Therefore, efficiency in coding is improved.

According to a 92nd aspect of the present invention, in the image coding method according to the 91st aspect, the pixel generating step generates the second padding pixel value on the basis of pixel values of significant pixels adjacent to the boundary pixels.

According to a 93rd aspect of the present invention, there is provided an image coding method for coding an input signal comprising an image signal being an array of pixels having pixel values, and a significant signal showing whether the image signal is significant or not, and the method comprises: prediction image generating step for specifying, as a target area, an area of the input image signal to be the target of coding, on the basis of the input significant signal, and generating a prediction image for the target area, using a locally reproduced image which is described later; subtraction step for dividing the prediction image into a plurality of small prediction areas, dividing the target area into a plurality of small target areas, subtracting each small prediction area from corresponding small target area, and outputting a differential signal; pixel generating step for generating a padding pixel value using a prescribed function on the basis of pixel values of the significant pixels in the signal output from the subtraction step, replacing pixel values of insignificant pixels in the significant area with the padding pixel value, and outputting a padded signal; shape adaptive orthogonal transform step for orthogonally transforming only the pixel values of the significant pixels in the padded signal, and outputting a shape adaptive orthogonally transformed signal; coding step for coding the shape adaptive orthogonally transformed signal and outputting a shape adaptive coded signal; decoding step for decoding the shape adaptive coded signal and outputting a shape adaptive decoded signal; inverse orthogonal transform step for inversely and orthogonally transforming the decoded signal and outputting a shape adaptive inversely and orthogonally transformed signal; addition step for adding the shape adaptive inversely and orthogonally transformed signal and the prediction image to generate a locally reproduced image; and storage step for temporarily storing the locally reproduced image for use in the prediction image generating step. Therefore, efficiency in coding is improved.

According to a 94th aspect of the present invention, there is provided an image coding method for coding an input signal comprising an image signal being an array of pixels having pixel values, and a significant signal showing whether the image signal is significant or not, and the method comprises: prediction image generating step for specifying, as a target area, an area of the input image signal to be the target of coding, on the basis of the input significant signal, and generating a prediction image for the target area, using a locally reproduced image which is described later; subtraction step for dividing the prediction image into a plurality of small prediction areas, dividing the target area into a plurality of small target areas, subtracting each small prediction area from corresponding small target area, and outputting a differential signal; area dividing step for dividing a rectangle area including significant pixels from the differential signal output from the subtraction step using the significant signal, and outputting the rectangle area as a significant area; pixel generating step for generating a padding pixel value using a prescribed function on the basis of pixel values of the significant pixels in the significant area, replacing pixel values of insignificant pixels in the significant area with the padding pixel value, and outputting a padded signal; shape adaptive orthogonal transform step for orthogonally transforming only the pixel values of the significant pixels in the padded signal, and outputting a shape adaptive orthogonally transformed signal; coding step for coding the shape adaptive orthogonally transformed signal and outputting a shape adaptive coded signal; decoding step for decoding the shape adaptive coded signal and outputting a shape adaptive decoded signal; inverse orthogonal transform step for inversely and orthogonally transforming the decoded signal and outputting a shape adaptive inversely and orthogonally transformed signal; addition step for adding the shape adaptive inversely and orthogonally transformed signal and the prediction image to generate a locally reproduced image; and storage step for temporarily storing the locally reproduced image for use in the prediction image generating step. Therefore, efficiency in coding is improved.

According to a 95th aspect of the present invention, there is provided an image coding method for coding an input signal comprising an image signal being an array of pixels having pixel values, and a significant signal showing whether the image signal is significant or not, and the method comprises: prediction image generating step for specifying, as a target area, an area of the input image signal to be the target of coding, on the basis of the input significant signal, and generating a prediction image for the target area, using a locally reproduced image which is described later; subtraction step for dividing the prediction image into a plurality of small prediction areas, dividing the target area into a plurality of small target areas, subtracting each small prediction area from corresponding small target area, and outputting a differential signal; pixel generating step for generating a padding pixel value using a prescribed function on the basis of pixel values of the significant pixels in the differential signal, replacing pixel values of insignificant pixels in the significant area with the padding pixel value, and outputting a padded signal; first coding step for coding the padded signal and outputting a first coded signal; second coding step for deciding the order of coding for coded components included in the first coded signal on the basis of the significant signal, and coding the first coded signal according to the decided order, and outputting a second coded signal; addition step for adding the decoded signal and the prediction image to generate a locally reproduced image; and storage step for temporarily storing the locally reproduced image for use in the prediction image generating step. Therefore, efficiency in coding is improved.

According to a 96th aspect of the present invention, in the image coding method according to the 95th aspect, the second coding step decides the order according to the positions of the significant pixels obtained on the basis of the significant signal.

According to a 97th aspect of the present invention, the image coding method according to the 95th aspect further comprises coding selecting step for selecting a coding method used by the second coding step, with reference to the significant pixels obtained on the basis of the significant signal.

According to a 98th aspect of the present invention, there is provided an image coding method for coding an input signal comprising an image signal being an array of pixels having pixel values, and a significant signal showing whether the image signal is significant or not, and the method comprises: motion predicting step for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal; prediction image generating step for performing motion compensation using the locally reproduced image and the motion prediction signal, and outputting a prediction image; subtraction step for dividing the prediction image into a plurality of small prediction areas, dividing the target area into a plurality of small target areas, subtracting each small prediction area from corresponding small target area, and outputting a differential signal; coding step for coding the differential signal and outputting a coded signal; decoding step for decoding the coded signal and outputting a decoded signal; addition step for adding the decoded signal and the prediction image to generate a locally reproduced image; and storage step for temporarily storing the locally reproduced image for use in the prediction image generating step. Therefore, efficiency in coding is improved.

According to a 99th aspect of the present invention, in the image coding method according to the 98th aspect, the motion predicting step comprises: a prediction image pixel generating process in which small prediction areas, each area having the same size as the target small area, are obtained by division from at least one locally reproduced image; a prediction image padding pixel value is generated using a prescribed function on the basis of pixel values of significant pixels in each small prediction area; pixel values of insignificant pixels in the small prediction area are replaced with the prediction image padding pixel value; and padded small prediction areas are output: and an optimum small prediction area selecting process in which an optimum small prediction area having a smallest error from the target small area is selected from the padded small prediction areas.

According to a 100th aspect of the present invention, in the image coding method according to the 98th aspect, the prediction image pixel generating process employs a function that provides the average of the pixel values of the significant pixels.

According to a 101st aspect of the present invention, there is provided an image coding method for coding an input signal comprising an image signal being an array of pixels having pixel values, and a significant signal showing whether the image signal is significant or not, and the method comprises: pixel generating step for specifying, as a target area, an area of the input image signal to be the target of coding, on the basis of the input significant signal, dividing the target area into a plurality of small target areas, generating a padding pixel value using a prescribed function on the basis of pixel values of significant pixels in each target small area, replacing pixel values of insignificant pixels in the target small area with the padding pixel value, and outputting a padded target small area; motion predicting step for performing motion prediction to the padded target small area using a locally reproduced image that is described later, and outputting a motion prediction signal; prediction image generating step for performing motion compensation using the locally reproduced image and the motion prediction signal, and outputting a prediction image; subtraction step for dividing the prediction image into a plurality of small prediction areas, subtracting each small prediction area from corresponding small target area, and outputting a differential signal; coding step for coding the differential signal and outputting a coded signal; decoding step for decoding the coded signal and outputting a decoded signal; addition step for adding the decoded signal and the prediction image to generate a locally reproduced image; and storage step for temporarily storing the locally reproduced image for use in the prediction image generating step. Therefore, efficiency in coding is improved.

According to a 102nd aspect of the present invention, in the image coding method according to the 101st aspect, the motion predicting step comprises: a prediction image pixel generating process in which small prediction areas, each area having the same size as the target small area, are obtained by division from at least one locally reproduced image; a prediction image padding pixel value is generated using a prescribed function on the basis of pixel values of significant pixels in each small prediction area; pixel values of insignificant pixels in the small prediction area are replaced with the prediction image padding pixel value; and padded small prediction areas are output: and an optimum small prediction area selecting process in which an optimum small prediction area having a smallest error from the target small area is selected from the padded small prediction areas.

According to a 103rd aspect of the present invention, in the image coding method according to the 85th aspect, the prediction image generating step comprises: motion predicting step for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating step for performing motion compensation using the locally reproduced image and the motion prediction signal, and outputting a compensation image: wherein the compensation image is output as the prediction image.

According to a 104th aspect of the present invention, in the image coding method according to the 88th aspect, the prediction image generating step comprises: motion predicting step for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating step for performing motion compensation using the locally reproduced image and the motion prediction signal, and outputting a compensation image: wherein the compensation image is output as the prediction image.

According to a 105th aspect of the present invention, in the image coding method according to the 91st aspect, the prediction image generating step comprises: motion predicting step for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating step for performing motion compensation using the locally reproduced image and the motion prediction signal, and outputting a compensation image: wherein the compensation image is output as the prediction image.

According to a 106th aspect of the present invention, in the image coding method according to the 93rd aspect, the prediction image generating step comprises: motion predicting step for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating step for performing motion compensation using the locally reproduced image and the motion prediction signal, and outputting a compensation image: wherein the compensation image is output as the prediction image.

According to a 107th aspect of the present invention, in the image coding method according to the 94th aspect, the prediction image generating step comprises: motion predicting step for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating step for performing motion compensation using the locally reproduced image and the motion prediction signal, and outputting a compensation image: wherein the compensation image is output as the prediction image.

According to a 108th aspect of the present invention, in the image coding method according to the 95th aspect, the prediction image generating step comprises: motion predicting step for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating step for performing motion compensation using the locally reproduced image and the motion prediction signal, and outputting a compensation image: wherein the compensation image is output as the prediction image.

According to a 109th aspect of the present invention, there is provided an image coding method for coding an input signal comprising an image signal being an array of pixels having pixel values, and a significant signal showing whether the image signal is significant or not, and the method comprises: temporally close image applicable prediction image generating step for generating a prediction image using an image of the image signal to be the target of coding and an image signal of an image displayed close in time to the target image; subtraction step for producing a difference between the input image and the prediction image, and outputting a differential signal; coding step for coding the differential signal and outputting a coded signal; decoding step for decoding the coded signal and outputting a decoded signal; addition step for adding the decoded signal and the prediction image to generate a locally reproduced image; and storage step for temporarily storing the locally reproduced image for use in the prediction image generating step. Therefore, efficiency in coding is improved.

According to a 110th aspect of the present invention, in the image coding method according to the 109th aspect, the temporally close image applicable prediction image generating step comprises: a target area dividing process in which an area of the input image signal to be the target of coding is specified as a target area according to the significant signal, and at least one small target area is divided from the target area; a small prediction area obtaining process in which small prediction areas corresponding to the target small area and at least one small area adjacent to the target small area are obtained using an image signal of an image displayed temporally before or after the image to be the target of coding; a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

According to a 111th aspect of the present invention, the image coding method according to the 110th aspect further comprises: area dividing step for dividing a rectangle area including significant pixels from the differential signal output from the subtraction step using the significant signal, and outputting the divided rectangle area as a significant area; and pixel generating step for generating a padding pixel value using a prescribed function on the basis of pixel values of significant pixels in the significant area, replacing pixel values of insignificant pixels in the significant area with the padding pixel value, and outputting a padded signal; wherein the coding step codes the padded signal.

According to a 112th aspect of the present invention, the image coding method according to the 110th aspect further comprises: motion predicting step for performing motion compensation to the small target area using the locally reproduced image, and outputting a motion prediction signal; and motion compensation step for performing motion compensation using the locally reproduced image and the motion prediction signal, and outputting a compensation image; wherein the subtraction step and the addition step use the compensation image as the prediction image.

According to a 113th aspect of the present invention, the image coding method according to the 112th aspect further comprises: prediction image pixel generating step for generating a prediction image padding pixel value using a prescribed function on the basis of pixel values of significant pixels in the compensation image, replacing pixel values of insignificant pixels in the compensation image with the prediction image padding pixel value, and outputting a padded prediction image; wherein the subtraction step and the addition step use the compensation image as the prediction image.

According to a 114th aspect of the present invention, the image coding method according to the 109th aspect further comprises: shape adaptive orthogonal transform step for orthogonally transforming only pixel values of significant pixels in the differential signal, and outputting a shape adaptive orthogonally transformed signal; wherein the coding step codes the shape adaptive orthogonally transformed signal.

According to a 115th aspect of the present invention, there is provided an image coding method for coding an input signal comprising an image signal being an array of pixels having pixel values, and a significant signal showing whether the image signal is significant or not, and the method comprises: motion predicting step for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal; prediction image generating step for performing motion compensation using the locally reproduced image and the motion prediction signal, and outputting a prediction image; prediction image pixel generating step for dividing at least one small prediction area from an area used for coding, generating a prediction image padding pixel value for each small prediction area, using a prescribed function, on the basis of pixel values of the significant pixels in the small prediction area, replacing pixel values of insignificant pixels in the small prediction area with the prediction image padding pixel value, and outputting a padded small prediction area; subtraction step for subtracting the corresponding padded small prediction area from each target small area, and outputting a differential signal; shape adaptive orthogonal transform step for orthogonally transforming only the pixel values of the significant pixels in the differential signal, and outputting a shape adaptive orthogonally transformed signal; quantization step for quantizing the shape adaptive orthogonally transformed signal and outputting a quantized signal; variable-length coding step for coding the quantized signal and outputting a variable-length coded signal; inverse quantization step for inversely quantizing the coded signal and outputting an inversely quantized signal; inverse orthogonal transform step for inversely and orthogonally transforming the inversely quantized signal and outputting an inversely transformed signal; addition step for adding the inversely transformed signal and the padded small prediction area and outputting a locally reproduced image; and storage step for temporarily storing the locally reproduced image for use in the prediction image generating step. Therefore, efficiency in coding is improved.

According to a 116th aspect of the present invention, there is provided an image coding method for coding an input signal comprising an image signal being an array of pixels having pixel values, and a significant signal showing whether the image signal is significant or not, and the method comprises: motion predicting step for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal; prediction image generating step for performing motion compensation using the locally reproduced image and the motion prediction signal, and outputting a prediction image; prediction image pixel generating step for dividing at least one small prediction area from an area used for coding, generating a prediction image padding pixel value for each small prediction area, using a prescribed function, on the basis of pixel values of the significant pixels in the small prediction area, replacing pixel values of insignificant pixels in the small prediction area with the prediction image padding pixel value, and outputting a padded small prediction area; subtraction step for subtracting the corresponding padded small prediction area from each target small area, and outputting a differential signal; coding step for coding the differential signal and outputting a coded signal; decoding step for decoding the coded signal and outputting a decoded signal; addition step for adding the decoded signal and the prediction image to generate a locally reproduced image; storage step for temporarily storing the locally reproduced image for use in the prediction image generating step; and coding and outputting step for outputting the coded signal, and coding the prediction image padding pixel value for each small prediction area when insignificant pixels exist in the small prediction area and outputting the coded pixel value as additional information. Therefore, efficiency in coding is improved.

According to a 117th aspect of the present invention, there is provided an image coding method for coding an input signal comprising an image signal being an array of pixels having pixel values, and a significant signal showing whether the image signal is significant or not, and the method comprises: prediction image generating step for specifying, as a target area, an area of the input image signal to be the target of coding, on the basis of the input significant signal, and generating a prediction image for the target area, using pixel values of significant pixels in a locally reproduced image which is described later; subtraction step for dividing the prediction image into a plurality of small prediction areas, dividing the target area into a plurality of small target areas, subtracting each small prediction area from corresponding small target area, and outputting a differential signal; area dividing step for dividing a rectangle area including significant pixels from the differential signal output from the subtraction step using the significant signal, and outputting the rectangle area as a significant area; pixel generating step for generating a padding pixel value using a prescribed function on the basis of pixel values of the significant pixels in the significant area, replacing pixel values of insignificant pixels in the significant area with the padding pixel value, and outputting a padded signal; coding step for coding the padded signal and outputting a coded signal; decoding step for decoding the coded signal and outputting a decoded signal; addition step for adding the decoded signal and the prediction image to generate a locally reproduced image; and storage step for temporarily storing the locally reproduced image for use in the prediction image generating step. Therefore, efficiency in coding is improved.

According to a 118th aspect of the present invention, there is provided an image decoding method for decoding a coded signal including an image coded signal which is obtained by coding an image, the method comprises: decoding step for decoding the input coded signal, and outputting a decoded signal; prediction signal generating step for generating a prediction signal on the basis of a reference signal described later; addition step for adding the decoded signal and the prediction signal, and outputting a decoded image signal; and storage step for temporarily storing the decoded image signal as a reference signal for use in the prediction signal generating step. Therefore, accurate decoding of efficiently coded data is realized.

According to a 119th aspect of the present invention, in the image decoding method according to the 118th aspect, the input signal is a coded signal obtained in an image coding method according to any of the above-mentioned 85th to 100th, and 102nd aspects.

According to a 120th aspect of the present invention, there is provided an image decoding method for decoding a coded signal including an image coded signal which is obtained by coding an image, and the method comprises: decoding step for decoding the input coded signal, and outputting a decoded signal; prediction signal generating step for generating a prediction signal on the basis of a reference signal described later; prediction image pixel generating step for generating a padding pixel value using a prescribed function on the basis of pixel values of significant pixels in the prediction signal, replacing pixel values of insignificant pixels in the prediction signal with the padding pixel value, and outputting a padded prediction signal; addition step for adding the decoded signal and the padded prediction signal, and outputting a decoded image signal; and storage step for temporarily storing the decoded image signal as a reference signal for use in the prediction signal generating step. Therefore, accurate decoding of efficiently coded data is realized.

According to a 121st aspect of the present invention, in the image decoding method according to the 120th aspect, the input signal is a coded signal obtained in an image coding method according to any of the above-mentioned 102nd to 108th aspects.

According to a 122nd aspect of the present invention, there is provided an image decoding method for decoding a coded signal including an image coded signal which is obtained by coding an image, and the method comprises: decoding step for decoding the input coded signal, and outputting a decoded signal; temporally close image applicable prediction image generating step for generating a prediction image using an image signal of an image which is displayed close in time to an image of a target image signal; addition step for adding the decoded signal and the prediction signal, and outputting a decoded image signal; and storage step for temporarily storing the decoded image signal as a reference signal for use in the temporally close image applicable prediction signal generating step. Therefore, accurate decoding of efficiently coded data is realized.

According to a 123rd aspect of the present invention, in the image decoding method according to the 122nd aspect, the temporally close image applicable prediction image generating step comprises: a target area dividing process in which an area of the input image signal to be the target of coding is specified as a target area according to the input significant signal, and at least one small target area is divided from the target area; a small prediction area obtaining process in which small prediction areas corresponding to the target small area and at least one small area adjacent to the target small area are obtained using an image signal of an image displayed temporally before or after the image to be the target of coding; a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

According to a 124th aspect of the present invention, in the image decoding method according to the 123rd aspect, the input signal is a coded signal obtained in an image coding method according to any of the above-mentioned 111th and 112th aspects.

According to a 125th aspect of the present invention, in the image decoding method according to the 122nd aspect, the temporally close image applicable prediction image generating step comprises: a target area dividing process in which an area of the input image signal to be the target of coding is specified as a target area according to the input significant signal, and at least one small target area is divided from the target area; a small prediction area obtaining process in which small prediction areas corresponding to the target small area and at least one small area adjacent to the target small area are obtained using an image signal of an image displayed temporally before or after the image to be the target of coding; a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

According to a 126th aspect of the present invention, in the image decoding method according to the 125th aspect, the input signal is a coded signal obtained in an image coding method according to the above-mentioned 113th aspect.

According to a 127th aspect of the present invention, in the image decoding method according to the 122nd aspect, the temporally close image applicable prediction image generating step comprises: a first prediction process for generating a first prediction signal using an image signal of an image displayed temporally before an image of an image signal being the target, and a significant signal; and a second prediction process for generating a second prediction signal using an image signal of an image displayed temporally after the image of the image signal being the target, and the significant signal.

According to a 128th aspect of the present invention, in the image decoding method according to the 127th aspect, the temporally close image applicable prediction image generating step comprises: a first padding process in which at least one small area is divided from the first prediction signal; a first prediction padding pixel value is obtained for each first small prediction area that is obtained by the division, on the basis of pixel values of significant pixels in the small area, using a first function; pixel values of insignificant pixels in the small area are replaced with the first prediction padding pixel value to generate a first padded small prediction area: a second padding process in which at least one small area is divided from the second prediction signal; a second prediction padding pixel value is obtained for each second small prediction area obtained by the division, on the basis of pixel values of significant pixels in the small area, using a second function; pixel values of insignificant pixels in the small area are replaced with the second prediction padding pixel value to generate a second padded small prediction area: and an averaging process in which corresponding first and second padded small prediction areas are subjected to a weighted averaging process using a third function to obtain an optimum prediction image.

According to a 129th aspect of the present invention, in the image decoding method according to the 128th aspect, a weighted average of significant pixels is obtained, and the pixel values of the insignificant pixels are replaced with the weighted average padding pixel value so obtained.

According to a 130th aspect of the present invention, in the image decoding method according to the 122nd aspect, the decoding step includes a shape adaptive inverse orthogonal transform step of performing inverse orthogonal transform to coding components obtained by orthogonal transform of only significant pixels in the input signal.

According to a 131st aspect of the present invention, in the image decoding method according to the 127th aspect, the decoding step includes a shape adaptive inverse orthogonal transform step of performing inverse orthogonal transform to coding components obtained by orthogonal transform of only significant pixels in the input signal.

According to a 132nd aspect of the present invention, there is provided an image decoding method for decoding a coded signal which is obtained by performing compressive coding to an image signal being an array of pixels having pixel values and a significant signal showing whether the image signal is significant or not while referring to the significant signal, and the method comprises: area dividing step for specifying a coded area in the compressively coded signal, dividing the significant signal corresponding to the specified area into plural small areas, dividing a small rectangle area including significant pixels from each small area, and outputting the small rectangle areas as small significant areas; decoding step for decoding a compressively coded signal in the image signal corresponding to each small significant area, and outputting image decoded signals; and inverse transform calculating step for deciding an inverse transform calculation base with reference to the small significant areas, performing inverse transform calculation to the image decoded signals to obtain inverse transform calculated signals, combining the inverse transform calculated signals with reference to the significant signal, and outputting a decoded signal. Therefore, accurate decoding of efficiently coded data is realized.

According to a 133rd aspect of the present invention, there is provided an image decoding method for decoding a coded signal which is obtained by performing compressive coding to an image signal being an array of pixels having pixel values and a significant signal showing whether the image signal is significant or not while referring to the significant signal, and the method comprises: area dividing step for specifying a coded area in the compressively coded signal, dividing the significant signal corresponding to the specified area into plural small areas, dividing a small rectangle area including significant pixels from each small area, and outputting the small rectangle areas as small significant areas; decoding step for decoding a compressively coded signal in the image signal corresponding to each small significant area, and outputting image decoded signals; first inverse transform calculating step for assigning each of the decoded signals to a one-dimensional small area having a first direction with reference to each small significant area, deciding a calculation base for inverse transform decoding of the one-dimensional small area, performing inverse transform calculation using the calculation base, and outputting first inverse transform calculated signals; second inverse transform calculating step for assigning each of the first inverse transform calculated signals to a one-dimensional small area having a second direction different from the first direction with reference to the small significant area, deciding a calculation base for inverse transform decoding of the one-dimensional small areas, performing inverse transform calculation using the calculation base to obtain second inverse transform calculated signals, combining the second inverse transform calculated signals, and outputting a decoded signal. Therefore, accurate decoding of efficiently coded data is realized.

According to a 134th aspect of the present invention, there is provided an image decoding method for decoding a coded signal which is obtained by performing compressive coding to an image signal being an array of pixels having pixel values and a significant signal showing whether the image signal is significant or not while referring to the significant signal, and the method comprises: area dividing step for specifying a coded area in the compressively coded signal, and dividing the significant signal corresponding to the specified area into plural small areas; first decoding step for selecting the coding order according to the positions of the significant pixels in each small area, performing decoding to the compressively coded signal corresponding to the small area, and outputting a first decoded signal; and second decoding step for decoding the first decoded signal and outputting a second decoded signal. Therefore, accurate decoding of efficiently coded data is realized.

According to a 135th aspect of the present invention, there is provided an image decoding method for decoding an input signal comprising a coded signal, which is obtained by performing compressive coding to an image signal being an array of pixels having pixel values and a significant signal showing whether the image signal is significant or not while referring to the significant signal, and additional information, and the method comprises: decoding step for decoding the input coded signal, and outputting a decoded signal; prediction signal generating step for generating a prediction signal on the basis of a reference signal described later, with reference to the significant signal; prediction image pixel generating step for generating a padding pixel value on the basis of decoded addition information obtained by decoding the additional information, replacing insignificant pixels in the prediction signal with the padding pixel value, and outputting a padded prediction signal; addition step for adding the decoded signal and the padding prediction signal, and outputting a decoded image signal; and storage step for temporarily storing the decoded image signal as a reference signal for use in the prediction signal generating step. Therefore, accurate decoding of efficiently coded data is realized.

According to a 136th aspect of the present invention, there is provided an image coding program recording medium in which an image coding program is recorded, which program is for coding an input signal comprising an image signal being an array of pixels having pixel values and a significant signal showing whether the image signal is significant or not, and the program comprises: prediction image generating step for specifying, as a target area, an area of the input image signal to be the target of coding, on the basis of the input significant signal, and generating a prediction image for the target area, using a locally reproduced image which is described later; subtraction step for dividing the prediction image into a plurality of small prediction areas, dividing the target area into a plurality of small target areas, subtracting each small prediction area from corresponding small target area, and outputting a differential signal; area dividing step for dividing a rectangle area including significant pixels from the differential signal output from the subtraction step using the significant signal, and outputting the rectangle area as a significant area; pixel generating step for generating a padding pixel value using a prescribed function on the basis of pixel values of the significant pixels in the significant area, replacing pixel values of insignificant pixels in the significant area with the padding pixel value, and outputting a padded signal; coding step for coding the padded signal and outputting a coded signal; decoding step for decoding the coded signal and outputting a decoded signal; addition step for adding the decoded signal and the prediction image to generate a locally reproduced image; and storage step for temporarily storing the locally reproduced image for use in the prediction image generating step. Therefore, when this program is executed by a computer or the like, efficiency in coding is improved.

According to a 137th aspect of the present invention, in the image coding program recording medium according to the 136th aspect, the area dividing step performs division so that the significant area is a rectangle area having horizontal pixel number and vertical pixel number, which are the n-th power of 2 ($2^n$), and including significant pixels included in the differential signal output from the subtraction step.

According to a 138th aspect of the present invention, there is provided an image coding program recording medium in which an image coding program is recorded, which program is for coding an input signal comprising an image signal being an array of pixels having pixel values and a significant signal showing whether the image signal is significant or not, and the program comprises: prediction image generating step for specifying, as a target area, an area of the input image signal to be the target of coding, on the basis of the input significant signal, and generating a prediction image for the target area, using a locally reproduced image which is described later; subtraction step for dividing the prediction image into a plurality of small prediction areas, dividing the target area into a plurality of small target areas, subtracting each small prediction area from corresponding small target area, and outputting a differential signal; first area dividing step for dividing a rectangle area including significant pixels from the differential signal in a first direction using the significant signal, and outputting the rectangle area as a first significant area; pixel generating step for generating a padding pixel value using a prescribed first function on the basis of pixel values of the significant pixels in the first significant area, replacing pixel values of insignificant pixels in the significant area with the padding pixel value, and outputting a padded signal; first coding step for coding the padded signal and outputting a first coded signal; second area dividing step for dividing an area from the first coded signal in a second direction different from the first direction, and outputting the area as a second significant area; padding component generating step for generating a padding coded component using a second function on the basis of coded components of the first coded signal when the coded components of the first coded signal do not exist in the second significant area, replacing coded components which are not the coded components of the first coded signal in the second significant area, with the padding coded component, and outputting a padded coded signal; second coding step for coding the padded coded signal and outputting a second coded signal; decoding step for decoding the second coded signal and outputting a decoded signal; addition step for adding the decoded signal and the prediction image to generate a locally reproduced image; and storage step for temporality storing the locally reproduced image for use in the prediction image generating step. Therefore, when this program is executed by a computer or the like, efficiency in coding is improved.

According to a 139th aspect of the present invention, in the image coding program recording medium according to the 138th aspect, the first area dividing step and the second area dividing step perform division so that the significant area becomes a one-dimensional area including pixels of the n-th power of 2 ($2^n$) in number.

According to a 140th aspect of the present invention, in the image coding program recording medium according to the 136th aspect, the program further comprises division selecting step for selecting an area division method according to the size of the significant area in the signal being the target of division.

According to a 141st aspect of the present invention, in the image coding program recording medium according to the 138th aspect, the program further comprises division selecting step for selecting an area division method according to the size of the significant area in the signal being the target of division.

According to a 142nd aspect of the present invention, there is provided an image coding program recording medium in which an image coding program is recorded, which program is for coding an input signal comprising an image signal being an array of pixels having pixel values and a significant signal showing whether the image signal is significant or not, and the program comprises: prediction image generating step for specifying, as a target area, an area of the input image signal to be the target of coding, on the basis of the input significant signal, and generating a prediction image for the target area, using a locally reproduced image which is described later; subtraction step for dividing the prediction image into a plurality of small prediction areas, dividing the target area into a plurality of small target areas, subtracting each small prediction area from corresponding small target area, and outputting a differential signal; area dividing step for dividing a rectangle area including significant pixels from the differential signal using the significant signal, and outputting the rectangle area as a significant area; pixel generating step for performing first padding and second padding, the first padding comprising generating a first padding pixel value using a first function on the basis of pixel values of significant pixels in the significant area, replacing pixel values of insignificant pixels in the significant area with the first padding pixel value, and outputting a first padded signal, and the second padding comprising generating a second padding pixel value using a second function, and using, as boundary pixels, the replaced pixels abutting on the significant pixels in the significant area, on the basis of pixel values of pixels in the vicinity of the boundary pixels, replacing the pixel values of the boundary pixels with the second padding pixel value, and outputting a second padded signal, the second padded signal being output as a padded signal; coding step for coding the padded signal and outputting a coded signal; decoding step for decoding the coded signal and outputting a decoded signal; addition step for adding the decoded signal and the prediction image to generate a locally reproduced image; and storage step for temporality storing the locally reproduced image for use in the prediction image generating step. Therefore, when this program is executed by a computer or the like, efficiency in coding is improved.

According to a 143rd aspect of the present invention, in the image coding program recording medium according to the 142nd aspect, the pixel generating step generates the second padding pixel value on the basis of pixel values of significant pixels adjacent to the boundary pixels.

According to a 144th aspect of the present invention, there is provided an image coding program recording medium in which an image coding program is recorded, which program is for coding an input signal comprising an image signal being an array of pixels having pixel values and a significant signal showing whether the image signal is significant or not, and the program comprises: prediction image generating step for specifying, as a target area, an area of the input image signal to be the target of coding, on the basis of the input significant signal, and generating a prediction image for the target area, using a locally reproduced image which is described later; subtraction step for dividing the prediction image into a plurality of small prediction areas, dividing the target area into a plurality of small target areas, subtracting each small prediction area from corresponding small target area, and outputting a differential signal; pixel generating step for generating a padding pixel value using a prescribed function on the basis of pixel values of the significant pixels in the signal output from the subtraction step, replacing pixel values of insignificant pixels in the significant area with the padding pixel value, and outputting a padded signal; shape adaptive orthogonal transform step for orthogonally transforming only the pixel values of the significant pixels in the padded signal, and outputting a shape adaptive orthogonally transformed signal; coding step for coding the shape adaptive orthogonally transformed signal and outputting a shape adaptive coded signal; decoding step for decoding the shape adaptive coded signal and outputting a shape adaptive decoded signal; inverse orthogonal transform step for inversely and orthogonally transforming the decoded signal and outputting a shape adaptive inversely and orthogonally transformed signal; addition step for adding the shape adaptive inversely and orthogonally transformed signal and the prediction image to generate a locally reproduced image; and storage step for temporarily storing the locally reproduced image for use in the prediction image generating step. Therefore, when this program is executed by a computer or the like, efficiency in coding is improved.

According to a 145th aspect of the present invention, there is provided an image coding program recording medium in which an image coding program is recorded, which program is for coding an input signal comprising an image signal being an array of pixels having pixel values and a significant signal showing whether the image signal is significant or not, and the program comprises: prediction image generating step for specifying, as a target area, an area of the input image signal to be the target of coding, on the basis of the input significant signal, and generating a prediction image for the target area, using a locally reproduced image which is described later; subtraction step for dividing the prediction image into a plurality of small prediction areas, dividing the target area into a plurality of small target areas, subtracting each small prediction area from corresponding small target area, and outputting a differential signal; area dividing step for dividing a rectangle area including significant pixels from the differential signal output from the subtraction step using the significant signal, and outputting the rectangle area as a significant area; pixel generating step for generating a padding pixel value using a prescribed function on the basis of pixel values of the significant pixels in the significant area, replacing pixel values of insignificant pixels in the significant area with the padding pixel value, and outputting a padded signal; shape adaptive orthogonal transform step for orthogonally transforming only the pixel values of the significant pixels in the padded signal, and outputting a shape adaptive orthogonally transformed signal; coding step for coding the shape adaptive orthogonally transformed signal and outputting a shape adaptive coded signal; decoding step for decoding the shape adaptive coded signal and outputting a shape adaptive decoded signal; inverse orthogonal transform step for inversely and orthogonally transforming the decoded signal and outputting a shape adaptive inversely and orthogonally transformed signal; addition step for adding the shape adaptive inversely and orthogonally transformed signal and the prediction image to generate a locally reproduced image; and storage step for temporarily storing the locally reproduced image for use in the prediction image generating step. Therefore, when this program is executed by a computer or the like, efficiency in coding is improved.

According to a 146th aspect of the present invention, there is provided an image coding program recording medium in which an image coding program is recorded, which program is for coding an input signal comprising an image signal being an array of pixels having pixel values and a significant signal showing whether the image signal is significant or not, and the program comprises: prediction image generating step for specifying, as a target area, an area of the input image signal to be the target of coding, on the basis of the input significant signal, and generating a prediction image for the target area, using a locally reproduced image which is described later; subtraction step for dividing the prediction image into a plurality of small prediction areas, dividing the target area into a plurality of small target areas, subtracting each small prediction area from corresponding small target area, and outputting a differential signal; pixel generating step for generating a padding pixel value using a prescribed function on the basis of pixel values of the significant pixels in the differential signal, replacing pixel values of insignificant pixels in the significant area with the padding pixel value, and outputting a padded signal; first coding step for coding the padded signal and outputting a first coded signal; second coding step for deciding the order of coding for coded components included in the first coded signal on the basis of the significant signal, and coding the first coded signal according to the decided order, and outputting a second coded signal; addition step for adding the decoded signal and the prediction image to generate a locally reproduced image; and storage step for temporarily storing the locally reproduced image for use in the prediction image generating step. Therefore, when this program is executed by a computer or the like, efficiency in coding is improved.

According to a 147th aspect of the present invention, in the image coding program recording medium according to the 146th aspect, the second coding step decides the order according to the positions of the significant pixels obtained on the basis of the significant signal.

According to a 148th aspect of the present invention, in the image coding program recording medium according to the 146th aspect, the program further comprises coding selecting step for selecting a coding method used by the second coding step, with reference to the significant pixels obtained on the basis of the significant signal.

According to a 149th aspect of the present invention, there is provided an image coding program recording medium in which an image coding program is recorded, which program is for coding an input signal comprising an image signal being an array of pixels having pixel values and a significant signal showing whether the image signal is significant or not, and the program comprises: motion predicting step for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal; prediction image generating step for performing motion compensation using the locally reproduced image and the motion prediction signal, and outputting a prediction image; subtraction step for dividing the prediction image into a plurality of small prediction areas, dividing the target area into a plurality of small target areas, subtracting each small prediction area from corresponding small target area, and outputting a differential signal; coding step for coding the differential signal and outputting a coded signal; decoding step for decoding the coded signal and outputting a decoded signal; addition step for adding the decoded signal and the prediction image to generate a locally reproduced image; and storage step for temporarily storing the locally reproduced image for use in the prediction image generating step. Therefore, when this program is executed by a computer or the like, efficiency in coding is improved.

According to a 150th aspect of the present invention, in the image coding program recording medium according to the 149th aspect, the motion predicting step comprises: a prediction image pixel generating process in which small prediction areas, each area having the same size as the target small area, are obtained by division from at least one locally reproduced image; a prediction image padding pixel value is generated using a prescribed function on the basis of pixel values of significant pixels in each small prediction area; pixel values of insignificant pixels in the small prediction area are replaced with the prediction image padding pixel value; and padded small prediction areas are output: and an optimum small prediction area selecting process in which an optimum small prediction area having a smallest error from the target small area is selected from the padded small prediction areas.

According to a 151st aspect of the present invention, in the image coding program recording medium according to the 149th aspect, the prediction image pixel generating process employs a function that provides the average of the pixel values of the significant pixels.

According to a 152nd aspect of the present invention, there is provided an image coding program recording medium in which an image coding program is recorded, which program is for coding an input signal comprising an image signal being an array of pixels having pixel values and a significant signal showing whether the image signal is significant or not, and the program comprises: pixel generating step for specifying, as a target area, an area of the input image signal to be the target of coding, on the basis of the input significant signal, dividing the target area into a plurality of small target areas, generating a padding pixel value using a prescribed function on the basis of pixel values of significant pixels in each target small area, replacing pixel values of insignificant pixels in the target small area with the padding pixel value, and outputting a padded target small area; motion predicting step for performing motion prediction to the padded target small area using a locally reproduced image that is described later, and outputting a motion prediction signal; prediction image generating step for performing motion compensation using the locally reproduced image and the motion prediction signal, and outputting a prediction image; subtraction step for dividing the prediction image into a plurality of small prediction areas, subtracting each small prediction area from corresponding small target area, and outputting a differential signal; coding step for coding the differential signal and outputting a coded signal; decoding step for decoding the coded signal and outputting a decoded signal; addition step for adding the decoded signal and the prediction image to generate a locally reproduced image; and storage step for temporarily storing the locally reproduced image for use in the prediction image generating step. Therefore, when this program is executed by a computer or the like, efficiency in coding is improved.

According to a 153rd aspect of the present invention, in the image coding program recording medium according to the 152nd aspect, the motion predicting step comprises: a prediction image pixel generating process in which small prediction areas, each area having the same size as the target small area, are obtained by division from at least one locally reproduced image; a prediction image padding pixel value is generated using a prescribed function on the basis of pixel values of significant pixels in each small prediction area; pixel values of insignificant pixels in the small prediction area are replaced with the prediction image padding pixel value; and padded small prediction areas are output: and an optimum small prediction area selecting process in which an optimum small prediction area having a smallest error from the target small area is selected from the padded small prediction areas.

According to a 154th aspect of the present invention, in the image coding program recording medium according to the 136th aspect, the prediction image generating step comprises: motion predicting step for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating step for performing motion compensation using the locally reproduced image and the motion prediction signal, and outputting a compensation image; wherein the compensation image is output as the prediction image.

According to a 155th aspect of the present invention, in the image coding program recording medium according to the 139th aspect, the prediction image generating step comprises: motion predicting step for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating step for performing motion compensation using the locally reproduced image and the motion prediction signal, and outputting a compensation image; wherein the compensation image is output as the prediction image.

According to a 156th aspect of the present invention, in the image coding program recording medium according to the 142nd aspect, the prediction image generating step comprises: motion predicting step for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating step for performing motion compensation using the locally reproduced image and the motion prediction signal, and outputting a compensation image; wherein the compensation image is output as the prediction image.

According to a 157th aspect of the present invention, in the image coding program recording medium according to the 144th aspect, the prediction image generating step comprises: motion predicting step for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating step for performing motion compensation using the locally reproduced image and the motion prediction signal, and outputting a compensation image; wherein the compensation image is output as the prediction image.

According to a 158th aspect of the present invention, in the image coding program recording medium according to the 145th aspect, the prediction image generating step comprises: motion predicting step for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating step for performing motion compensation using the locally reproduced image and the motion prediction signal, and outputting a compensation image; wherein the compensation image is output as the prediction image.

According to a 159th aspect of the present invention, in the image coding program recording medium according to the 146th aspect, the prediction image generating step comprises: motion predicting step for specifying, as a target area, an area of the input image signal to be the target of coding, on the basis of the input significant signal, dividing the target area into a plurality of small target areas, performing motion prediction to the small target areas using the locally reproduced image, and outputting a motion prediction signal; and motion compensating step for performing motion compensation using the locally reproduced image and the motion prediction signal, and outputting a compensation image; wherein the compensation image is output as the prediction image.

According to a 160th aspect of the present invention, there is provided an image coding program recording medium in which an image coding program is recorded, which program is for coding an input signal comprising an image signal being an array of pixels having pixel values and a significant signal showing whether the image signal is significant or not, and the program comprises: temporally close image applicable prediction image generating step for generating a prediction image using an image of the image signal to be the target of coding and an image signal of an image displayed close in time to the target image; subtraction step for producing a difference between the input image and the prediction image, and outputting a differential signal; coding step for coding the differential signal and outputting a coded signal; decoding step for decoding the coded signal and outputting a decoded signal; addition step for adding the decoded signal and the prediction image to generate a locally reproduced image; and storage step for temporarily storing the locally reproduced image for use in the prediction image generating step. Therefore, when this program is executed by a computer or the like, efficiency in coding is improved.

According to a 161st aspect of the present invention, in the image coding program recording medium according to the 160th aspect, the temporally close image applicable prediction image generating step comprises: a target area dividing process in which an area of the input image signal to be the target of coding is specified as a target area according to the significant signal, and at least one small target area is divided from the target area; a small prediction area obtaining process in which small prediction areas corresponding to the target small area and at least one small area adjacent to the target small area are obtained using an image signal of an image displayed temporally before or after the image to be the target of coding; a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

According to a 162nd aspect of the present invention, in the image coding program recording medium according to the 161st aspect, the program further comprises: area dividing step for dividing a rectangle area including significant pixels from the differential signal output from the subtraction step using the significant signal, and outputting the divided rectangle area as a significant area; and pixel generating step for generating a padding pixel value using a prescribed function on the basis of pixel values of significant pixels in the significant area, replacing pixel values of insignificant pixels in the significant area with the padding pixel value, and outputting a padded signal; wherein the coding step codes the padded signal.

According to a 163rd aspect of the present invention, in the image coding program recording medium according to the 160th aspect, the program further comprises: motion predicting step for performing motion compensation to the small target area using the locally reproduced image, and outputting a motion prediction signal; and motion compensation step for performing motion compensation using the locally reproduced image and the motion prediction signal, and outputting a compensation image; wherein the subtraction step and the addition step use the compensation image as the prediction image.

According to a 164th aspect of the present invention, in the image coding program recording medium according to the 163rd aspect, the program further comprises: prediction image pixel generating step for generating a prediction image padding pixel value using a prescribed function on the basis of pixel values of significant pixels in the compensation image, replacing pixel values of insignificant pixels in the compensation image with the prediction image padding pixel value, and outputting a padded prediction image; wherein the subtraction step and the addition step use the compensation image as the prediction image.

According to a 165th aspect of the present invention, in the image coding program recording medium according to the 160th aspect, the program further comprises: shape adaptive orthogonal transform step for orthogonally transforming only pixel values of significant pixels in the differential signal, and outputting a shape adaptive orthogonally transformed signal; wherein the coding step codes the shape adaptive orthogonally transformed signal.

According to a 166th aspect of the present invention, there is provided an image coding program recording medium in which an image coding program is recorded, which program is for coding an input signal comprising an image signal being an array of pixels having pixel values and a significant signal showing whether the image signal is significant or not, and the program comprises: motion predicting step for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal; prediction image generating step for performing motion compensation using the locally reproduced image and the motion prediction signal, and outputting a prediction image; prediction image pixel generating step for dividing at least one small prediction area from an area used for coding, generating a prediction image padding pixel value for each small prediction area, using a prescribed function, on the basis of pixel values of the significant pixels in the small prediction area, replacing pixel values of insignificant pixels in the small prediction area with the prediction image padding pixel value, and outputting a padded small prediction area; subtraction step for subtracting the corresponding padded small prediction area from each target small area, and outputting a differential signal; shape adaptive orthogonal transform step for orthogonally transforming only the pixel values of the significant pixels in the differential signal, and outputting a shape adaptive orthogonally transformed signal; quantization step for quantizing the shape adaptive orthogonally transformed signal and outputting a quantized signal; variable-length coding step for coding the quantized signal and outputting a variable-length coded signal; inverse quantization step for inversely quantizing the coded signal and outputting an inversely quantized signal; inverse orthogonal transform step for inversely and orthogonally transforming the inversely quantized signal and outputting an inversely transformed signal; addition step for adding the inversely transformed signal and the padded small prediction area and outputting a locally reproduced image; and storage step for temporarily storing the locally reproduced image for use in the prediction image generating step. Therefore, when this program is executed by a computer or the like, efficiency in coding is improved.

According to a 167th aspect of the present invention, there is provided an image coding program recording medium in which an image coding program is recorded, which program is for coding an input signal comprising an image signal being an array of pixels having pixel values and a significant signal showing whether the image signal is significant or not, and the program comprises: motion predicting step for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal; prediction image generating step for performing motion compensation using the locally reproduced image and the motion prediction signal, and outputting a prediction image; prediction image pixel generating step for dividing at least one small prediction area from an area used for coding, generating a prediction image padding pixel value for each small prediction area, using a prescribed function, on the basis of pixel values of the significant pixels in the small prediction area, replacing pixel values of insignificant pixels in the small prediction area with the prediction image padding pixel value, and outputting a padded small prediction area; subtraction step for subtracting the corresponding padded small prediction area from each target small area, and outputting a differential signal; coding step for coding the differential signal and outputting a coded signal; decoding step for decoding the coded signal and outputting a decoded signal; addition step for adding the decoded signal and the prediction image to generate a locally reproduced image; storage step for temporarily storing the locally reproduced image for use in the prediction image generating step; and coding and outputting step for outputting the coded signal, and coding the prediction image padding pixel value for each small prediction area when insignificant pixels exist in the small prediction area and outputting the coded pixel value as additional information. Therefore, when this program is executed by a computer or the like, efficiency in coding is improved.

According to a 168th aspect of the present invention, there is provided an image coding program recording medium in which an image coding program is recorded, which program is for coding an input signal comprising an image signal being an array of pixels having pixel values and a significant signal showing whether the image signal is significant or not, and the program comprises: prediction image generating step for specifying, as a target area, an area of the input image signal to be the target of coding, on the basis of the input significant signal, and generating a prediction image for the target area, using pixel values of significant pixels in a locally reproduced image which is described later; subtraction step for dividing the prediction image into a plurality of small prediction areas, dividing the target area into a plurality of small target areas, subtracting each small prediction area from corresponding small target area, and outputting a differential signal; area dividing step for dividing a rectangle area including significant pixels from the differential signal output from the subtraction step using the significant signal, and outputting the rectangle area as a significant area; pixel generating step for generating a padding pixel value using a prescribed function on the basis of pixel values of the significant pixels in the significant area, replacing pixel values of insignificant pixels in the significant area with the padding pixel value, and outputting a padded signal; coding step for coding the padded signal and outputting a coded signal; decoding step for decoding the coded signal and outputting a decoded signal; addition step for adding the decoded signal and the prediction image to generate a locally reproduced image; and storage step for temporarily storing the locally reproduced image for use in the prediction image generating step. Therefore, when this program is executed by a computer or the like, efficiency in coding is improved.

According to a 169th aspect of the present invention, there is provided an image decoding program recording medium in which an image decoding program is recorded, which program is for decoding a coded signal including an image coded signal which is obtained by coding an image, and the program comprises: decoding step for decoding the input coded signal, and outputting a decoded signal; prediction signal generating step for generating a prediction signal on the basis of a reference signal described later; addition step for adding the decoded signal and the prediction signal, and outputting a decoded image signal; and storage step for temporarily storing the decoded image signal as a reference signal for use in the prediction signal generating step. Therefore, when this program is executed by a computer or the like, accurate decoding of efficiently coded data is realized.

According to a 170th aspect of the present invention, there is provided an image decoding program recording medium in which an image decoding program is recorded, which program is for decoding a coded signal including an image coded signal which is obtained by coding an image, and the program comprises: decoding step for decoding the input coded signal, and outputting a decoded signal; prediction signal generating step for generating a prediction signal on the basis of a reference signal described later; prediction image pixel generating step for generating a padding pixel value using a prescribed function on the basis of pixel values of significant pixels in the prediction signal, replacing pixel values of insignificant pixels in the prediction signal with the padding pixel value, and outputting a padded prediction signal; addition step for adding the decoded signal and the padded prediction signal, and outputting a decoded image signal; and storage step for temporarily storing the decoded image signal as a reference signal for use in the prediction signal generating step. Therefore, when this program is executed by a computer or the like, accurate decoding of efficiently coded data is realized.

According to a 171st aspect of the present invention, there is provided an image decoding program recording medium in which an image decoding program is recorded, which program is for decoding a coded signal including an image coded signal which is obtained by coding an image, and the program comprises: decoding step for decoding the input coded signal, and outputting a decoded signal; temporally close image applicable prediction image generating step for generating a prediction image using an image signal of an image which is displayed close in time to an image of a target image signal; addition step for adding the decoded signal and the prediction signal, and outputting a decoded image signal; and storage step for temporarily storing the decoded image signal as a reference signal for use in the temporally close image applicable prediction signal generating step. Therefore, when this program is executed by a computer or the like, accurate decoding of efficiently coded data is realized.

According to a 172nd aspect of the present invention, in the image decoding program recording medium according to the 171st aspect, the temporally close image applicable prediction image generating step comprises: a target area dividing process in which an area of the input image signal to be the target of coding is specified as a target area according to the input significant signal, and at least one small target area is divided from the target area; a small prediction area obtaining process in which small prediction areas corresponding to the target small area and at least one small area adjacent to the target small area are obtained using an image signal of an image displayed temporally before or after the image to be the target of coding; a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

According to a 173rd aspect of the present invention, in the image decoding program recording medium according to the 171st aspect, the temporally close image applicable prediction image generating step comprises: a target area dividing process in which an area of the input image signal to be the target of coding is specified as a target area according to the input significant signal, and at least one small target area is divided from the target area; a small prediction area obtaining process in which small prediction areas corresponding to the target small area and at least one small area adjacent to the target small area are obtained using an image signal of an image displayed temporally before or after the image to be the target of coding; a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

According to a 174th aspect of the present invention, in the image decoding program recording medium according to the 171st aspect, the temporally close image applicable prediction image generating step comprises: a first prediction process for generating a first prediction signal using an image signal of an image displayed temporally before an image of an image signal being the target, and a significant signal; and a second prediction process for generating a second prediction signal using an image signal of an image displayed temporally after the image of the image signal being the target, and the significant signal.

According to a 175th aspect of the present invention, in the image decoding program recording medium according to the 174th aspect, the temporally close image applicable prediction image generating step comprises: a first padding process in which at least one small area is divided from the first prediction signal; a first prediction padding pixel value is obtained for each first small prediction area that is obtained by the division, on the basis of pixel values of significant pixels in the small area, using a first function; pixel values of insignificant pixels in the small area are replaced with the first prediction padding pixel value to generate a first padded small prediction area: a second padding process in which at least one small area is divided from the second prediction signal; a second prediction padding pixel value is obtained for each second small prediction area obtained by the division, on the basis of pixel values of significant pixels in the small area, using a second function; pixel values of insignificant pixels in the small area are replaced with the second prediction padding pixel value to generate a second padded small prediction area: and an averaging process in which corresponding first and second padded small prediction areas are subjected to a weighted averaging process using a third function to obtain an optimum prediction image.

According to a 176th aspect of the present invention, in the image decoding program recording medium according to the 175th aspect, a weighted average of significant pixels is obtained, and the pixel values of the insignificant pixels are replaced with the weighted average padding pixel value so obtained.

According to a 177th aspect of the present invention, in the image decoding program recording medium according to the 171st aspect, the decoding step includes a shape adaptive inverse orthogonal transform step of performing inverse orthogonal transform to coding components obtained by orthogonal transform of only significant pixels in the input signal.

According to a 178th aspect of the present invention, in the image decoding program recording medium according to the 174th aspect, the decoding step includes a shape adaptive inverse orthogonal transform step of performing inverse orthogonal transform to coding components obtained by orthogonal transform of only significant pixels in the input signal.

According to a 179th aspect of the present invention, there is provided an image decoding program recording medium in which an image decoding program is recorded, which program is for decoding a coded signal which is obtained by performing compressive coding to an image signal being an array of pixels having pixel values and a significant signal showing whether the image signal is significant or not while referring to the significant signal, and the program comprises: area dividing step for specifying a coded area in the compressively coded signal, dividing the significant signal corresponding to the specified area into plural small areas, dividing a small rectangle area including significant pixels from each small area, and outputting the small rectangle areas as small significant areas; decoding step for decoding a compressively coded signal in the image signal corresponding to each small significant area, and outputting image decoded signals; and inverse transform calculating step for deciding an inverse transform calculation base with reference to the small significant areas, performing inverse transform calculation to the image decoded signals to obtain inverse transform calculated signals, combining the inverse transform calculated signals with reference to the significant signal, and outputting a decoded signal. Therefore, when this program is executed by a computer or the like, accurate decoding of efficiently coded data is realized.

According to a 180th aspect of the present invention, there is provided an image decoding program recording medium in which an image decoding program is recorded, which program is for decoding a coded signal which is obtained by performing compressive coding to an image signal being an array of pixels having pixel values and a significant signal showing whether the image signal is significant or not while referring to the significant signal, and the program comprises: area dividing step for specifying a coded area in the compressively coded signal, dividing the significant signal corresponding to the specified area into plural small areas, dividing a small rectangle area including significant pixels from each small area, and outputting the small rectangle areas as small significant areas; decoding step for decoding a compressively coded signal in the image signal corresponding to each small significant area, and outputting image decoded signals; first inverse transform calculating step for assigning each of the decoded signals to a one-dimensional small area having a first direction with reference to each small significant area, deciding a calculation base for inverse transform decoding of the one-dimensional small area, performing inverse transform calculation using the calculation base, and outputting first inverse transform calculated signals; second inverse transform calculating step for assigning each of the first inverse transform calculated signals to a one-dimensional small area having a second direction different from the first direction with reference to the small significant area, deciding a calculation base for inverse transform decoding of the one-dimensional small areas, performing inverse transform calculation using the calculation base to obtain second inverse transform calculated signals, combining the second inverse transform calculated signals, and outputting a decoded signal. Therefore, when this program is executed by a computer or the like, accurate decoding of efficiently coded data is realized.

According to a 181st aspect of the present invention, there is provided an image decoding program recording medium in which an image decoding program is recorded, which program is for decoding a coded signal which is obtained by performing compressive coding to an image signal being an array of pixels having pixel values and a significant signal showing whether the image signal is significant or not while referring to the significant signal, and the program comprises: area dividing step for specifying a coded area in the compressively coded signal, and dividing the significant signal corresponding to the specified area into plural small areas; first decoding step for selecting the coding order according to the positions of the significant pixels in each small area, performing decoding to the compressively coded signal corresponding to the small area, and outputting a first decoded signal; and second decoding step for decoding the first decoded signal and outputting a second decoded signal. Therefore, when this program is executed by a computer or the like, accurate decoding of efficiently coded data is realized.

According to a 182nd aspect of the present invention, there is provided an image decoding program recording medium in which an image decoding program is recorded, which program is for decoding an input signal comprising a coded signal, which is obtained by performing compressive coding to an image signal being an array of pixels having pixel values and a significant signal showing whether the image signal is significant or not while referring to the significant signal, and additional information, and the program comprises: decoding step for decoding the input coded signal, and outputting a decoded signal; prediction signal generating step for generating a prediction signal on the basis of a reference signal described later, with reference to the significant signal; prediction image pixel generating step for generating a padding pixel value on the basis of decoded addition information obtained by decoding the additional information, replacing insignificant pixels in the prediction signal with the padding pixel value, and outputting a padded prediction signal; addition step for adding the decoded signal and the padding prediction signal, and outputting a decoded image signal; and storage step for temporarily storing the decoded image signal as a reference signal for use in the prediction signal generating step. Therefore, when this program is executed by a computer or the like, accurate decoding of efficiently coded data is realized.

DETAILED DESCRIPTION OF THE PREFERRED EMBODIMENTS

Embodiment 1

In an image coding apparatus according to a first embodiment of the invention, an area including significant pixels is divided, and padding is performed to the area by replacing insignificant pixels in the area with pixels having an appropriate pixel value, thereby to improve the efficiency in coding.

Figure 1:
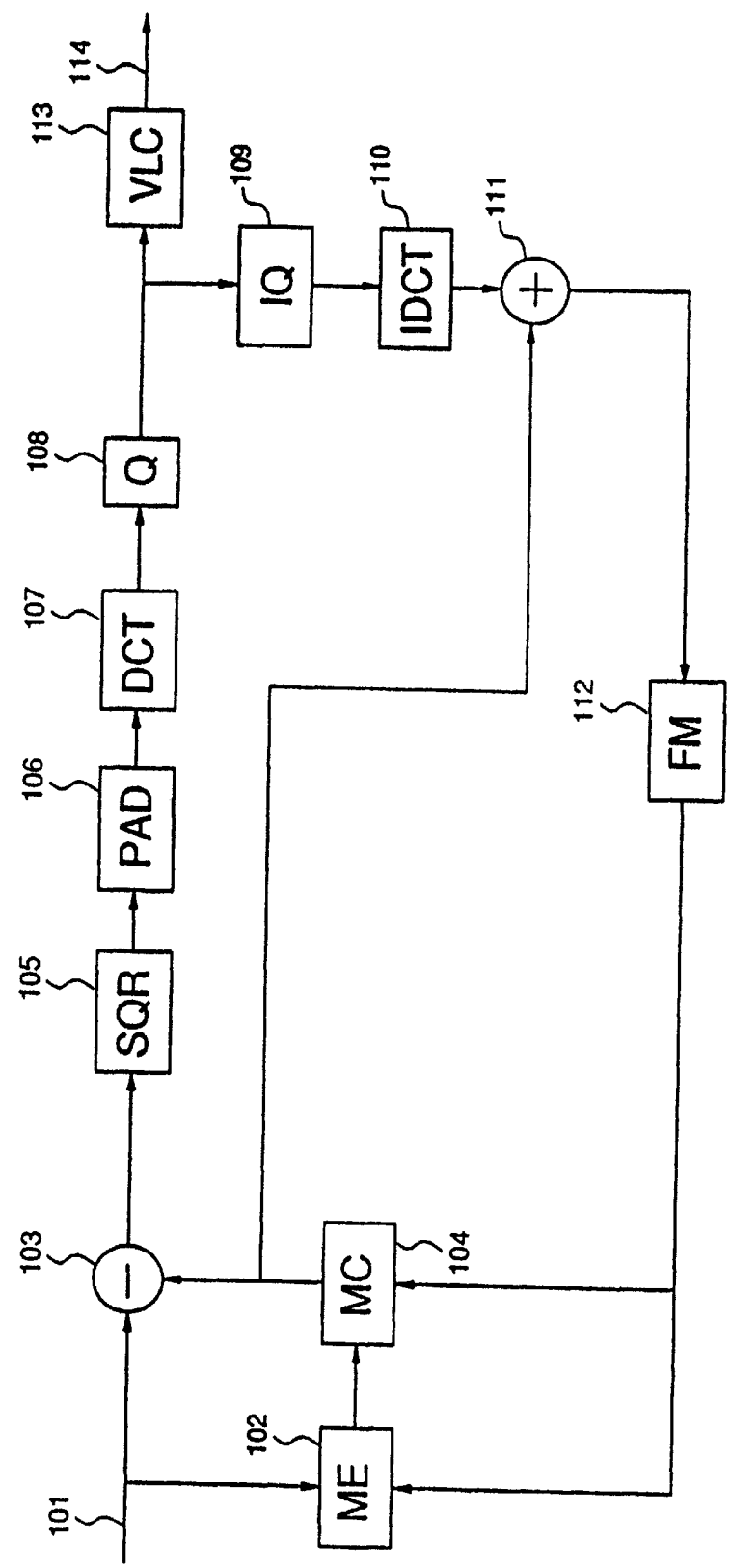
FIG. 1 is a block diagram illustrating an image coding apparatus according to a first embodiment of the present invention.

FIG. 1 is a block diagram illustrating an image coding apparatus according to the first embodiment of the present invention. In FIG. 1, reference numeral 101 designates an input signal being the target of coding, which is input to the image coding apparatus. A motion vector detector 102 detects a motion vector of the input signal 101 using a reference image that is described later. A differentiator 103 calculates a difference between the input signal 101 and a prediction image which is described later, and outputs the result as differential data. A prediction image generator (motion compensator) 104 generates a motion-compensated prediction image using, as a reference image, a decoded image stored in a frame memory that is described later, on the basis of the motion vector detected by the motion vector detector 102. An area divider 105 performs division to the differential value of each pixel included in the differential data output from the differentiator 103, into a square significant area including significant pixels and the other area. A pixel generator 106 generates a padding pixel value on the basis of the pixel values in the significant area, performs padding to the significant area using the padding pixel value, and outputs padded data. An orthogonal transformer 107 performs orthogonal transform on the basis of the correlation of image to the padded data by discrete cosine transform (DCT), and outputs transformed data. A quantizer 108 performs compression to the transformed data by quantization, and outputs quantized data. A variable length coder 113 performs compressive coding to the quantized data on the basis of the correlation of the quantized data, and outputs coded data 114. The coded data 114 is the coding result by the image coding apparatus according to this first embodiment. An inverse quantizer 109 performs inverse quantization to the quantized data, and outputs inversely quantized data. An inverse orthogonal transformer 110 performs inverse orthogonal transform to the inversely quantized data, and outputs inversely transformed data. An adder 111 adds the inversely transformed data to the prediction image to produce a decoded image, and outputs the decoded image to a frame memory 112. The frame memory 112 stores the decoded image which is used as a reference image (locally reproduced image).

The operation of the image coding apparatus so constructed will be described hereinafter. Initially, the input signal 101 is input to the image coding apparatus. The input signal 101 is composed of an image signal that comprises an array of pixels, and a two-dimensional significant signal that shows, for each pixel in the image signal, whether the value of the pixel is significant or not. The input image signal is applied to the motion vector detector 102 and the differentiator 103.

The motion vector detector 102 detects a motion vector in the image signal using the reference image obtained from the frame memory 112, and outputs the motion vector to the prediction image generator 104. The prediction image generator 104 performs motion compensation to the reference image obtained from the frame memory 112 using the motion vector output from the motion vector detector 102, and outputs a prediction image obtained as a result of the motion compensation to the differentiator 103 and the adder 111.

The differentiator 103 calculates a difference between the image signal and the prediction image, and outputs the result to the area divider 105 as differential data. The area divider 105 divides a square area including significant pixels from the differential data to obtain a significant area, and outputs the significant area to the pixel generator 106. The pixel generator 106 generates a padding pixel value by a prescribed function using the pixel values of significant pixels included in the significant area, replaces the pixel values of insignificant pixels included in the significant area with the padding pixel value, and outputs the significant area, as padded data, to the orthogonal transformer 107.

Figure 2:
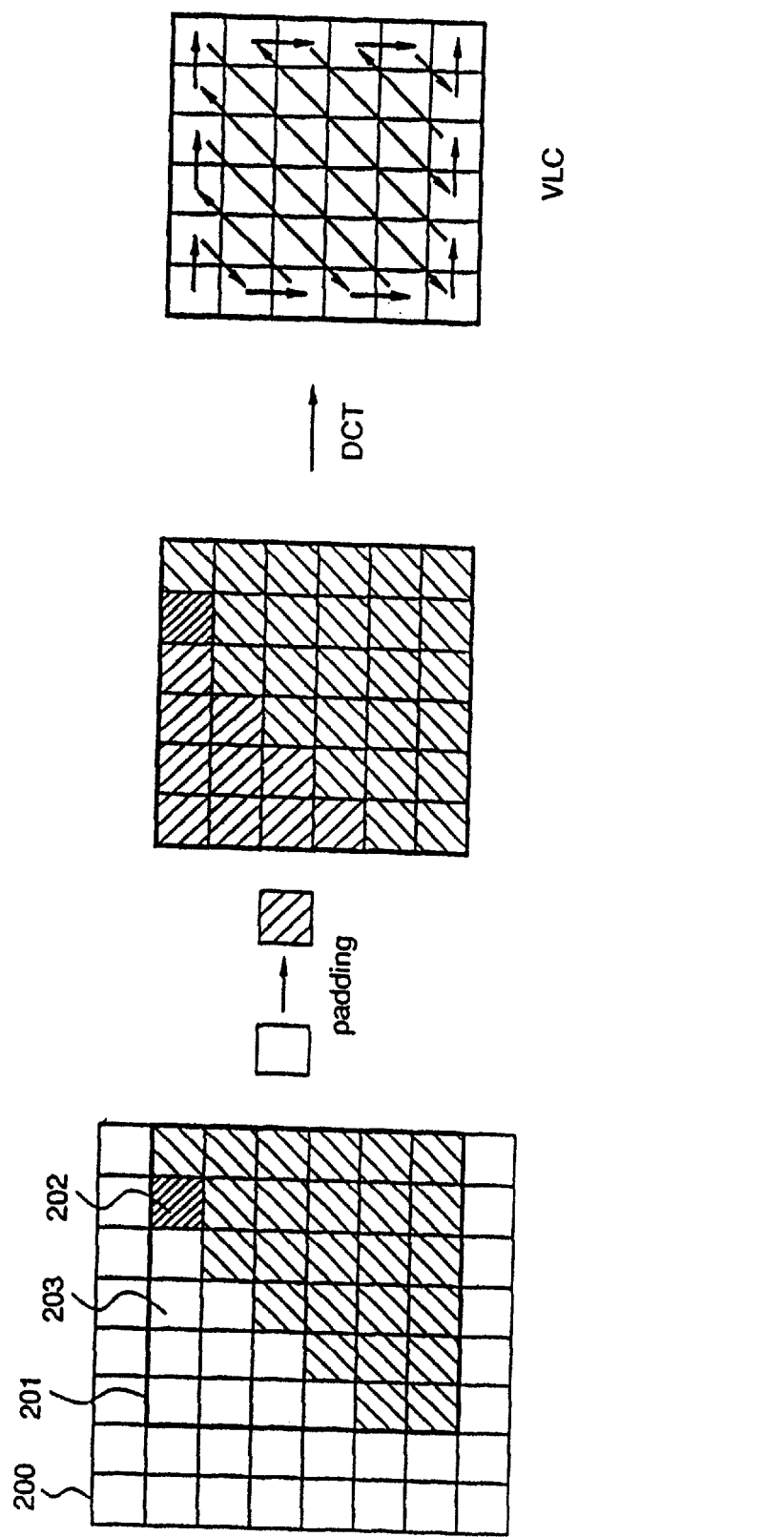
FIG. 2 is a diagram for explaining a coding process according to the first embodiment of the invention.

FIG. 2 is a diagram for explaining the operation of the area separator 105 and the pixel generator 106 in more detail. In FIG. 2, reference numeral 200 designates differential data output from the differentiator 103. The differential data is input to the area divider 105 as a signal divided into 8×8 blocks. Each block shows a pixel. White blocks show insignificant pixels, and hatched blocks show significant pixels. The area divider 10 divides an area 201 including significant pixels from the signal 200, and outputs the significant area 201 to the pixel generator 106.

In the pixel generator 106, the pixel value of a significant pixel 202 included in the significant area 201 is input to a prescribed function and processed, whereby a padding pixel value is obtained. More specifically, a functional process employed in this first embodiment is to obtain the average of pixel values of the significant pixels in the significant area 201. using the average as a padding pixel value, insignificant pixels in the significant area 201 are replaced with pixels having the padding pixel value, providing padded data. The padded data is input to the orthogonal transformer 107. As described above, when insignificant pixels are coded together with significant pixels, the inter-pixel correlation reduces, resulting in a reduction in the coding efficiency. In this first embodiment, however, since the above-mentioned padding is performed, in the padded data, the pixel values are approximately continuous at the boundaries between the significant pixels and the insignificant pixels in the horizontal and vertical directions, and the inter-pixel correlation in the significant area is improved as compared with that before the padding, resulting in improved coding efficiency.

The orthogonal transformer 107 transforms the padded data, and outputs orthogonally transformed data to the quantizer 108. The quantizer 108 quantizes the orthogonally transformed data, and outputs quantized data to the variable-length coder 113 and to the inverse quantizer 109. In the orthogonal transformer 107 and the quantizer 108, only the padded data and the orthogonally transformed data, which are based on the significant area, are subjected to the process. Accordingly, the quantizer 108 performs quantization by selecting a quantization table corresponding to the square area forming the significant area. The variable-length coder 113 performs zigzag scanning along the arrows shown in FIG. 2, whereby the quantized data supplied from the quantizer 108 is subjected to variable-length coding, and coded data 114 is output from the apparatus.

On the other hand, the inverse quantizer 109 performs inverse quantization to the input quantized data, and outputs inversely quantized data to the inverse orthogonal transformer 110. The inverse orthogonal transformer 110 performs inverse orthogonal transform to the inversely quantized data, and outputs inversely transformed data to the adder 111. In the adder 111, the inversely transformed data is added to the prediction image output from the prediction image generator 104, resulting in a decoded image. The decoded image is input to the frame memory 112 and stored therein, and it is used as a reference image.

As described above, according to the first embodiment of the invention, since the image coding apparatus is equipped with the area divider 105 and the pixel generator 106, only an area including significant pixels is subjected to the process. Further, the data correlation is increased by the padding process. Therefore, the efficiency in coding is improved.

Since the present invention is aimed principally at improving the efficiency in coding the image signal, description of coding of the significant signal included in the input signal 101 is omitted. However, the significant signal is coded separately from the image signal, and the coding result of the significant signal is output together with the coding result of the image signal 114, and these results are used for decoding.

Further, by appropriately setting the area divider 105, it is possible to divide a significant area with the n-th power of 2 ($2^n$) as the unit. In this case, when the process is realized by a computer, data well adapted to the computer is obtained, resulting in an increase in the processing speed.

Embodiment 2

In an image coding apparatus according to a second embodiment of the invention, division of a significant area, padding, and orthogonal transform are repeated in different two directions, whereby the efficiency in coding is improved.

Figure 3:
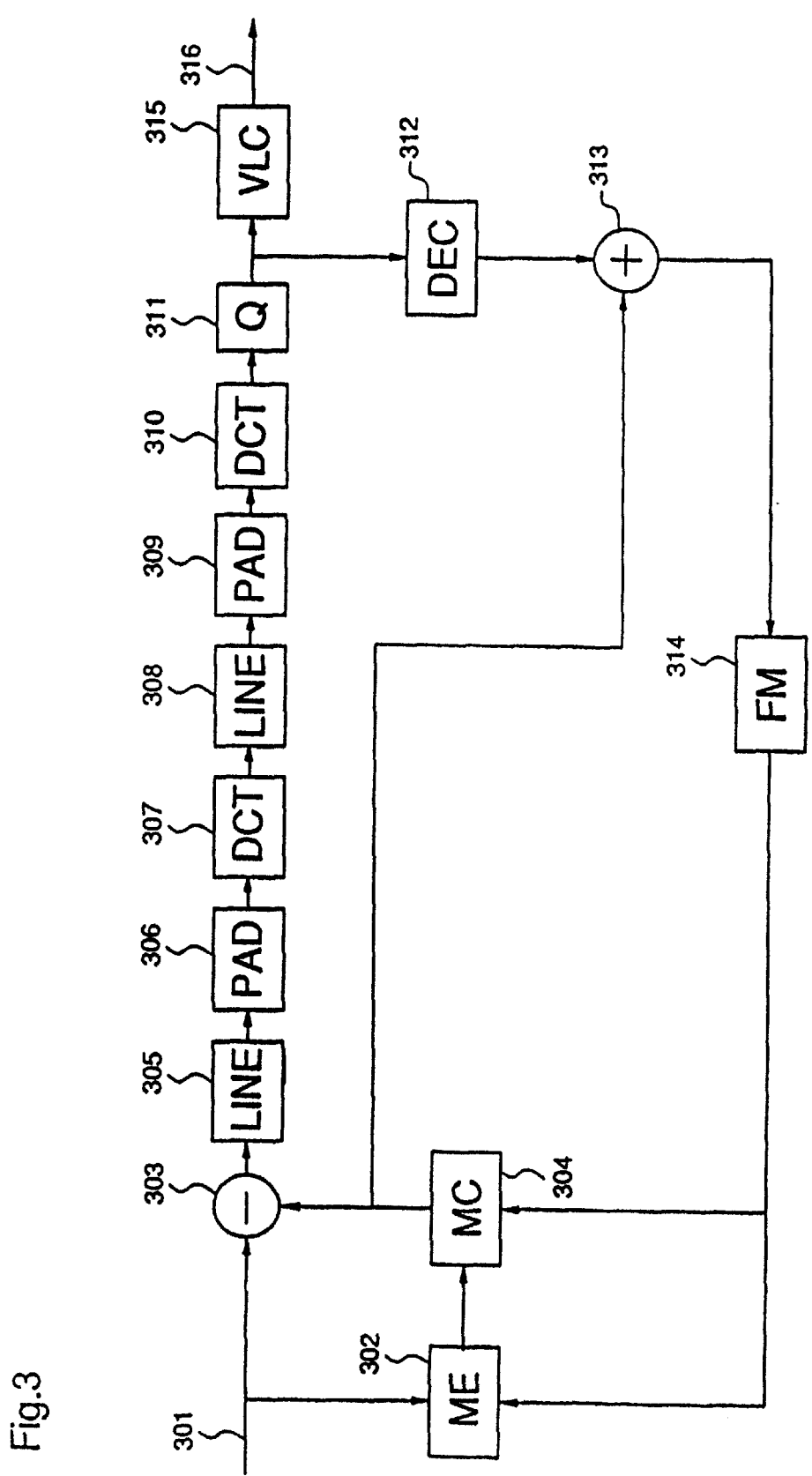
FIG. 3 is a block diagram illustrating an image coding apparatus according to a second embodiment of the present invention.

FIG. 3 is a block diagram illustrating an image coding apparatus according to the second embodiment of the present invention. In FIG. 3, a first area divider 305 perform division of a significant area from two-dimensional data in a particular direction to obtain a one-dimensional significant area having a size of $2^n$ (the n-th power of 2). A pixel generator 306 performs padding to the divided significant area. A first orthogonal transformer 307 performs orthogonal transform to padded data output from the pixel generator 306. A second area divider 308 performs division of an area from the data transformed by the first orthogonal transformer 307 in a direction different from the direction along which the first area divider 305 performs the division. A coding component generator 309 generates a padding coding component for the data divided by the second area divider 308 on the basis of the coding component obtained as a result of the transform by the first orthogonal transformer 307, and performs padding using the padding coding component. A second orthogonal transformer 310 performs orthogonal transform to the data padded by the coding component generator 309. Other parts are identical to those already described for the first embodiment and, therefore, do not require repeated description. In addition, the first area divider 305 and the second area divider 308 perform division in the horizontal direction and the vertical direction, respectively.

The operation of the image coding apparatus so constructed will be described hereinafter.

An input signal 301, comprising an image signal and a significant signal, is input to the apparatus, and the image signal is input to the motion detector 302 and the differentiator 303. Detection of a motion vector by the motion detector 302, generation of a prediction image by the prediction image generator 304, and calculation of differential data by the differentiator 303 are identical to those already described for the first embodiment.

The first area divider 305 divides the differential data in the horizontal direction to obtain a one-dimensional significant area that includes a significant portion and comprises $2^n$ pixels, and outputs this area to the pixel generator 306. In the pixel generator 306, using the pixel values of significant pixels included in the significant area, a padding pixel value is obtained by a prescribed function, and the pixel values of insignificant pixels in the significant area are replaced with the padding pixel value. The significant area so replaced is input to the orthogonal transformer 307 as padded data. The orthogonal transformer 307 performs orthogonal transform to the padded data, and outputs the result to the second area divider 308. In the second area divider 308, using the data output from the orthogonal transformer 307, two-dimensional coding components are generated, and the two-dimensional coding components are divided in the vertical direction to obtain one-dimensional areas each comprising $2^n$ coding components. In the coding component generator 309, a padding coding component is obtained by a prescribed function, for each one-dimensional area, on the basis of the coding components obtained by the first orthogonal transformer 307. Then, coding components other than the coding components obtained by the first orthogonal transformer 307 in each area are replaced with the padding coding component, and data obtained as a result of the replacement is output to the second orthogonal transformer 310. The subsequent process is identical to that mentioned for the first embodiment.

Figure 4:
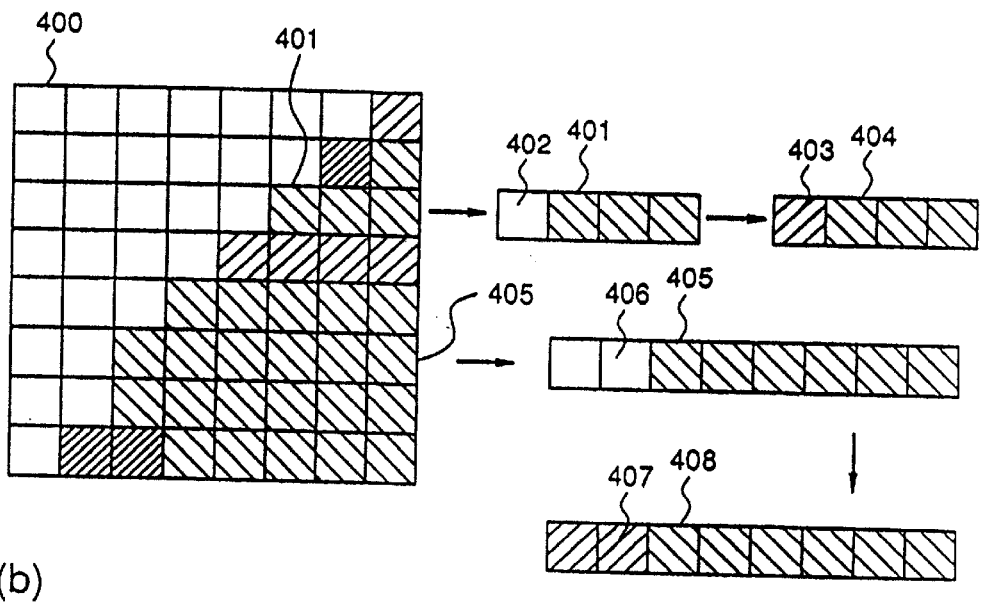
FIGS. 4(a) and 4(b) are diagrams for explaining a coding process according to the second embodiment of the invention.
Figure 4:
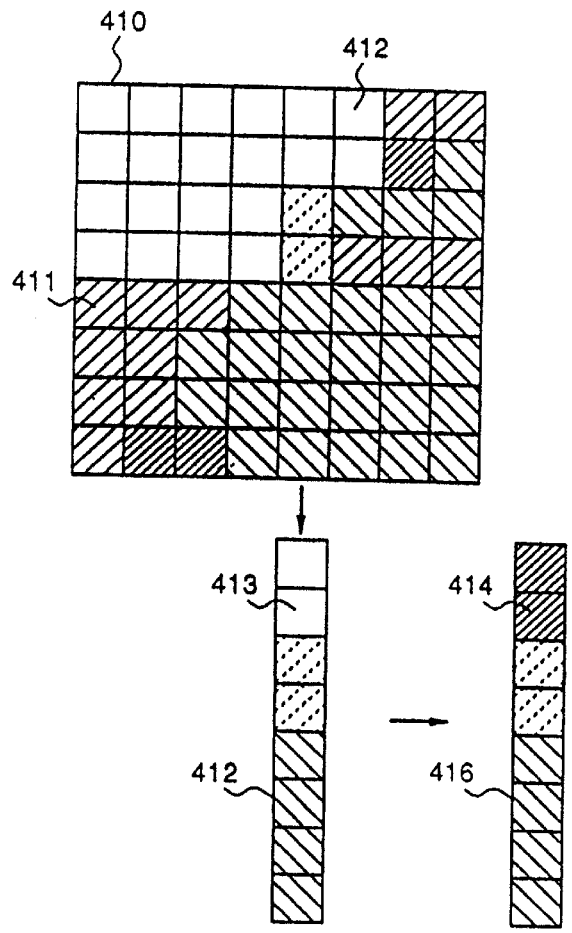

FIGS. 4(a) and 4(b) are diagrams for explaining the above-mentioned division and padding process in more detail. In the figures, reference numeral 400 designates a two-dimensional data input to the first area divider 305. As in FIG. 2 used for explaining the first embodiment, each block shows a pixel, and white blocks show insignificant pixels. The first area divider 305 performs division in the horizontal direction. For example, an area 401 including significant pixels is divided as a one-dimensional area comprising $2^2$ pixels and input to the pixel generator 306.

In the pixel generator 306, the one-dimensional area 401 is subjected to the same padding process as mentioned for the first embodiment. That is, using the pixel values of the significant pixels included in the area 401, a padding pixel value is obtained, and an insignificant pixel 402 in the area 401 is replaced with a pixel 403 having the padding pixel value. The data 404 obtained as a result of the replacement (padding) is input to the first orthogonal transformer 307, wherein the data 404 is subjected to orthogonal transform.

Likewise, the first area divider 305 divides an area 405 including significant pixels as a one-dimensional area comprising $2^3$ pixels. In the image generator 308, insignificant pixels 406 in the area 405 are replaced with pixels 407 each having a padding pixel value, resulting in padded data 408.

As a result of the division into plural areas and the padding and orthogonal transform for each area, two-dimensional data 410 is obtained. Coding components 411 included in the data 410 are components generated in the transform process by the first orthogonal transformer 307. As shown in FIG. 4(b), the second area divider 308 performs division of the two-dimensional data 410 in the vertical direction. In the figure, for example, an area 412 is divided. In the area 412, white portions 413 show components which are not the target of coding. In the coding component generator 309, a padding coding component is obtained by a prescribed function, for example, addition and averaging, using the coding target components in the area 412. Then, the components 413 in the area 412 are replaced with the padding coding component to obtain padded data 416. Since the padded data 416 has high correlations between the respective coding components, the coding efficiency is improved when this data is processed in the second orthogonal transformer 310.

Figure 5:
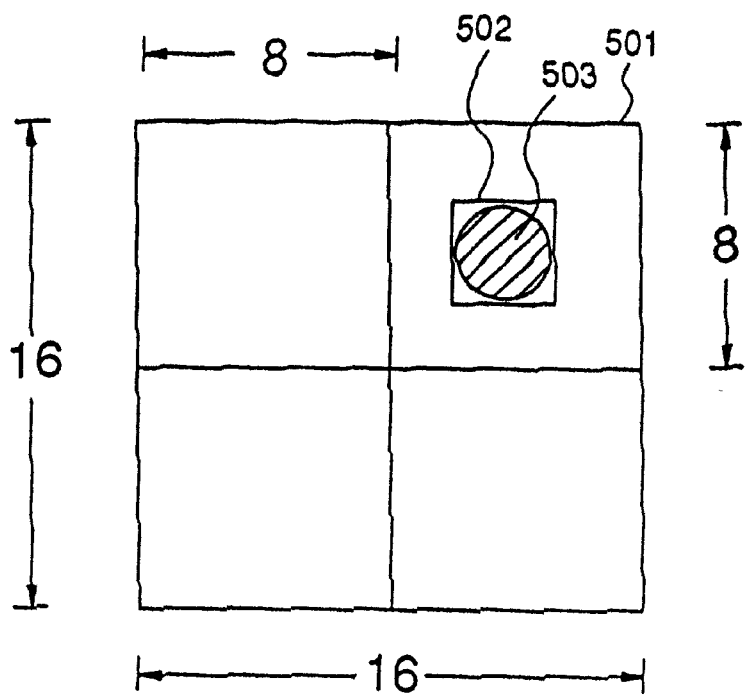
FIGS. 5(a) and 5(b) are diagrams for explaining a coding process according to the second embodiment of the invention.
Figure 5:
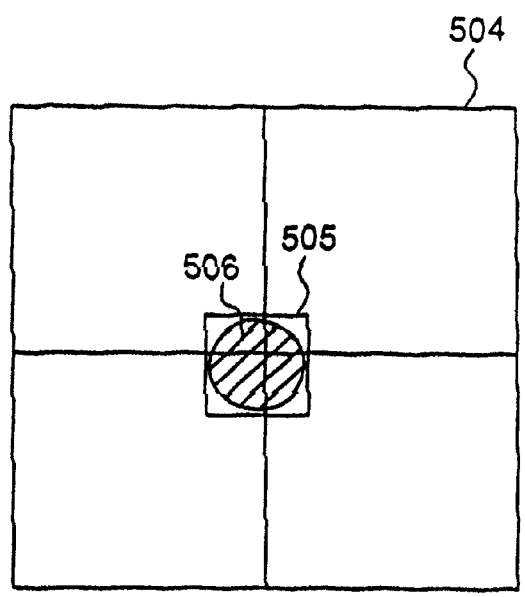

FIGS. 5(a) and 5(b) are diagrams for explaining the effect of the area division performed in the image coding apparatus according to the second embodiment of the invention. In FIG. 5(a), reference numeral 501 designates two-dimensional data to be processed, and it is divided into four areas. Likewise, in FIG. 5(b), reference numeral 504 designates two-dimensional data to be processed, and it is divided into four areas. In the ordinary process, each of the four areas is processed, and a correlation between adjacent areas is utilized.

In FIG. 5(a), since a significant portion 503 is included in one of the four areas, a small area 502 including the significant portion 503 is divided as the processing target. On the other hand, when a significant portion 506 exists over the four areas as shown in FIG. 5(b), the whole two-dimensional data 504 is used as the processing target, and a small area 505 including the significant portion 506 is divided. In the latter case, the processing efficiency is improved as compared with the case where each of the four areas is processed.

As described above, in the image coding apparatus according to the second embodiment, by the first area divider 305, the pixel generator 306, and the first orthogonal transformer 307, two-dimensional data is subjected to division in a particular direction to obtain a significant area, and the significant area is subjected to padding and orthogonal transform. Thereafter, by the second area divider 308, the coding component generator 309, and the second orthogonal transformer 310, division in another direction and padding are performed, followed by second orthogonal transform. Therefore, the inter-component correlation in the coding target data is increased, resulting in improved coding efficiency.

Since the area division is performed so that each area has a size of $2^n$, it is possible to obtain data well adapted to process by a computer or the like, resulting in an increase in the processing speed.

Embodiment 3

In an image coding apparatus according to a third embodiment of the invention, correlation at the boundary between a significant portion and an insignificant portion is increased by padding to increase the efficiency in coding.

Figure 6:
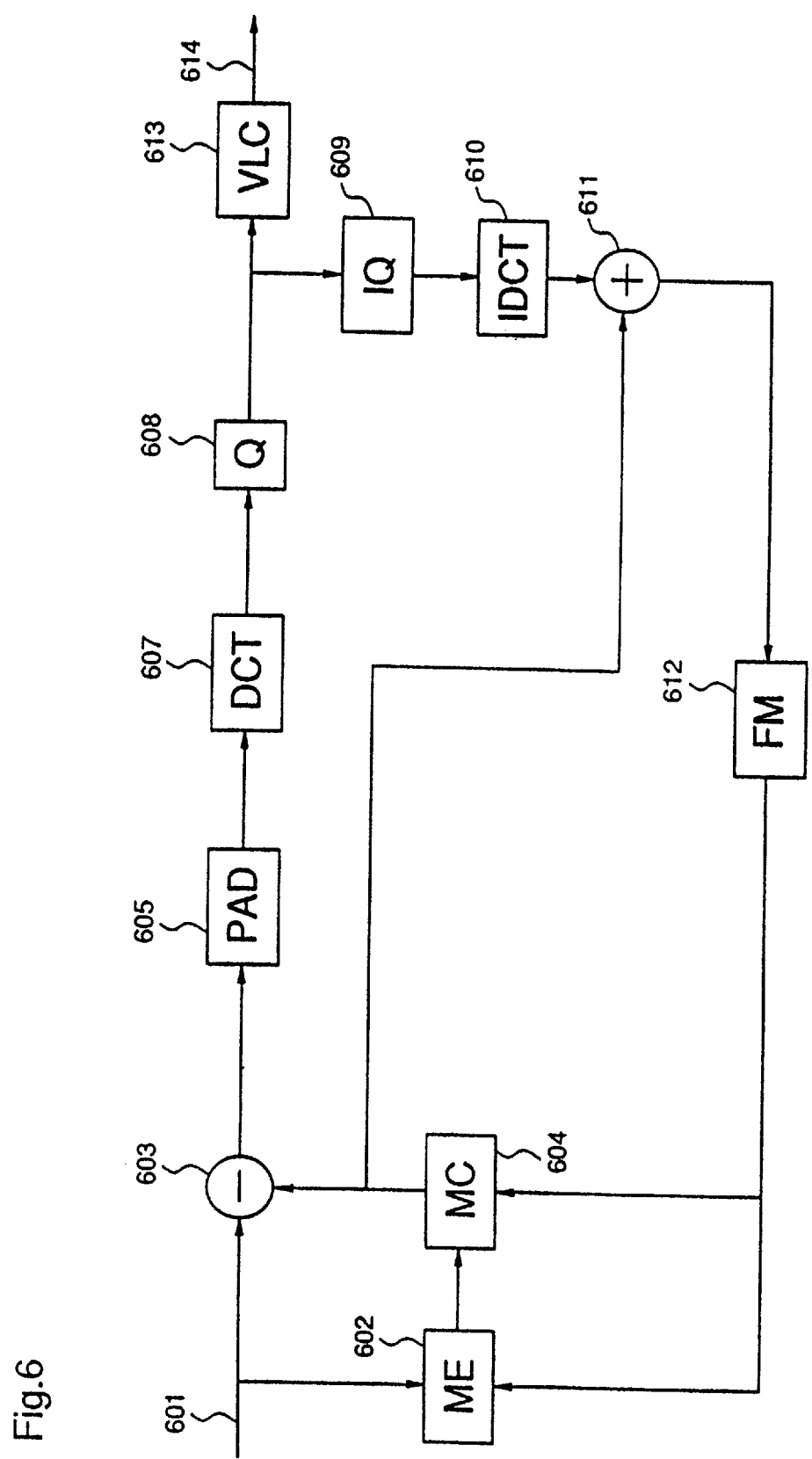
FIG. 6 is a block diagram illustrating an image coding apparatus according to a third embodiment of the present invention.

FIG. 6 is a block diagram illustrating an image coding apparatus according to a third embodiment of the invention. in FIG. 6, a pixel generator 605 performs two-stage padding that is later described in more detail. The image coding apparatus according to this third embodiment is identical to the apparatus according to the first embodiment except that the process by the pixel generator 605 differs and that no area divider is included. Other parts are identical to those already described for the first embodiment and, therefore, do not require repeated description.

Hereinafter, the operation of the image coding apparatus so constructed will be described.

An input signal 601, comprising an image signal and a significant signal, is input to the apparatus, and the image signal is input to the motion detector 602 and to the differentiator 603. Detection of a motion vector by the motion detector 602, generation of a prediction image by the prediction image generator 604, and calculation of differential data by the differentiator 603 are identical to those already described for the first embodiment. The differential data is input to the pixel generator 605.

Figure 7:
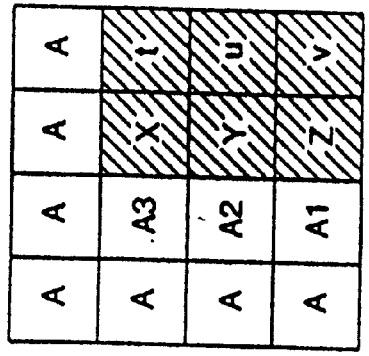
FIGS. 7(a)–7(c) are diagrams for explaining a coding process according to the third embodiment of the invention.
Figure 7:
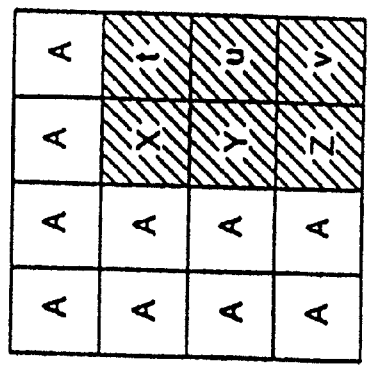
Figure 7:
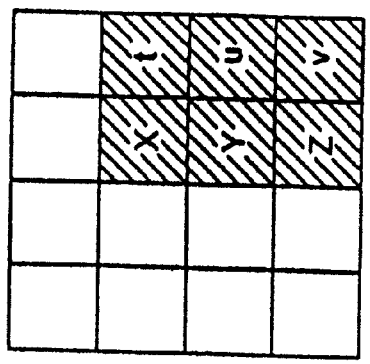

FIGS. 7(a)–7(c) are diagrams for explaining the operation of the pixel generator 605. FIG. 7(a) shows data being the processing target, and the data has 4×4 pixels. As in FIG. 2 used for explaining the first embodiment, each block shows a pixel, and white blocks show insignificant pixels. Significant pixels have pixel values X, Y, Z, t, u, v, respectively.

FIG. 7(b) shows the first stage of the process. In this stage, the pixel generator 605 generates a first padding pixel value in a prescribed functional process using the pixel values of the significant pixels. In this case, the average A of the pixel values of the significant pixels (A=(X+Y+Z+t+u+v)/6) is obtained as a first padding pixel value. Then, insignificant pixels in the target data are replaced with the first padding pixel value A to obtain first padded data. This stage is identical to the padding process according to the first embodiment, and the correlation is improved as described for the first embodiment.

Next, the second stage of process is executed as shown in FIG. 7(c). In the pixel generator 605, for insignificant pixels respectively abutting on the significant pixels x, y, and z, second padding pixel values are obtained in a prescribed second functional process using the pixel values of these significant pixels and the first padding pixel value A obtained in the first stage. In this case, by the formulae shown in FIG. 7(c), second padding pixel values A1, A2, and A3 are obtained, and the insignificant pixels are replaced with pixels having these pixel values.

The data so processed is output from the pixel generator 605 and input to the orthogonal transformer 607, followed by the same process as mentioned for the first embodiment of the invention.

As described above, in the image coding apparatus according to the third embodiment of the invention, the pixel generator 605 performs the two-stage process comprising the first stage using the first padding pixel value on the basis of the significant portion, and the second stage using the second padding pixel value which is obtained by processing the first padding pixel value using the pixel value at the boundary between the significant portion and the insignificant portion, whereby the correlation at the boundary between the significant portion and the insignificant portion is further increased. Therefore, the coding efficiency is further increased as compared with the image coding apparatus according to the first embodiment in which only the first stage is performed.

According to the third embodiment of the invention, in the second stage of the padding process, the second padding pixel value is obtained using the first padding pixel value and the pixel value of the significant pixel adjacent to the insignificant pixel. However, this is merely an example, and the significant pixel used for obtaining the second padding pixel value is not restricted to the adjacent one. That is, pixel values of plural pixels in the vicinity of the insignificant pixel may be used. For example, two pixels, four pixels, or eight pixels in the vicinity of the insignificant pixel may be used. Alternatively, some blocks appropriately selected from these blocks (i.e., two pixels, four pixels, eight pixels, . . . ) may be used. Also in these cases, the correlation is increased and the coding efficiency is improved.

In this case, other than the formulae shown in FIG. 7(c), the following formulae can be employed: A3=(A+X+1)/2, A2=(A+Y+1)/2, A1=(A+Z+1)/2.

Furthermore, although insignificant pixels adjacent to the significant area are replaced in the second stage of the padding process, insignificant pixels to be replaced are not restricted to the adjacent ones. For example, appropriately selected insignificant pixels in the vicinity of the significant area may be replaced. Also in this case, correlation is increased and efficiency in coding is improved.

Embodiment 4

In an image coding apparatus according to a fourth embodiment of the invention, in a variable-length coding process, zigzag scanning in response to a significant signal is performed to improve the efficiency in coding.

Figure 8:
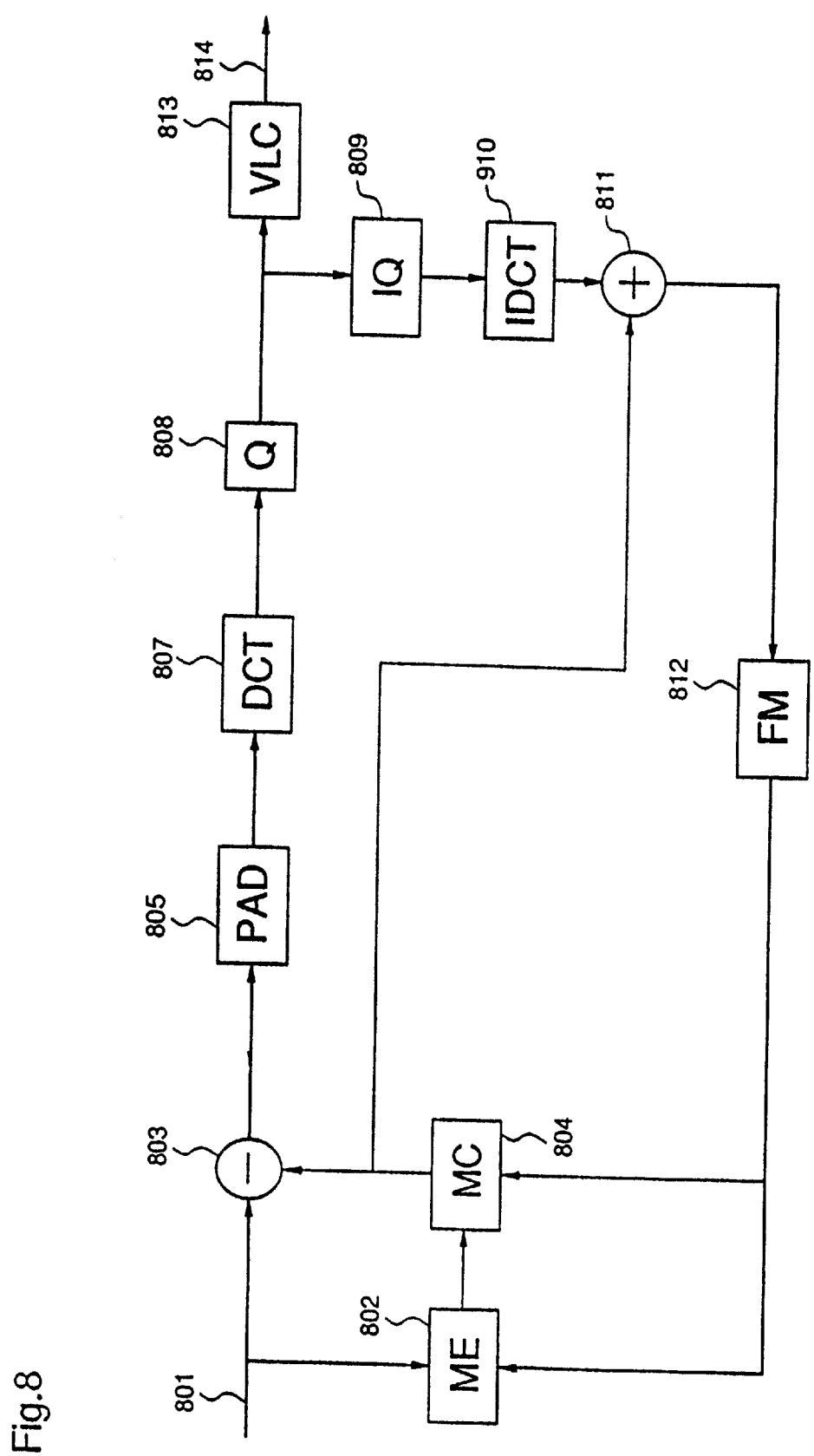
FIG. 8 is a block diagram illustrating an image coding apparatus according to a fourth embodiment of the present invention.

FIG. 8 is a block diagram illustrating an image coding apparatus according to the fourth embodiment of the invention. In FIG. 8, a variable-length coder 813 performs variable-length coding including zigzag scanning that is later described in more detail. Other parts are identical to those already described for the third embodiment.

A description is given of the operation of the image coding apparatus according to the fourth embodiment of the invention. Like the first embodiment of the invention, an input signal 801 comprises an image signal and a significant signal. In this fourth embodiment, the significant signal is input to the variable-length coder 813. On the other hand, the image signal is processed in the same manner as described for the third embodiment until it is quantized by the quantizer 808 and output as quantized data.

Figure 9:
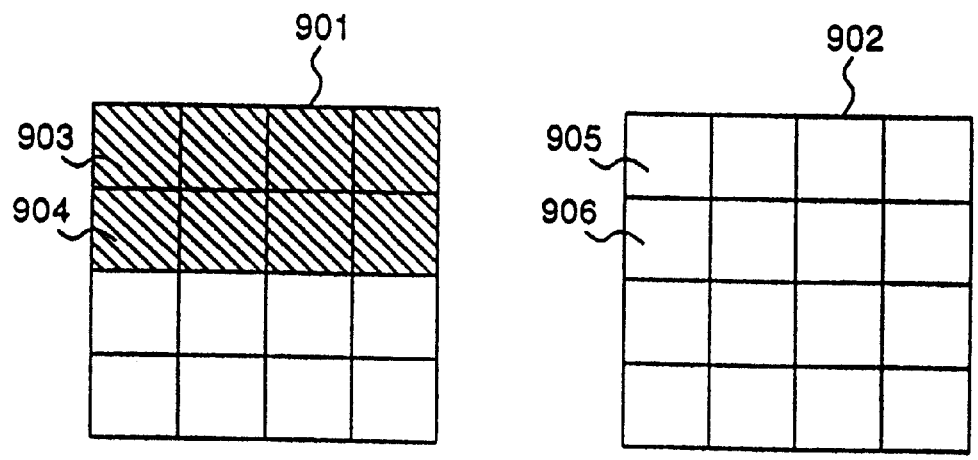
FIGS. 9(a) and 9(b) are diagrams for explaining a coding process according to the fourth embodiment of the invention.
Figure 9:
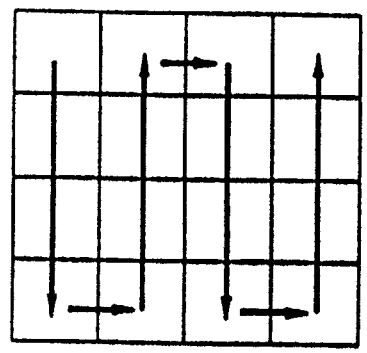

FIGS. 9(a) and 9(b) are diagrams for explaining the process by the variable-length coder 813, In FIG. 9(a), reference numeral 901 designates an input significant signal, and numeral 902 designates an input image signal. In the significant signal 901, white blocks show insignificant pixels, and hatched blocks show significant pixels. In the image signal 902, white blocks merely show pixels having pixel values, regardless of significant or insignificant, and information whether these pixel are significant or insignificant is given by the significant signal 901. In the significant signal 901, pixels 903 and 904 are significant, thereby providing information that corresponding pixels 905 and 906 in the image signal 902 are significant.

In the process of the variable-length coder 813, zigzag scanning is usually performed as shown in FIG. 2 according to the first embodiment. In this fourth embodiment, however, the variable-length coder 813 decides a pattern of zigzag scanning for the image signal 902, referring to the significant signal 901. For example, referring to the significant signal 901 shown in FIG. 9(*a*), the coder 813 decides a zigzag scanning pattern shown in FIG. 9(*b*) for the quantized data obtained from the image signal 902. Since it is possible to estimate the distribution of coding components in the quantized data by referring to the significant signal 901 corresponding to the image signal 902, the scanning direction can be decided according to the distribution so that pixels of high correlation are successively scanned, whereby the coding efficiency is improved.

As described above, according to the fourth embodiment of the invention, since the image coding apparatus is equipped with the variable-length coder 813 that can decide the zigzag scanning pattern with reference to the input significant signal, variable-length coding is performed while scanning pixels of high correlation with priority, whereby the efficiency in the variable-length coding is improved.

Although in this fourth embodiment only one pattern of zigzag scanning is proposed, it is possible to scan the quantized data while changing plural patterns according to the significant signal, by appropriately setting the variable-length coder 813. Also in this case, the coding efficiency can be improved.

Further, although the image coding apparatus according to this fourth embodiment is based on the third embodiment in which the pixel generator performs two-stage padding, the pixel generator 805 employed in this fourth embodiment may be one performing single-stage padding according to the first embodiment. Furthermore, in the first and second embodiments, the variable-length coder according to this fourth embodiment may be employed. Also in these cases, the efficiency in the variable-length coding is improved.

Embodiment 5

In an image coding apparatus according to a fifth embodiment of the invention, in detection of motion vector, a process base on padding is performed to a prediction image.

Figure 10:
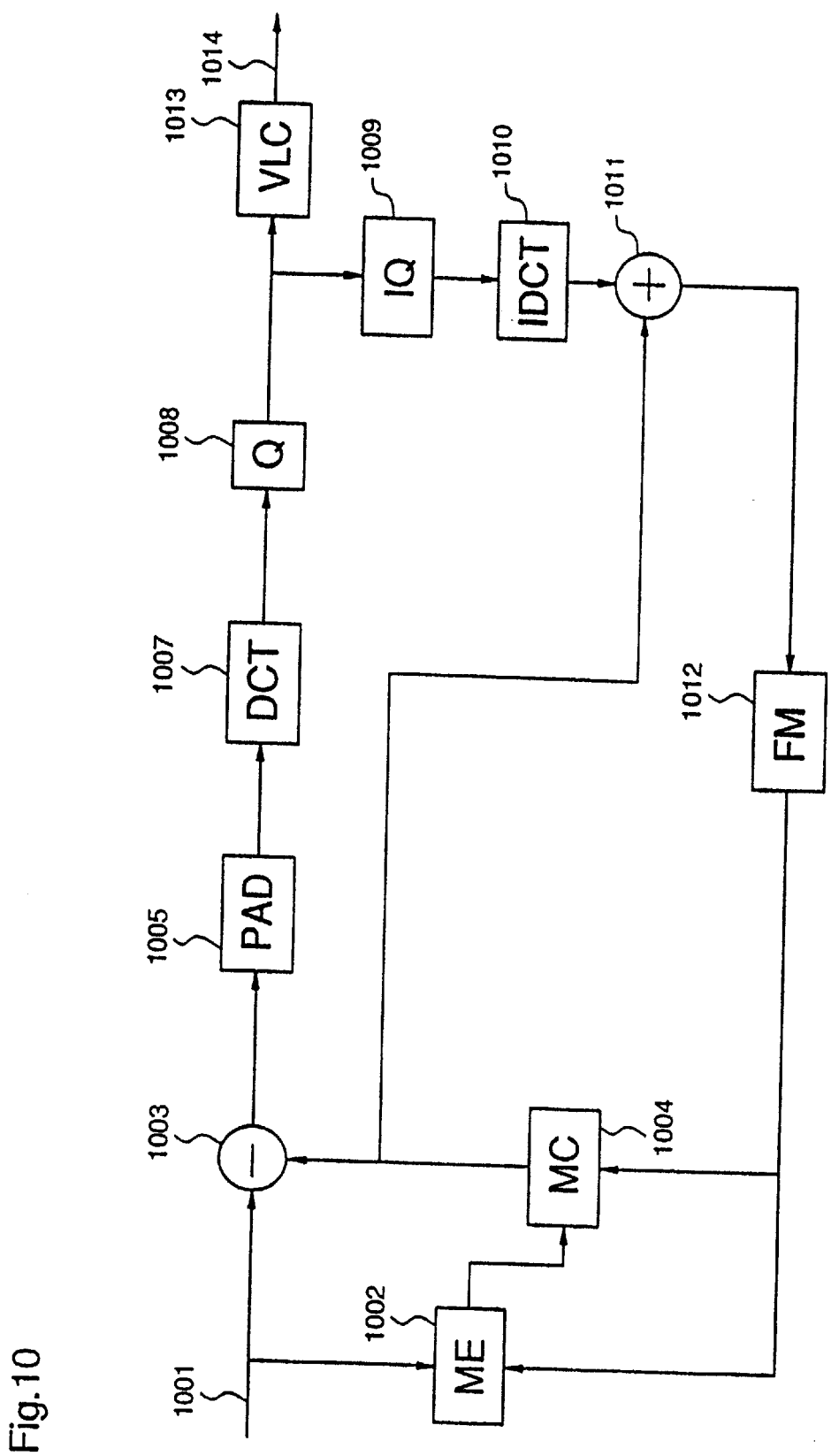
FIG. 10 is a block diagram illustrating an image coding apparatus according to a fifth embodiment of the present invention.

FIG. 10 is a block diagram illustrating an image coding apparatus according to the fifth embodiment of the present invention. In the figure, a motion detector 1002 performs detection of motion vector accompanied with a process for a prediction image, which is described later. Other parts are identical to those already described for the third embodiments.

Hereinafter, the operation of the image coding apparatus will be described. When an input signal 1001, comprising an image signal and a significant signal, is input to the apparatus, the image signal is input to the differentiator 1003 and the motion detector 1002.

Figure 11:
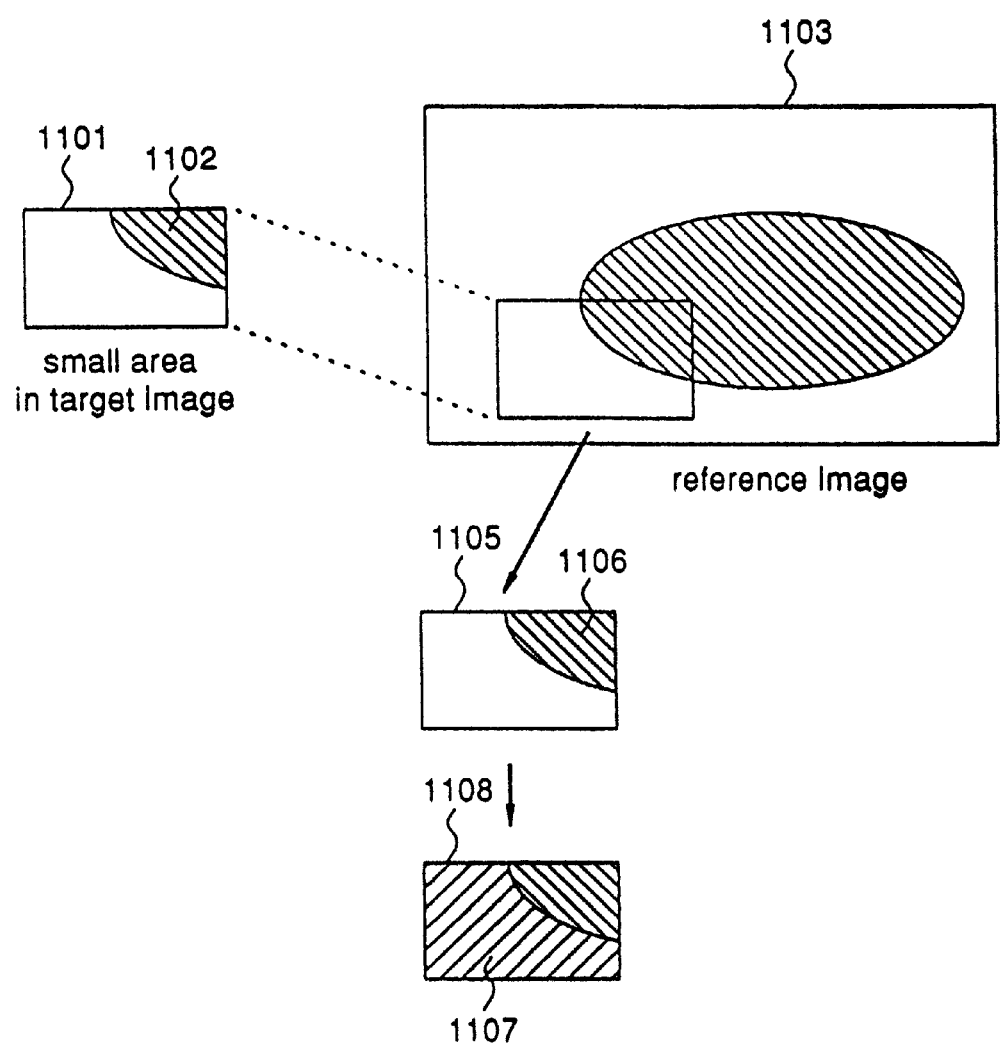
FIG. 11 is a diagram for explaining a coding process according to the fifth embodiment of the invention.

FIG. 11 is a diagram for explaining detection of motion vector by the motion detector 1002. Reference numeral 1101 designates a target small area divided from the input image signal which is the target of cording. In the area 1101, a hatched portion 1102 shows a significant portion. Reference numeral 1103 designates a reference image obtained from a decoded image stored in the frame memory 1012. The motion detector 1002 selects, from the reference image 1103, a small area 1105 which is divided from the reference image 1103. In this fifth embodiment, the motion detector 1002 performs a process based on padding to the small area 1105 before detection of motion vector.

In the small area 1105, a hatched portion 1106 shows a significant portion. In the motion detector 1002, a padding pixel value is obtained in a prescribed functional process, for example, addition and averaging, using the pixel value of the significant portion 1106, and insignificant pixels in the area 1105 are replaced with pixels having the padding pixel value. As a result, a small area 1108 having a padded portion 1107 is obtained. Then, in the motion detector 1002, a small area having the smallest difference between the small area 1108 so generated and the target small area 1101 is regarded as an optimum small area, and a displacement between the target small area and the optimum small area is detected as a motion vector. The motion vector is output to the prediction image generator 1004.

In this fifth embodiment of the invention, when the motion detector 1002 detects a motion vector, since the reference image used for the detection is subjected to the process based on padding, a reduction in the detection accuracy due to influence of the insignificant portion in the reference image is avoided, whereby the accuracy in the following compensation by the prediction image generator 1004 is improved, resulting in improved coding efficiency. The subsequent process is identical to that described for the third embodiment.

As described above, according to the fifth embodiment of the present invention, since the image coding apparatus is equipped with the motion detector 1002 performing detection of motion vector accompanied with a process based on padding, the accuracy in the motion detection and the accuracy in the following motion compensation are increased, resulting in improved coding efficiency.

Although the image coding apparatus according to this fifth embodiment is based on the third embodiment, the motion detector according to this fifth embodiment may be applied to other embodiments with the same effects as mentioned above.

Further, like the fourth embodiment, the pixel generator 1104 employed in this fifth embodiment may be one performing the single-stage padding according to the first embodiment.

Embodiment 6

In an image coding apparatus according to a sixth embodiment of the present invention, a motion-compensated prediction image is subjected to padding.

Figure 12:
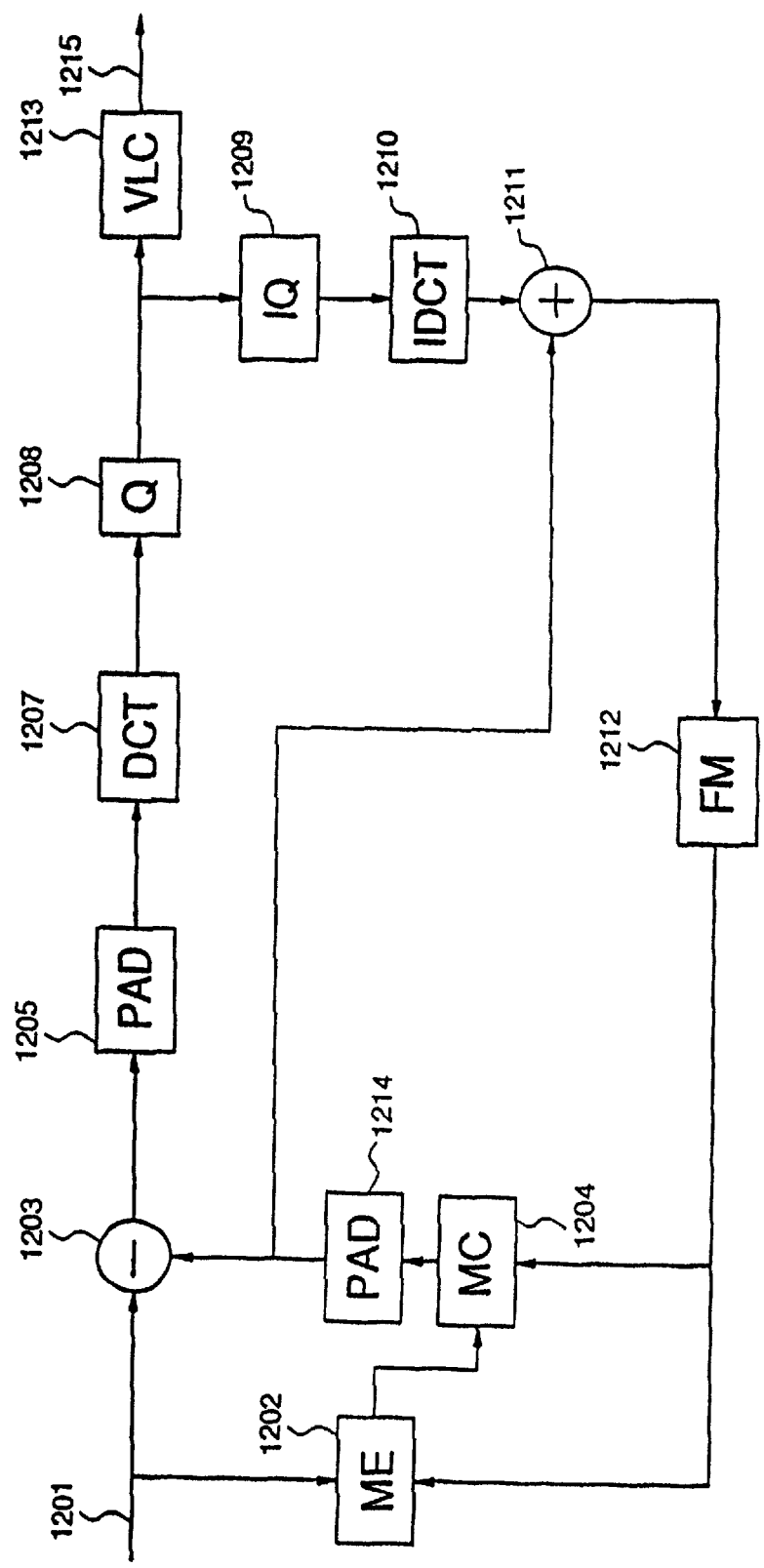
FIG. 12 is a block diagram illustrating an image coding apparatus according to a sixth embodiment of the present invention.

FIG. 12 is a block diagram illustrating an image coding apparatus according to the sixth embodiment of the present invention. In FIG. 12, a prediction image pixel generator 1214 performs padding to a prediction image output from the prediction image generator 1204. The image coding apparatus according to this sixth embodiment is identical to the apparatus according to the fifth embodiment except that the prediction image pixel generator 1214 is added.

Hereinafter, the operation of the image coding apparatus will be described. The process steps up to generation of a prediction image by the prediction image generator 1204 using motion vectors are identical to those already mentioned for the fifth embodiment. The prediction image generator 1204 outputs the prediction image to the prediction image pixel generator 1214. In the prediction image pixel generator 1214, a padding pixel value is obtained using a prescribed function on the basis of the pixel values in a significant portion of each of small prediction areas into which the prediction image is divided, and pixels in an insignificant portion of each small prediction area are replaced with pixels having the padding pixel value, generating a padded prediction image. Then, the prediction image pixel generator 1214 outputs the padded prediction image to the differentiator 1203, wherein a difference between the input image signal and the padded prediction image is obtained as differential data. Subsequent process steps are identical to those described for the fifth embodiment.

As described above, according to the sixth embodiment of the invention, since the image coding apparatus is equipped with the prediction image pixel generator 1214 that generates a padded prediction image, differential data suitable for compressive coding is obtained, resulting in improved coding efficiency.

Although in this sixth embodiment the prediction image pixel generator 1214 is added to the structure according to the fifth embodiment, it can be added to any of the aforementioned embodiments with the same effects as mentioned above.

Embodiment 7

An image coding apparatus according to a seventh embodiment of the invention performs motion compensation accompanied by overlap compensation.

Figure 13:
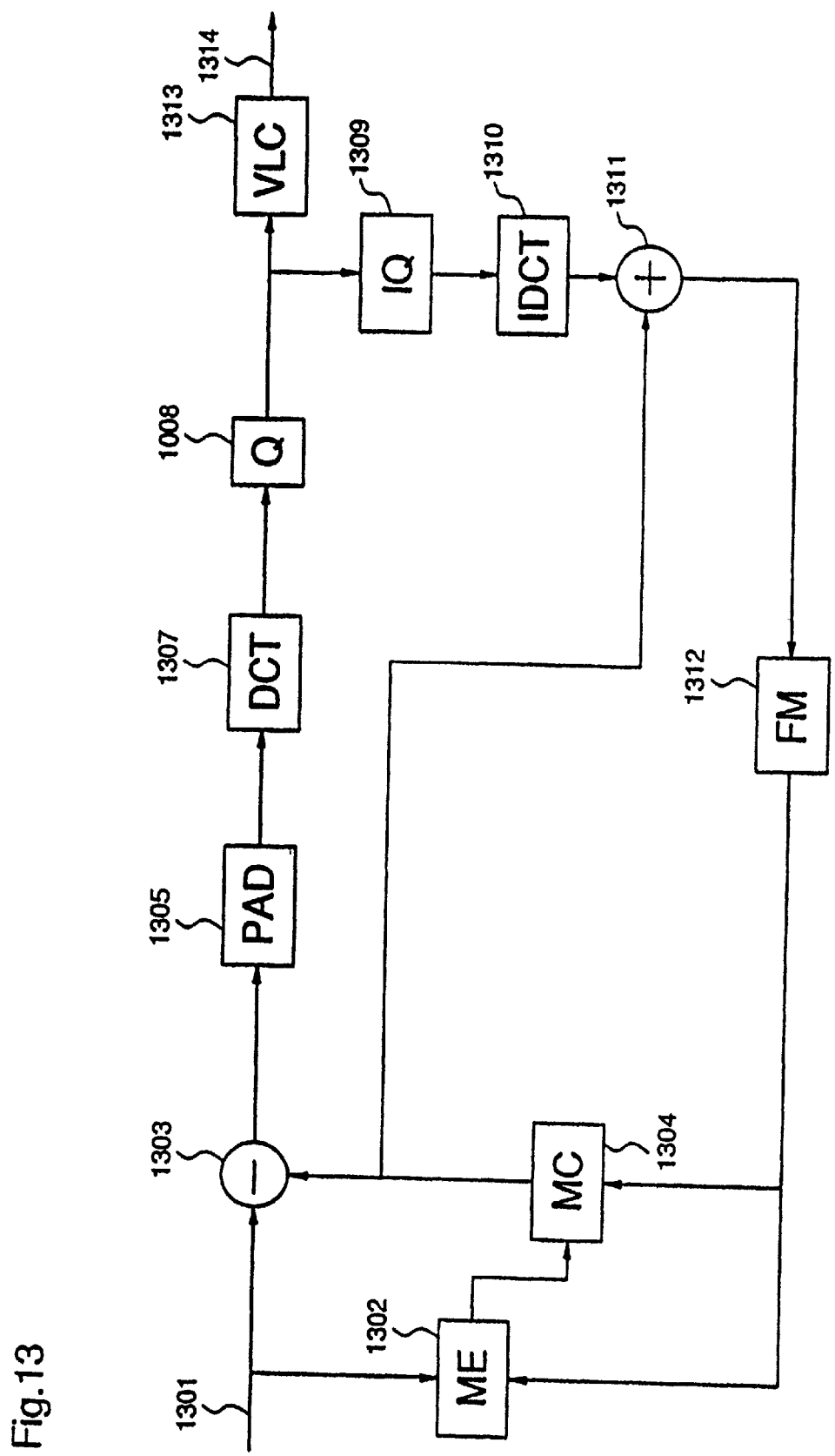
FIG. 13 is a block diagram illustrating an image coding apparatus according to a seventh embodiment of the present invention.

FIG. 13 is a block diagram illustrating an image coding apparatus according to a seventh embodiment of the invention. In the figure, a prediction image generator 1304 performs a motion compensation accompanied with overlap compensation which is described later. Other parts are identical to those already mentioned for the fifth embodiment.

The operation of the image coding apparatus will be described. When an input signal 1301 comprising an image signal and a significant signal is input to the apparatus, the image signal is input to the differentiator 1303 and the motion detector 1302.

Figure 14:
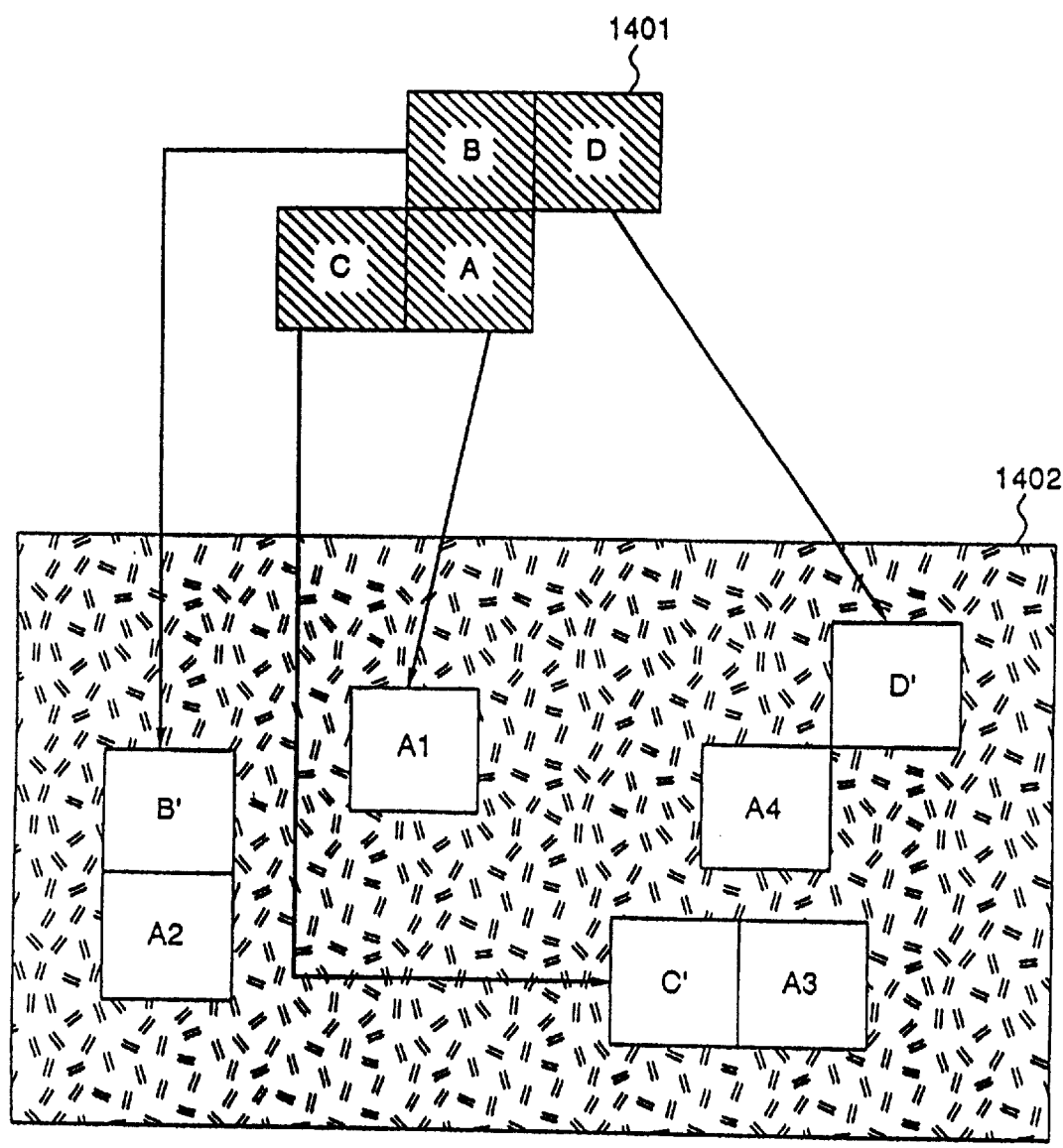
FIG. 14 is a diagram for explaining a coding process according to the seventh embodiment of the invention.

FIG. 14 is a diagram for explaining the operation of the prediction image pixel generator 1304. In the figure, reference numeral 1401 designates a portion of the input image signal which is the target of coding. Here, motion compensation for a small area A in the portion 1401 will be explained. The motion detector 1302 detects motion vectors from the target small area A and adjacent small areas B, C, and D in the input image signal 1401. The motion vectors are output to the prediction image generator 1304. The prediction image generator 1304 performs motion compensation using the motion vectors to a reference image obtained from the frame memory 1312, thereby generating a prediction image.

In FIG. 14, reference numeral 1402 designates the reference image. The prediction image generator 1304 obtains small prediction image areas A1, B', C', and D' by motion compensation using the motion vectors corresponding to the small areas A, B, C, and D, respectively. Next, the prediction image generator 1304 obtains small prediction image areas A2, A3, and A4, using the correlations between the target small area A and the adjacent small areas B, C, and D in the input image signal 1401, on the basis of the small areas B', C', and D' in the reference image 1402, respectively.

Next, the prediction image generator 1304 performs overlap compensation using a prescribed function on the basis of the pixel values of significant pixels in the areas A1, A2, A3, and A4 to generate an optimum small prediction image area for the target small area A, and outputs the optimum area to the differentiator 1303. The function used for the overlap compensation is obtained as follows. When a particular pixel in the small prediction image area A1 is significant, if a pixel corresponding to the particular pixel in any of the small prediction image areas A2, A3, and A4 is insignificant, a weighted mean is obtained using the pixel value of the significant pixel in the prediction small area A1 as a pixel value of the insignificant pixel.

The process steps after inputting the optimum small prediction area to the differentiator 1303 are identical to those mentioned for the fifth embodiment.

As described above, according to the seventh embodiment of the invention, since the image coding apparatus is equipped with the prediction image generator 1304 performing motion compensation accompanied with overlap compensation, when a prediction image is generated, an optimum small prediction area in which the influence of pixel values of insignificant pixels is reduced is obtained, whereby the accuracy in predicting the prediction image is improved, resulting in improved coding efficiency.

While in this seventh embodiment three small areas (B, C, D) in the vicinity of a target small area (A) are used for the overlap compensation by the prediction image generator 1304, four areas or eight areas in the vicinity of the target area may be used. Alternatively, plural areas appropriately selected from these areas may be used. Also in these cases, the same effects as mentioned above are achieved.

Embodiment 8

In an image coding apparatus according to an eighth embodiment of the present invention, a motion-compensated prediction image is subjected to padding.

Figure 15:
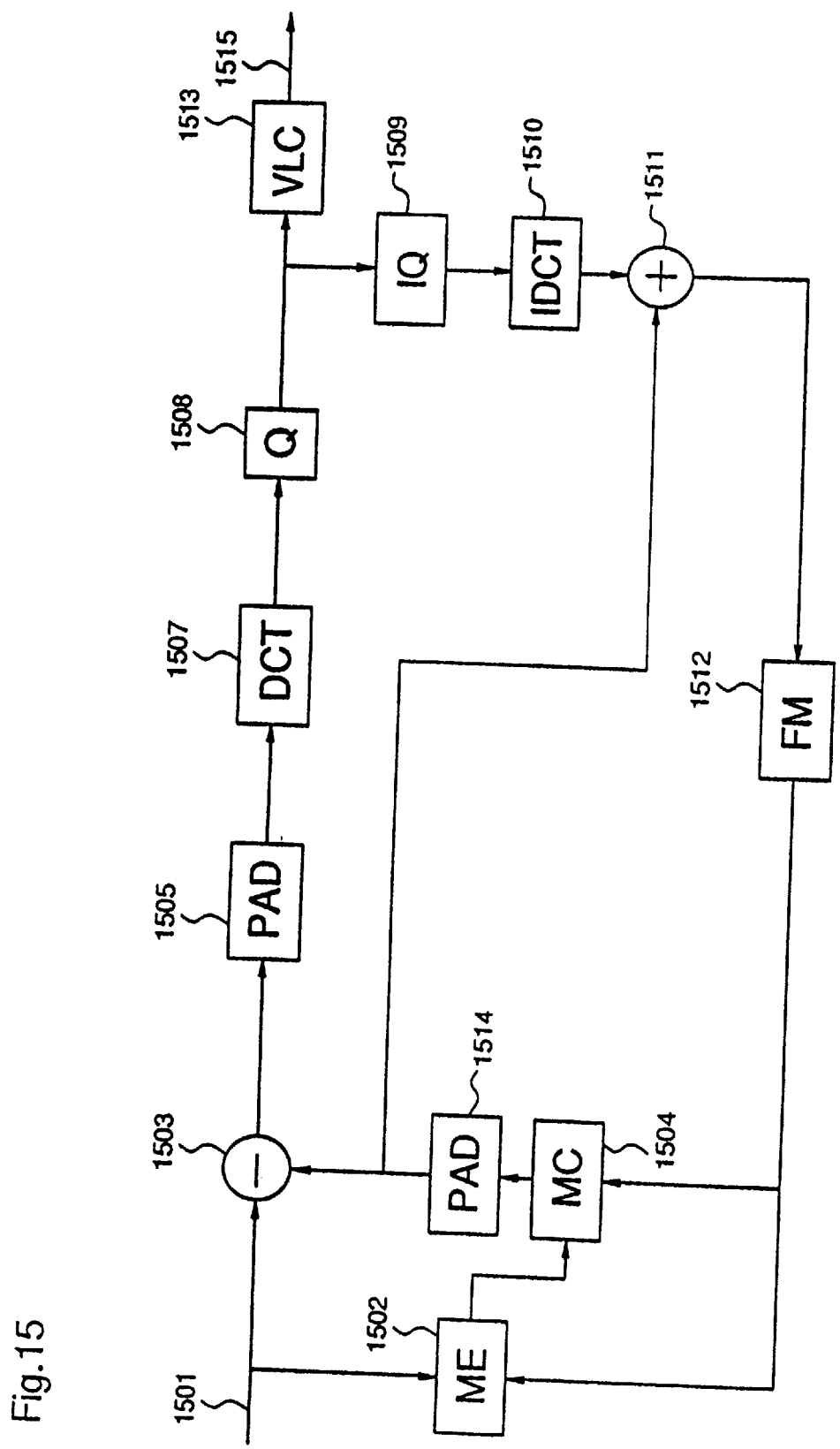
FIG. 15 is a block diagram illustrating an image coding apparatus according to an eighth embodiment of the present invention.

FIG. 15 is a block diagram illustrating an image coding apparatus according to the eighth embodiment of the present invention. In FIG. 15, a prediction image pixel generator 1514 performs padding to a prediction image output from the prediction image generator 1504. The image coding apparatus according to this eighth embodiment is identical to the apparatus according to the seventh embodiment except that the prediction image pixel generator 1514 is added.

Hereinafter, the operation of the image coding apparatus will be described. The process steps up to generation of a prediction image by the prediction image generator 1504 using motion vectors are identical to those already mentioned for the seventh embodiment. The prediction image generator 1504 outputs the prediction image to the prediction image pixel generator 1514. In the prediction image pixel generator 1514, a padding pixel value is obtained using a prescribed function on the basis of the pixel values in a significant portion of each of small prediction areas into which the prediction image is divided, and pixels in an insignificant portion of each small prediction area are replaced with pixels having the padding pixel value, generating a padded prediction image. Then, the prediction image pixel generator 1514 outputs the padded prediction image to the differentiator 1503, wherein a difference between the input image signal and the padded prediction image is obtained as differential data. Subsequent process steps are identical to those described for the seventh embodiment.

As described above, according to the eighth embodiment of the invention, the image coding apparatus is equipped with the prediction image pixel generator 1514, and the above-mentioned padding is performed to the prediction image generated by the prediction image generator 1504 operating in the same manner as the prediction image generator 1304 according to the seventh embodiment. Therefore, differential data suitable for compressive coding is obtained, resulting in further improved coding efficiency.

Embodiment 9

An image decoding apparatus according to a ninth embodiment of the present invention performs a decoding process adapted to coded signals which are efficiently coded by the image coding apparatus according to the first embodiment of the invention.

Figure 16:
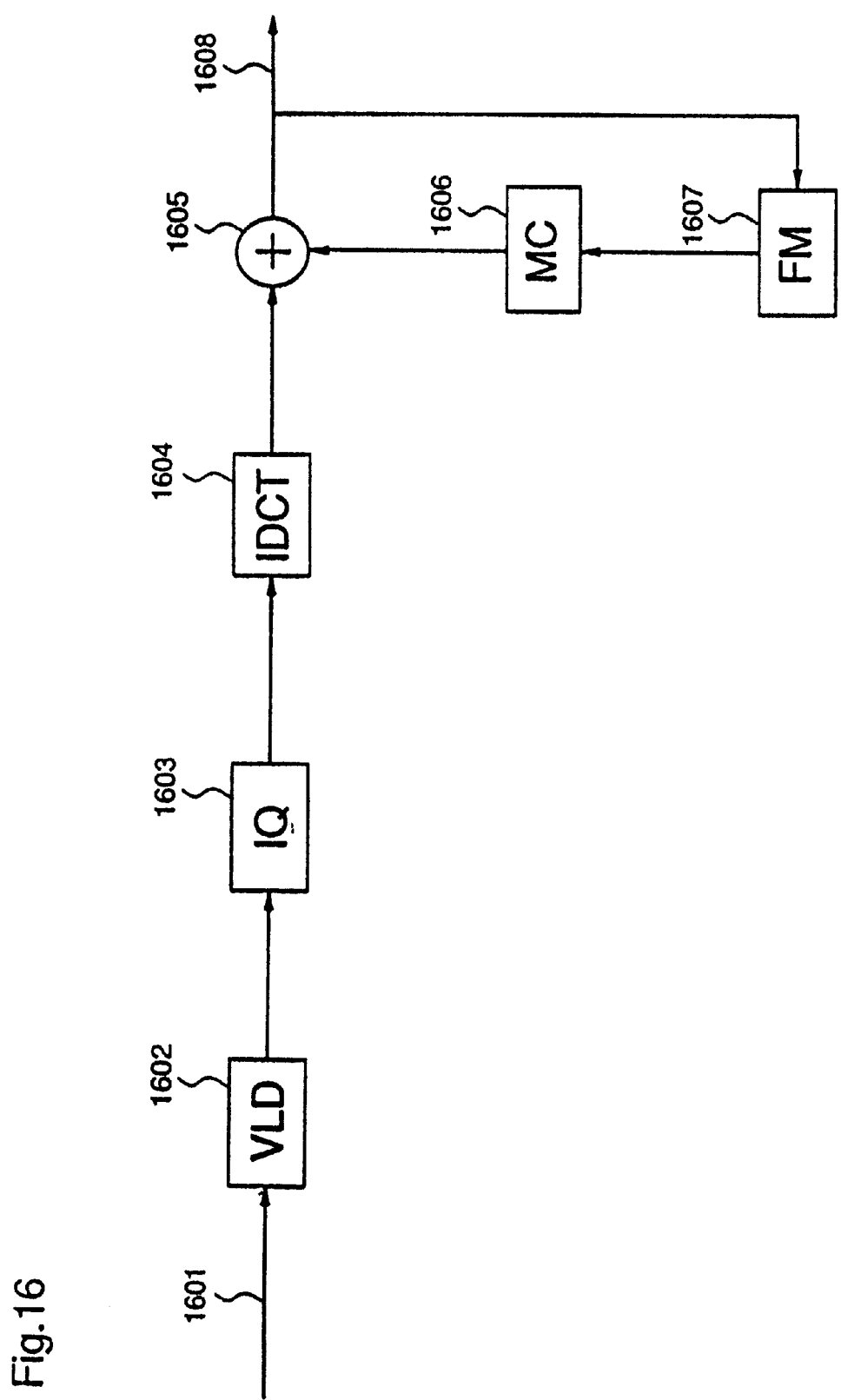
FIG. 16 is a block diagram illustrating an image coding apparatus according to a ninth embodiment of the present invention.

FIG. 16 is a block diagram illustrating an image decoding apparatus according to the ninth embodiment of the present invention. In FIG. 16, reference numeral 1601 designates an input signal applied to the decoding apparatus according to this ninth embodiment, and this signal is a coded signal output from the image coding apparatus according to the first embodiment. A variable-length decoder 1602 performs variable-length decoding which is the inverse of variable-length coding, and outputs variable-length decoded data. An inverse quantizer 1603 performs inverse quantization, which is the inverse of quantization, to the variable-length decoded data, and outputs inversely quantized data. An inverse orthogonal transformer 1604 performs inverse orthogonal transform, which is the inverse of orthogonal transform, to the inversely quantized data, and outputs inversely transformed data. An adder 1605 adds the inversely transformed data and a prediction image to obtain a decoded image. This decoded image is output from the decoding apparatus and, simultaneously, it is input to a frame memory 1607. A prediction image generator 1606 generates a prediction image using the decoded image stored in the frame memory 1607 as a reference image.

A description is given of the operation of the image decoding apparatus so constructed. Initially, coded data obtained in the image coding apparatus according to the first embodiment is input to the decoding apparatus as an input signal 1601. The input signal 1601 is decoded by the variable-length decoder 1602, and variable-length decoded data is input to the inverse quantizer 1603. The inverse quantizer 1603 performs inverse quantization to the decoded data and outputs inversely quantized data to the inverse orthogonal transformer 1604. The inverse orthogonal transformer 1604 performs inverse orthogonal transform to the inversely quantized data and outputs inversely transformed data to the adder 1605. The adder 1605 adds the inversely transformed data to a prediction image which is described later, to obtain a decoded image 1608. The decoded image 1608 is output from the decoding apparatus and, on the other hand, it is input to the frame memory 1607. The prediction image generator 1606 generates a prediction image using the decoded image stored in the frame memory 1607 as a reference image, and outputs the prediction image to the adder 1605.

As described above, in the image decoding apparatus according to the ninth embodiment of the invention, decoding is performed by the variable-length decoder 1602, the inverse quantizer 1603, and the inverse orthogonal transformer 1604. Further, a prediction image is generated and a decoded image is obtained by the adder 1605, the prediction image generator 1606, and the frame memory 1607. Therefore, a decoded image can be obtained by decoding data which is efficiency coded by the image coding apparatus according to the first embodiment.

In this ninth embodiment, the coding result (coded data) obtained in the image coding apparatus according to the first embodiment is processed (decoded). However, the image decoding apparatus according to this ninth embodiment may be used for decoding of the coding result obtained in any of the second, fourth, fifth, and seventh embodiments of the invention, with the same effects as mentioned above.

Embodiment 10

An image decoding apparatus according to a tenth embodiment of the present invention performs a decoding process adapted to coded signals which are efficiently coded by the image coding apparatus according to the sixth embodiment of the invention.

Figure 17:
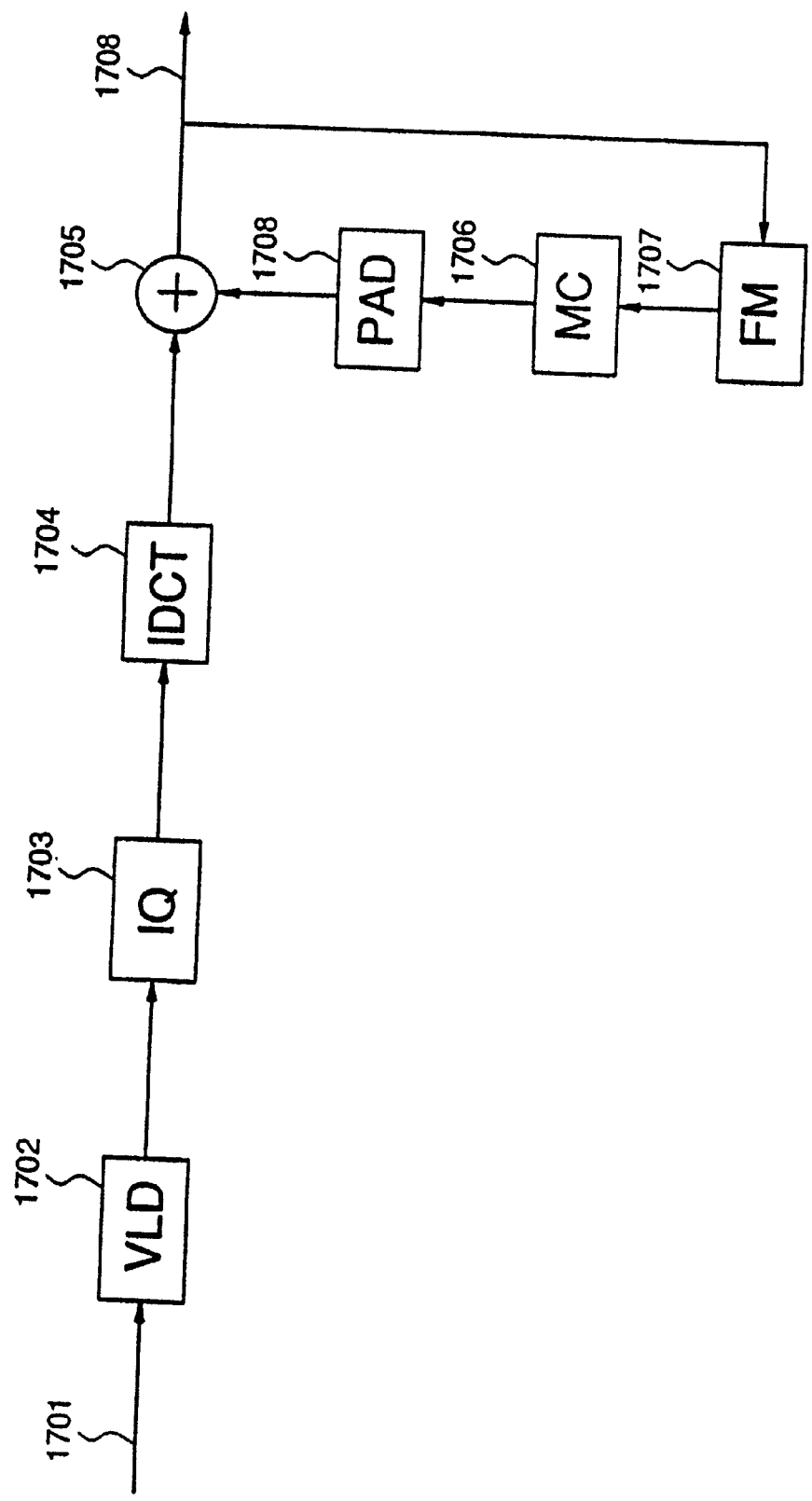
FIG. 17 is a block diagram illustrating an image coding apparatus according to a tenth embodiment of the present invention.

FIG. 17 is a block diagram illustrating an image decoding apparatus according to the tenth embodiment of the invention. In FIG. 17, a pixel generator 1708 performs padding to a prediction image output from a prediction image generator 1706 to generate a padded prediction image. The decoding apparatus according to this tenth embodiment is identical to the decoding apparatus according to the ninth embodiment except that the pixel generator 1708 is added, the prediction image generator 1706 outputs the prediction image to the pixel generator 1708, and the adder 1705 uses the padded prediction image for the adding process.

A description is given of the operation of the image decoding apparatus according to the tenth embodiment. Process steps up to generation of the prediction image by the prediction image generator 1705 are identical to those already described for the ninth embodiment. The prediction image generator 1705 outputs the prediction image to the pixel generator 1708. In the pixel generator 1708, the prediction image is divided into plural small prediction areas, and a padding pixel value is obtained using a prescribed function such that a weighted means of pixel values of significant pixels in each small area is obtained. Then, pixel values of insignificant pixels in each small area are replaced with the padding pixel value to obtain a padded prediction image. This padded prediction image is input to the adder 1705. Subsequent process steps are identical to those mentioned for the ninth embodiment.

As described above, according to the tenth embodiment of the present invention, the pixel generator 1708 is added to the structure of the image decoding apparatus according to the ninth embodiment, and the prediction image is subjected to the above-mentioned padding. Therefore, a decoded image is obtained by decoding a coded data produced by the image coding apparatus according to the sixth embodiment which employs a padded prediction image in the coding process.

In this tenth embodiment, the coding result (coded data) obtained in the image coding apparatus according to the sixth embodiment is processed (decoded). However, the image decoding apparatus according to this tenth embodiment may be used for decoding of the coding result obtained in the image coding apparatus according to the eighth embodiment of the invention, with the same effects as mentioned above.

Embodiment 11

In an image coding apparatus according to an eleventh embodiment of the present invention, when a prediction image is generated, an optimum one is selected from small prediction image areas which are temporally close to each other.

Figure 18:
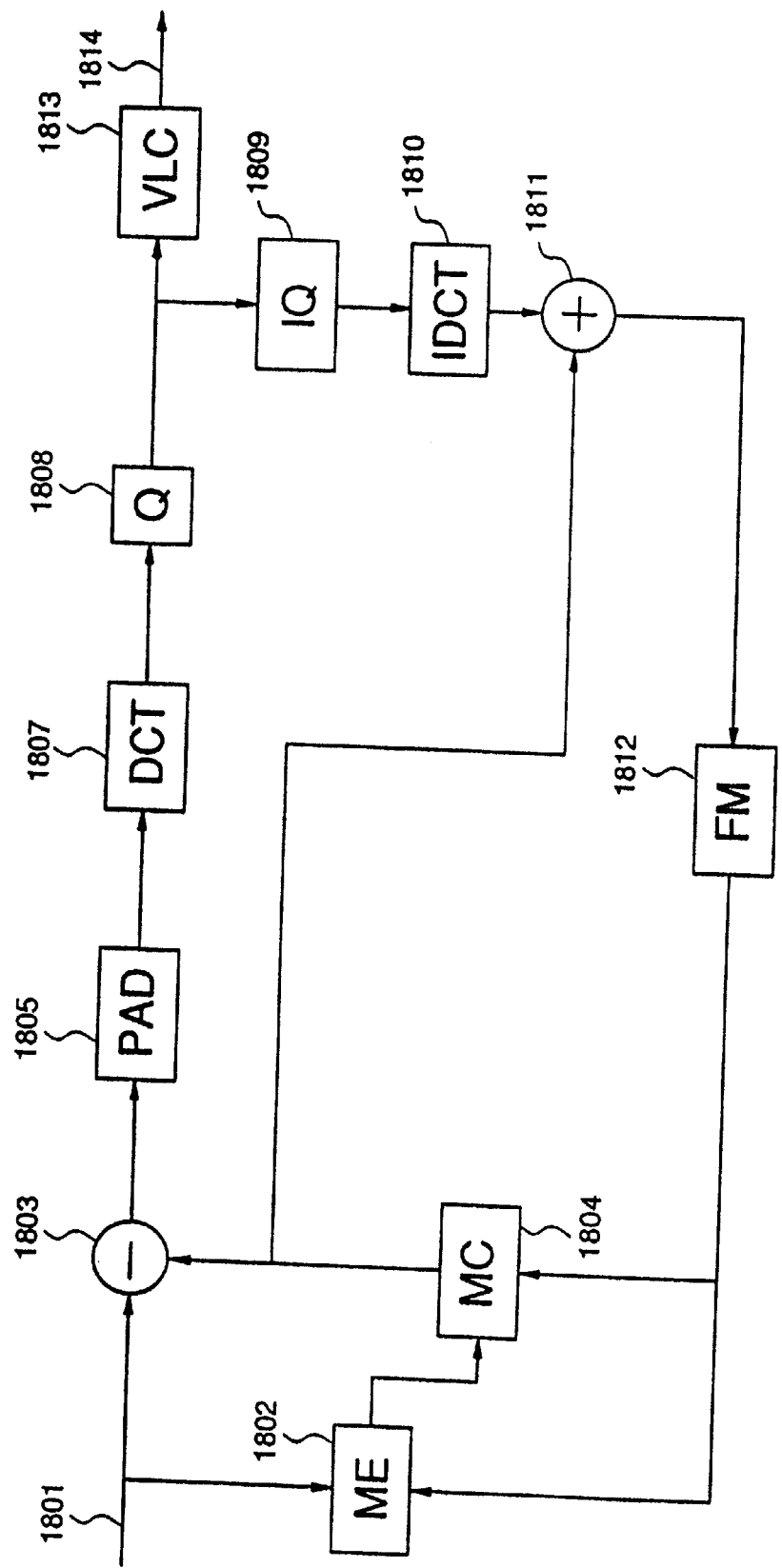
FIG. 18 is a block diagram illustrating an image coding apparatus according to an eleventh embodiment of the present invention.

FIG. 18 is a block diagram illustrating an image coding apparatus according to the eleventh embodiment of the present invention. In FIG. 18, reference numeral 1804 designates a prediction image generator having an internal structure shown in FIG. 19. Other parts are identical to those already mentioned for the third embodiment.

Figure 19:
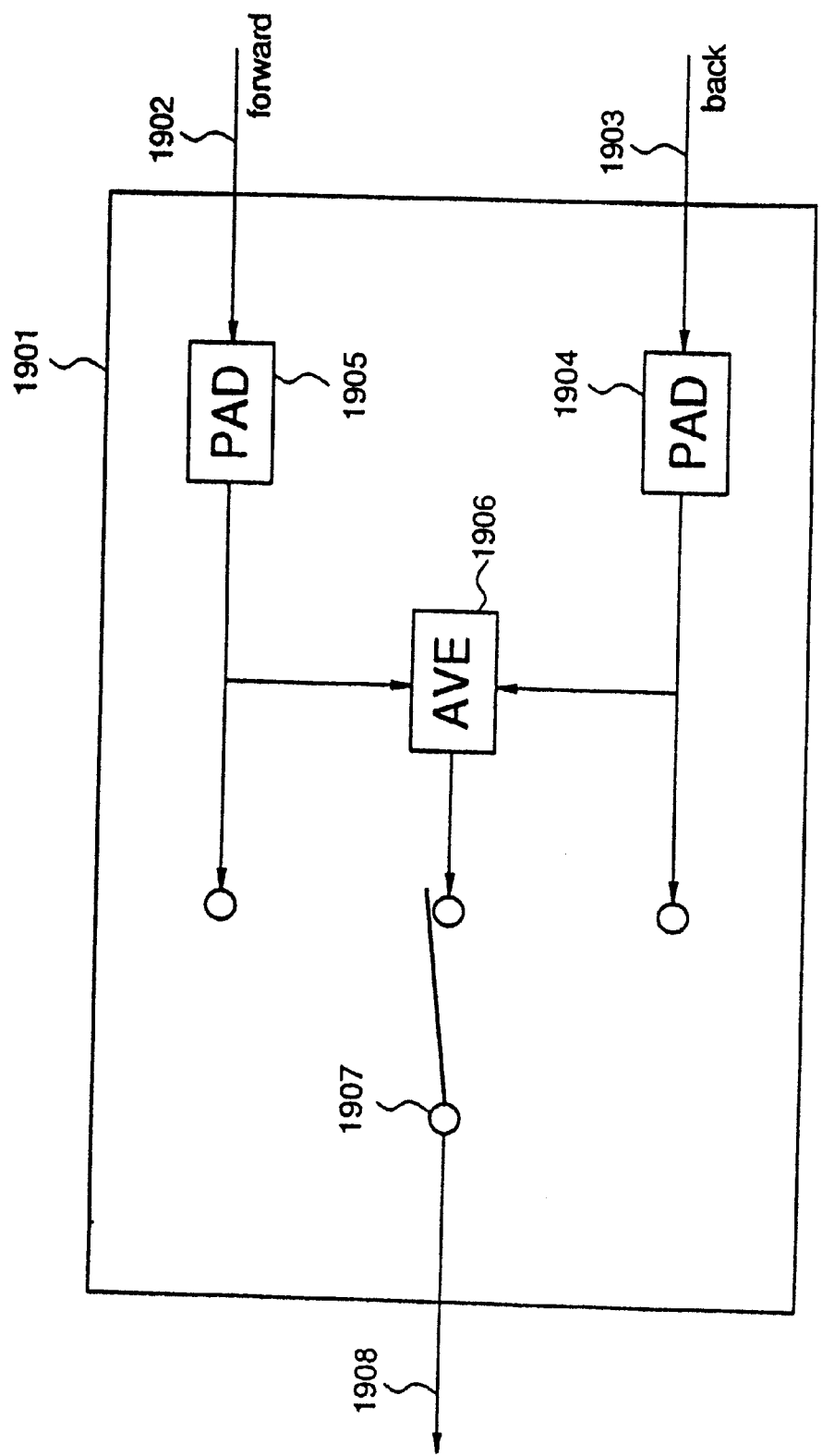
FIG. 19 is a block diagram illustrating a prediction image generator according to the eleventh embodiment of the invention.

FIG. 19 is a block diagram illustrating the internal structure of the prediction image generator 1804. In FIG. 19, a prediction image generator 1901 corresponds to the prediction image generator 1804 shown in FIG. 18. Reference numerals 1902 and 1903 designate input signals and, more specifically, 1902 designates an image signal which is reproduced temporally after an image signal being the target of coding (hereinafter referred to as a target image signal), and 1903 designates an image signal which is reproduced temporally before the target image signal. Pixel generators 1904 and 1905 perform padding for the image signals 1902 and 1903. An adding and averaging unit 1906 calculates the average of input signals. A switch 1907 selects a signal to be output. Reference numeral 1908 designates an optimum prediction area which is a signal selected by the switch 1907, and it is output as a prediction image used for coding.

The operation of the image coding apparatus according to this eleventh embodiment is identical to the operation of the apparatus according to the third embodiment except generation of prediction image by the prediction image generator 1804 and, therefore, only the operation of the prediction image generator will be described using FIG. 19.

First of all, the image signal 1902 which will be reproduced after the target image signal is input to the pixel generator 1905. In the pixel generator 1905, the input signal 1902 is divided into a plurality of small image signal areas, and pixel values of significant pixels in an image signal area A are added and averaged to generate a first padding pixel value. Then, pixel values of insignificant pixels in the area A are replaced with the first padding pixel value to obtain a first prediction image area. The first prediction image area is applied to the adding and averaging unit 1906 and to the first terminal of the switch 1907.

Likewise, the image signal 1903 which will be reproduced before the target image signal is input to the pixel generator 1904. In the pixel generator 1904, the input signal 1903 is divided into a plurality of small image signal areas, and pixel values of significant pixels in an image signal area B are added and averaged to generate a second padding pixel value. Then, pixel values of insignificant pixels in the area A are replaced with the second padding pixel value to obtain a second prediction image area. The second prediction image area is applied to the adding and averaging unit 1906 and to the third terminal of the switch 1907.

The adding and averaging unit 1906 performs addition and averaging to the first prediction image area and the second prediction image area, and outputs the result, as a third prediction image area, to the second terminal of the switch 1907. The switch 1907 selects one of the first to third prediction image areas applied to the first to third terminals, which one has a smallest error from a target small area obtained by dividing the target image signal into plural areas, and outputs the result of the selection as an optimum prediction area 1908. As a result, in FIG. 18, a prediction image is output from the prediction image generator 1804 to the differentiator 1803.

As described above, according to the eleventh embodiment of the present invention, the image coding apparatus is equipped with the prediction image generator 1901 in which plural prediction image areas are obtained by padding and one of these areas having a smallest error is selected, whereby the prediction accuracy is improved, resulting in improved coding efficiency.

Embodiment 12

An image decoding apparatus according to a twelfth embodiment of the invention performs a decoding process adapted to coded signals which are efficiency coded by the image coding apparatus according to the eleventh embodiment of the invention.

Figure 20:
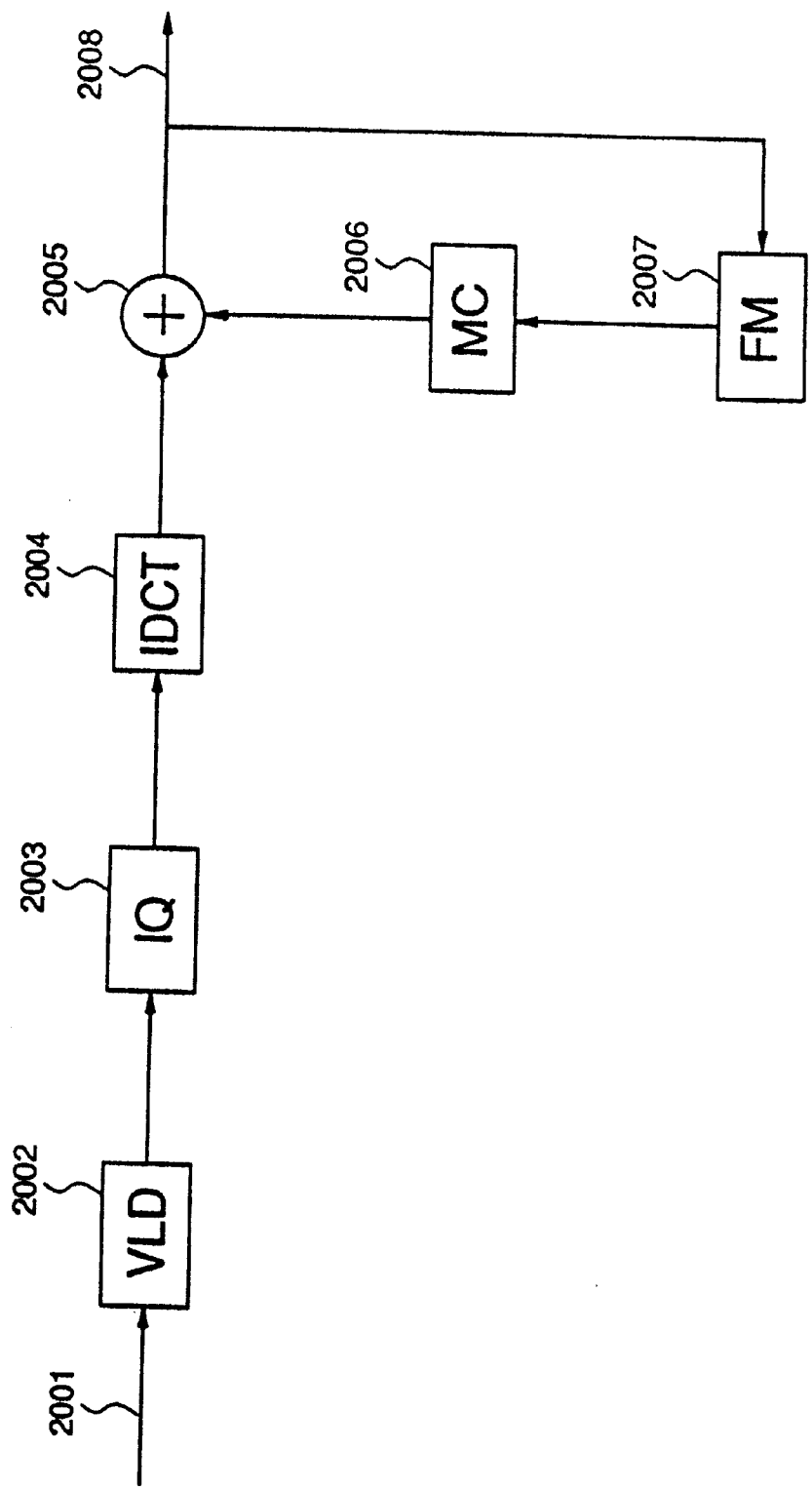
FIG. 20 is a block diagram illustrating an image decoding apparatus according to a twelfth embodiment of the present invention.

FIG. 20 is a block diagram illustrating an image decoding apparatus according to the twelfth embodiment of the present invention. In FIG. 20, reference numeral 2006 designates a prediction image generator having an internal structure shown in FIG. 21. Other parts are identical to those already described with respect to FIG. 16 according to the ninth embodiment.

Figure 21:
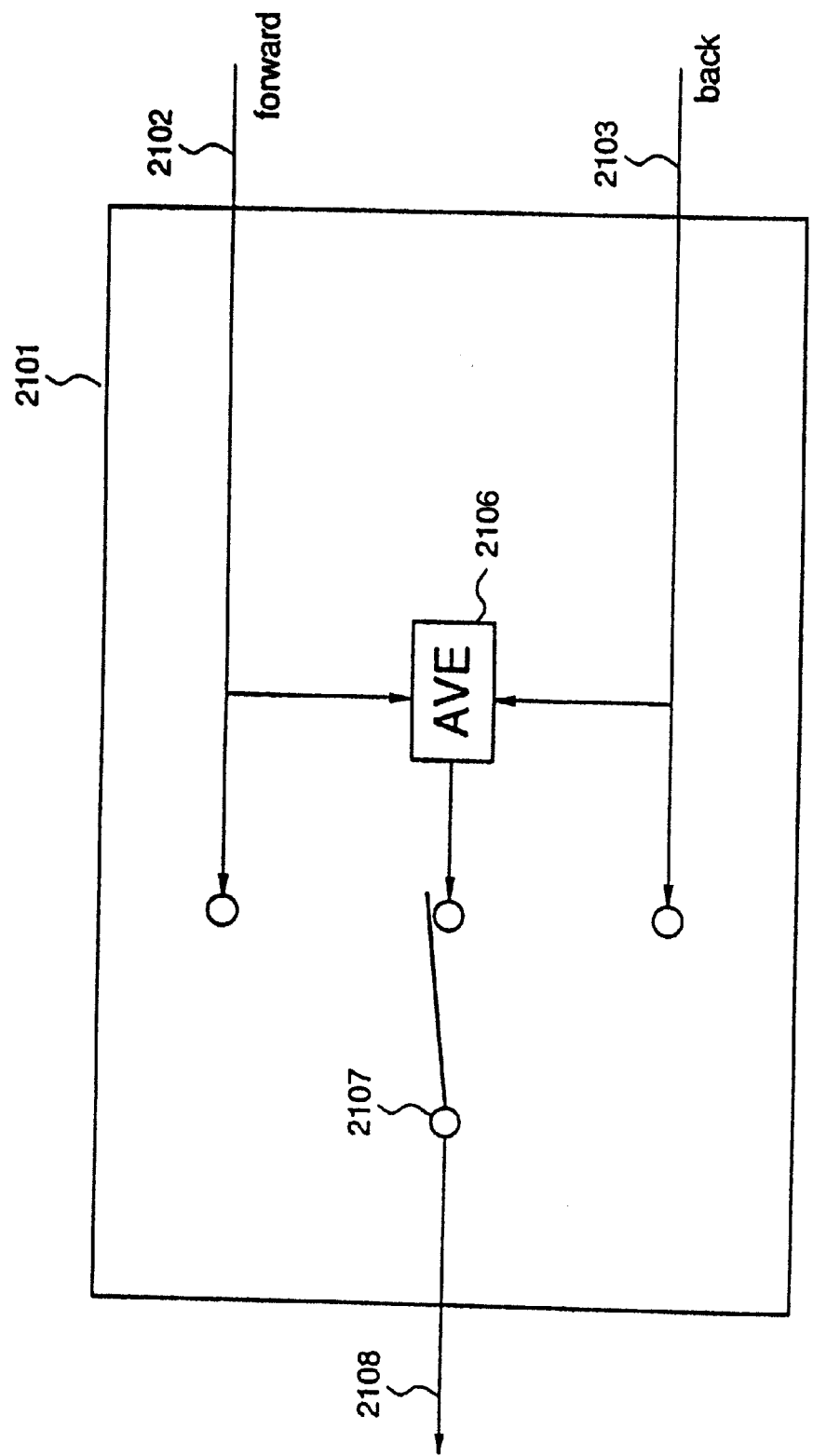
FIG. 21 is a block diagram illustrating a prediction image generator according to the twelfth embodiment of the invention.

FIG. 21 is a block diagram illustrating the internal structure of the prediction image generator 2006. In FIG. 21, a prediction image generator 2101 corresponds to the prediction image generator 2006 shown in FIG. 20. Reference numerals 2102 and 2103 designate input signals and, more specifically, 2102 designates an image signal which is reproduced temporally after an image signal being the target of coding (hereinafter referred to as a target image signal), and 2103 designates an image signal which is reproduced temporally before the target image signal. An adding and averaging unit 2106 calculates the average of input signals. A switch 2107 selects a signal to be output. Reference numeral 2108 designates an optimum prediction area which is a signal selected by the switch 2107, and it is output as a prediction image used for decoding.

The operation of the image decoding apparatus according to this twelfth embodiment is identical to the operation of the apparatus according to the ninth embodiment except generation of prediction image by the prediction image generator 2006 and, therefore, only the operation of the prediction image generator will be described using FIG. 21.

First of all, the image signal 2102 which will be reproduced after the target image signal is input to the prediction image generator 2101. Then, the image signal 2102 is divided into plural small prediction image areas, and a first prediction image area is applied to the adding and averaging unit 2106 and to the first terminal of the switch 2107. Likewise, the image signal 2103 which will be reproduced before the target image signal is input to the prediction image generator 2101. Then, the image signal 2103 is divided into plural small prediction image areas, and a second prediction image area is applied to the adding and averaging unit 2106 and to the third terminal of the switch 2107.

The adding and averaging unit 2106 performs addition and averaging, which is described later in more detail, to the first prediction image area and the second prediction image area, and outputs the result, as a third prediction image area, to the second terminal of the switch 2107. The switch 2107 selects one of the first to third prediction image areas applied to the first to third terminals, which one has a smallest error from a target small area obtained by dividing the target image signal into plural areas, and outputs the result of the selection as an optimum prediction area 2108. As a result, in FIG. 20, a prediction image is output from the prediction image generator 2006 to the adder 2005.

Figure 22:
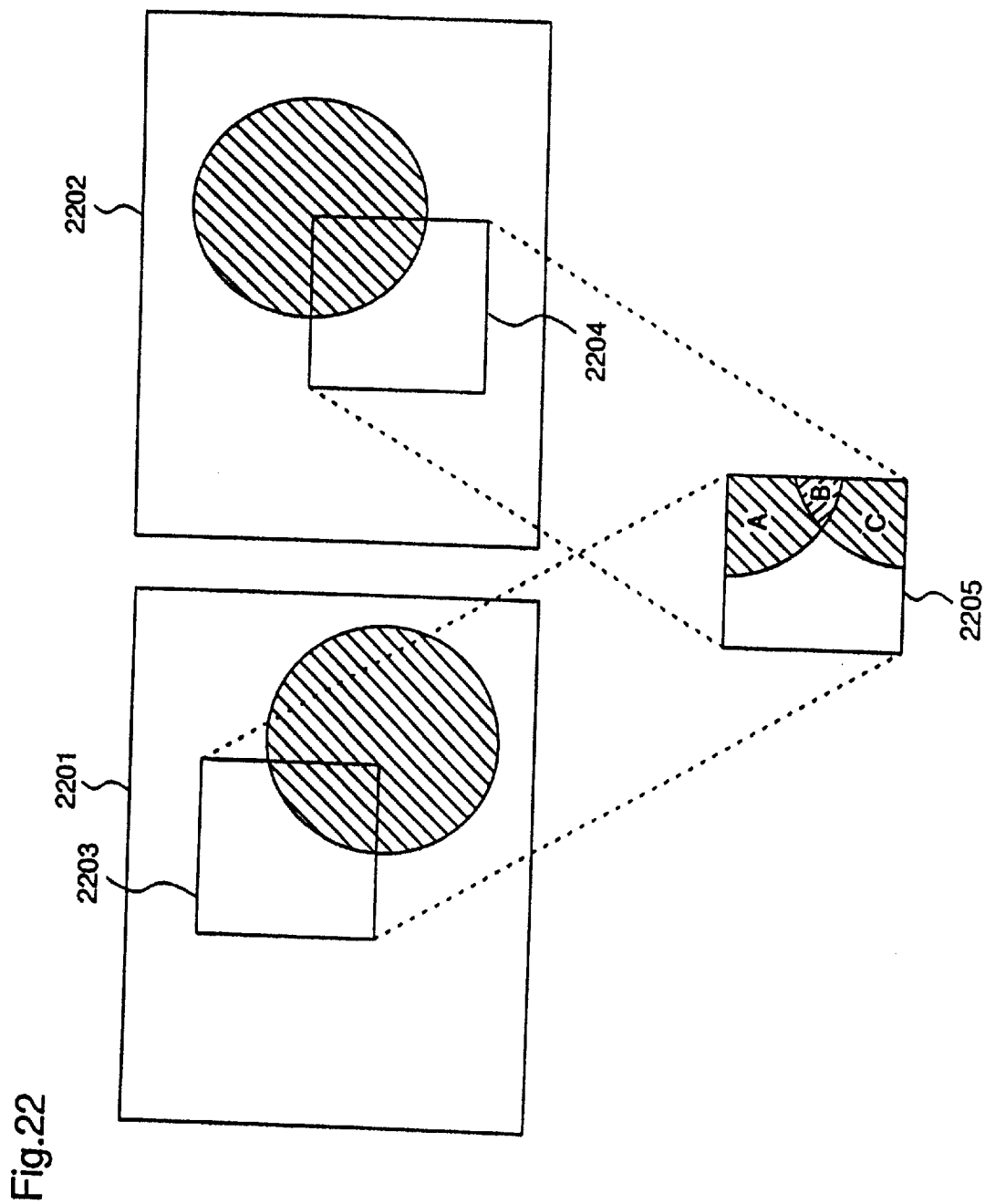
FIG. 22 is a diagram for explaining a decoding process according to the twelfth embodiment of the invention.

FIG. 22 is a diagram for explaining the prediction image generating process according to the twelfth embodiment of the invention. In the figure, reference numeral 2201 designates an image signal which is reproduced after the target image signal, i.e., 2201 corresponds to 2102 in FIG. 21. Reference numeral 2202 designates an image signal which is reproduced before the target image signal, i.e., 2202 corresponds to 2103 in FIG. 21. Reference numerals 2203 and 2204 designate small areas divided from the image signals 2201 and 2202, respectively. The small areas 2203 and 2204 are subjected to the following addition and averaging process. In both of the small areas 2203 and 2204, it is investigated whether corresponding pixels are significant or not. When both of the corresponding pixels are significant, addition and averaging are performed, and the obtained average is output. When one of the corresponding pixels is not significant, the pixel value of the significant pixel is output. In the output result on the basis of the small areas 2203 and 2204, an overlap portion B wherein both of the pixels are significant takes the average, and portions A and B take the pixel values of the small areas 2204 and 2203, respectively.

As described above, according to the twelfth embodiment of the invention, since the image decoding apparatus is equipped with the prediction image generator 2206 (2101), the decoding apparatus can decode the data which is efficiency coded by the image coding apparatus according to the eleventh embodiment.

In the output result 2205 shown in FIG. 22, only the pixels which are significant in at least one of the small areas 2203 and 2204 are the target of the process. However, the output result 2205 may be subjected to padding in which a padding pixel value is obtained on the basis of the pixel values of the significant pixels, and pixel values of pixels which are not significant in both of the small areas 2203 and 2204 are replaced with the padding pixel value. As a result of the padding, unwanted reduction in the coding efficiency due to influence of the pixel values of the insignificant pixels in the output 2205 is avoided, whereby the coding efficiency is further improved.

Further, the prediction image generator 2101 shown in FIG. 21 according to this twelfth embodiment may be employed as the prediction image generator 1804 of the image coding apparatus according to the eleventh embodiment. Furthermore, the prediction image generator 1901 of the image coding apparatus shown in FIG. 19 according to the eleventh embodiment may be employed as the prediction image generator 2006 of the image decoding apparatus according to this twelfth embodiment.

Moreover, in the image coding apparatus according to the eleventh embodiment, the orthogonal transformer 1807 may be replaced with a shape adaptive orthogonal transformer that transforms only significant pixels. Likewise, in the image decoding apparatus according to the twelfth embodiment, the inverse orthogonal transformer 2004 may be replaced with a shape adaptive orthogonal transformer that transforms only significant pixels.

Embodiment 13

In an image coding apparatus according to a thirteenth embodiment of the present invention, when shape adaptive orthogonal transform is performed, a prediction image is subjected to padding to improve coding efficiency.

Figure 23:
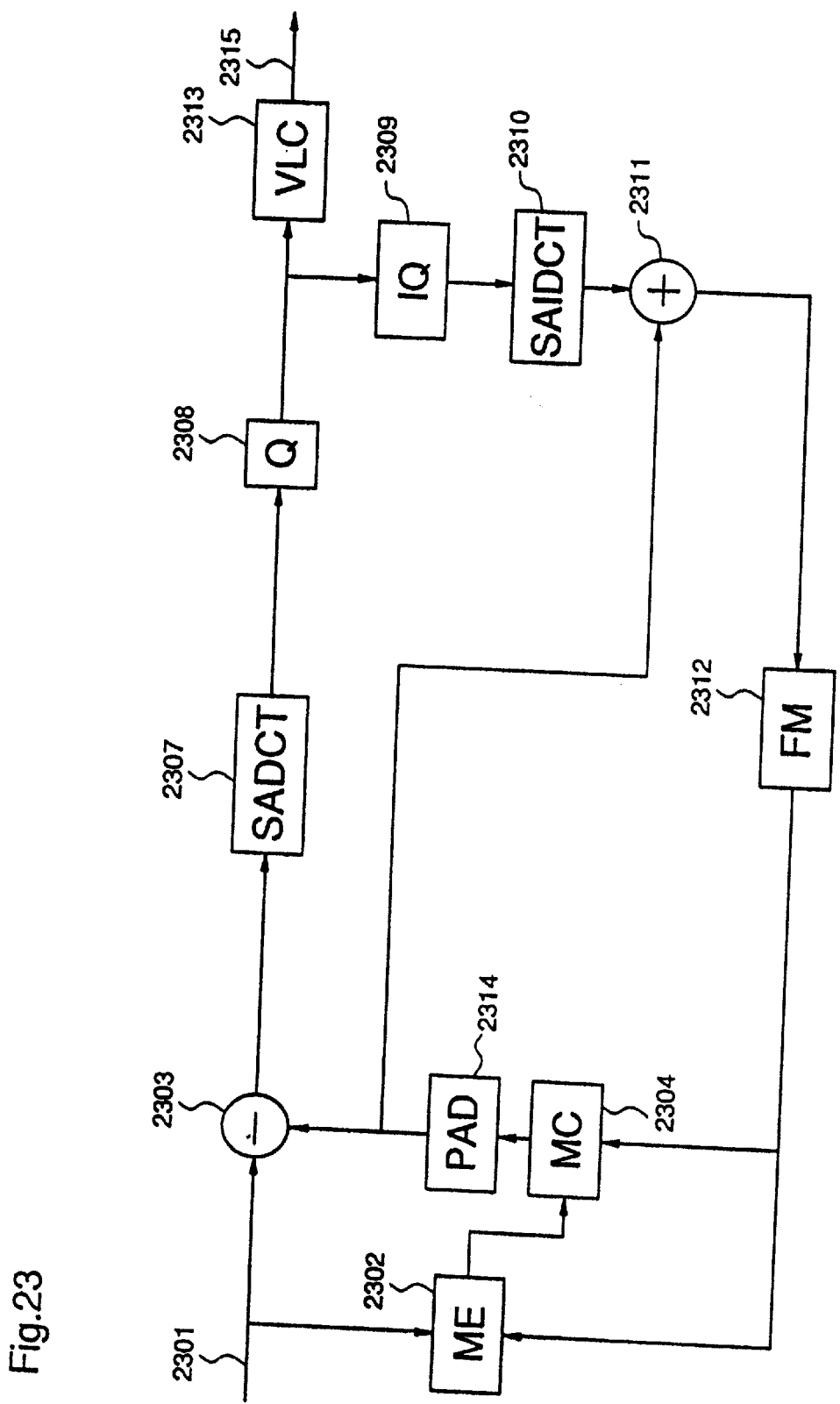
FIG. 23 is a block diagram illustrating an image coding apparatus according to a thirteenth embodiment of the present invention.

FIG. 23 is a block diagram illustrating an image coding apparatus according to the thirteenth embodiment of the present invention. In the figure, reference numeral 2301 designates an input signal. A motion vector detector 2303 detects a motion vector of the input signal 2301. A differentiator 2303 calculates a difference between the input signal 2301 and a prediction image which is described later, and outputs the result as differential data. A prediction image generator 2304 generates a prediction image on the basis of a decoded image stored in a frame memory 2313 which is described later, and the motion vector detected by the motion vector detector 2302. A shape adaptive orthogonal transformer 2307 performs orthogonal transform to a significant portion of the differential data, and outputs the transformed data. A quantizer 2308 performs compression by quantization to the transformed data, and outputs quantized data. A variable-length coder 2313 performs compressive coding on the basis of the correlation of the quantized data, and outputs coded data 2314. The coded data 2314 is the coding result by the image coding apparatus according to this thirteenth embodiment. An inverse quantizer 2309 performs inverse quantization to the quantized data, and outputs inversely quantized data. A shape adaptive inverse orthogonal transformer 2310 performs inverse orthogonal transform, which is the inverse of orthogonal transform, to a significant portion of the inversely quantized data, and outputs inversely transformed data. An adder 2311 adds the inversely transformed data to the prediction image to obtain a decoded image, and outputs the decoded image to the frame memory 2312. The decoded image is stored in the frame memory 2312 and used as a reference image. A prediction image pixel generator 2314 performs padding to the prediction image output from the prediction image generator 2304.

A description is given of the operation of the image coding apparatus so constructed. Initially, the input signal 2301 is applied to the image coding apparatus. An image signal included in the input signal 2301 is input to the motion vector detector 2302 and the differentiator 2303. The motion vector detector 2302 detects a motion vector from the input image signal using the reference image output from the frame memory 2312, and outputs the obtained motion vector to the prediction image generator 2304. The prediction image generator 2304 performs motion compensation to the reference image output from the frame memory 2312, using the motion vector output from the motion vector detector 2302, to generate a prediction image. The prediction image is input to the prediction image pixel generator 2314.

In the prediction image pixel generator 2314, the prediction image is divided into plural small prediction areas, and a prediction image padding pixel value is obtained using a prescribed function on the basis of pixel values in a significant portion of each small area. Then, pixels in an insignificant portion of each small area is replaced with pixels having the padding pixel value, thereby to generate a padded prediction image. The padded prediction image is input to the adder 2311 and to the differentiator 2303. In the differentiator 2303, a difference between the input image signal and the padded prediction image is obtained as differential data, the differential data is output to the shape adaptive orthogonal transformer 2307.

The shape adaptive orthogonal transformer 2307 transforms only significant pixels in the differential data, and outputs transformed data to the quantizer 2308. The quantizer 2308 quantizes the transformed data, and outputs quantized data to the variable-length coder 2313 and to the inverse quantizer 2309. The variable-length coder 2313 codes the quantized data, and outputs coded data 2314 from the apparatus.

On the other hand, the inverse quantizer 2309 performs inverse quantization to the input quantized data, and outputs inversely quantized data to the shape adaptive inverse orthogonal transformer 2310. The shape adaptive inverse orthogonal transformer 2310 performs inverse orthogonal transform to the inversely quantized data, and outputs inversely transformed data to the adder 2311. The adder 2311 adds the inversely transformed data to the padded prediction image output from the prediction image pixel generator 2314 to generate a decoded image, and outputs the decoded image to the frame memory 2312. The decoded image is stored in the frame memory 2312 and used as a reference image.

As described above, in the image coding apparatus according to this thirteenth embodiment, the prediction image pixel generator 2314 is added to the shape adaptive orthogonal transformer 2307 and the shape adaptive inverse orthogonal transformer 2310, and the prediction image is subjected to the above-described padding. Therefore, differential data suitable for compressive coding is obtained, whereby the coding efficiency is improved. When the shape adaptive orthogonal transform is performed, since only significant pixels are the target of the transform, unwanted reduction in coding efficiency due to influence of pixel values of insignificant pixels is avoided. So, sufficient coding efficiency is obtained even though the padding is not performed to the differential data which is the target of the transform. However, if the padding to the prediction image is preformed in the shape adaptive orthogonal transform, the prediction accuracy is improved, resulting in further improved in the coding efficiency.

An image decoding apparatus is realized when the inverse orthogonal transformer 1704 in the image decoding apparatus according to the tenth embodiment is replaced with the shape adaptive inverse orthogonal transformer 2309 according to this thirteenth embodiment. This image decoding apparatus can perform a decoding process adapted to coded data which is efficiently coded by the image coding apparatus according to this thirteenth embodiment.

Embodiment 14

An image decoding apparatus according to a fourteenth embodiment of the invention decodes coded data obtained in a coding process in which an area including significant pixels is divided and subjected to compressive coding.

Figure 24:
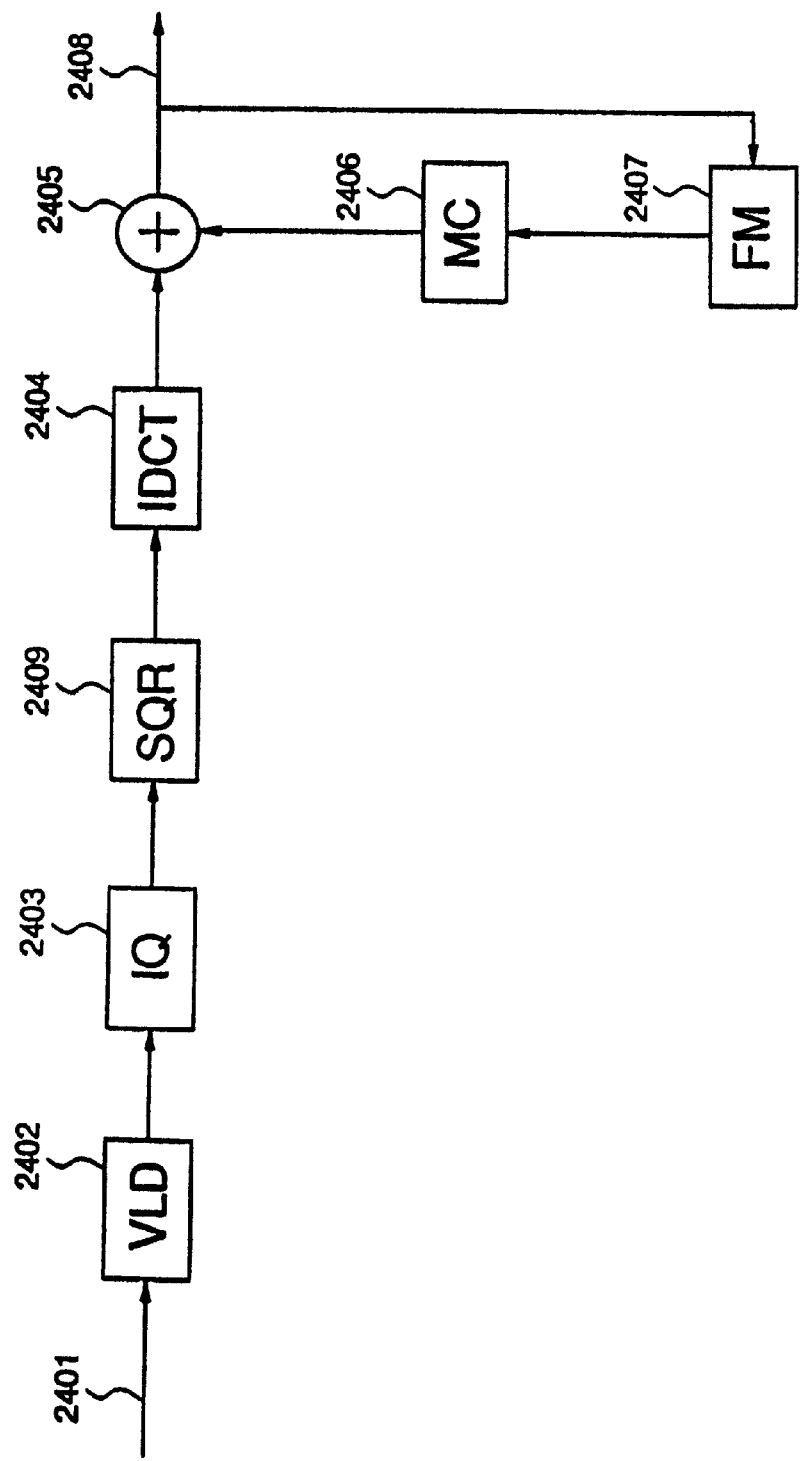
FIG. 24 is a block diagram illustrating an image decoding apparatus according to a fourteenth embodiment of the present invention.
Figure 25:
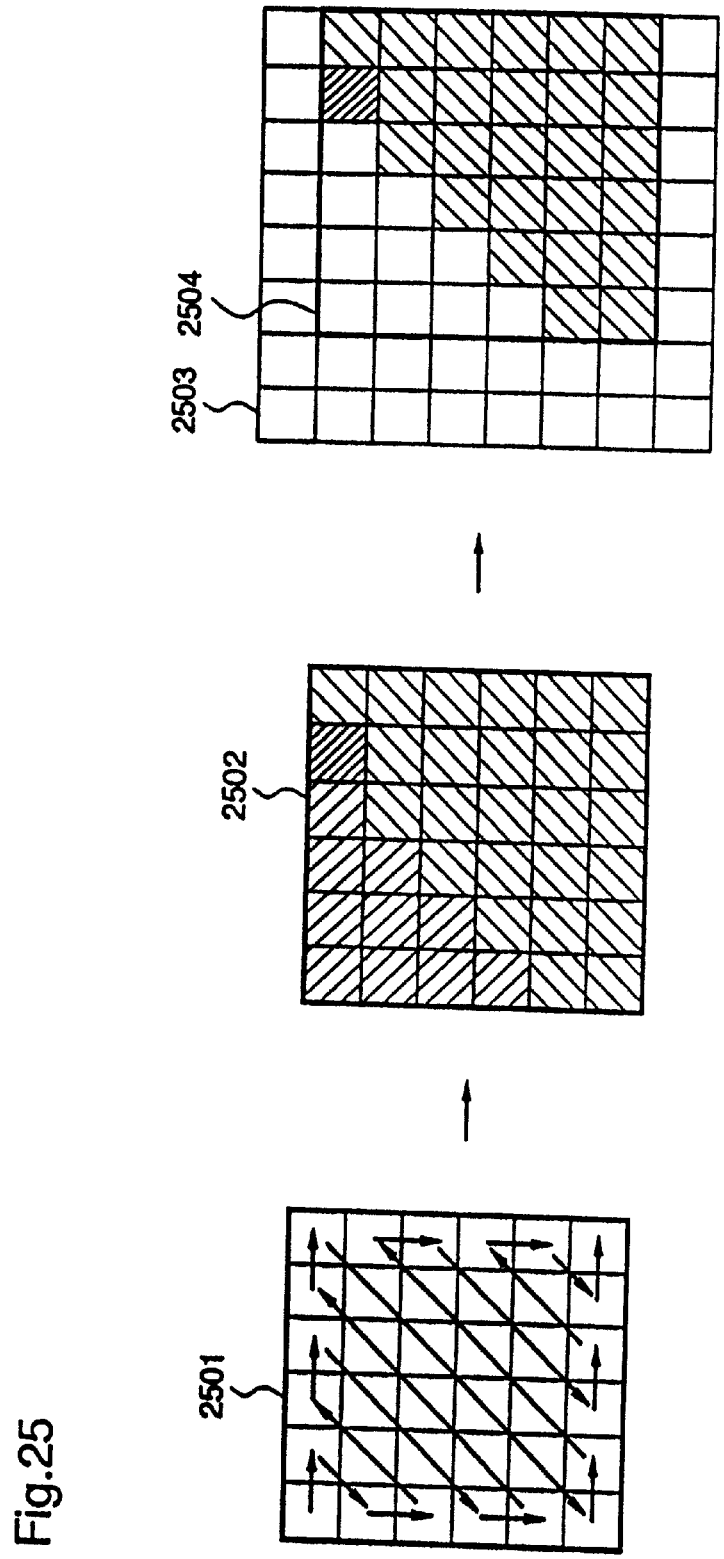
FIG. 25 is a diagram for explaining a decoding process according to the fourteenth embodiment of the invention.

FIG. 24 is a block diagram illustrating an image decoding apparatus according to the fourteenth embodiment of the invention. In FIG. 24, a square area divider 2409 performs division to produce small square areas each including significant pixels, according to a significant signal. Other parts are identical to those already described for the ninth embodiment shown in FIG. 16. FIG. 25 is a diagram for explaining decoding performed by the image decoding apparatus shown in FIG. 24.

Hereinafter, the operation of the image decoding apparatus so constructed will be described using FIG. 25. For an input signal 2401 shown in FIG. 24, a significant area specified by the significant signal is subjected to variable-length coding and then rearranged to make the arrangement before coding, providing a significant area data 2501. Then, an inverse quantization table used for inverse quantization of the square area of the significant area data 2501 is selected, and inverse quantization is performed using this table, providing inversely quantized data 2502. For the inversely quantized data 2502, a calculation base specified by the significant signal is selected, and inverse orthogonal transform is executed using the calculation base, providing inversely transformed data 2504. The inversely transformed data 2504 is transformed with reference to the significant signal, providing a decoded block 2503.

As described above, according to the fourteenth embodiment of the invention, the image decoding apparatus is equipped with the variable-length decoder 2402, the inverse quantizer 2403, the square area divider 2409, and the inverse orthogonal transformer 2404, and decoding is performed on the basis of the significant signal. Therefore, it is possible to obtain a decoded image by decoding coded data which is divided into square areas including significant pixels in the coding process.

The above-mentioned decoding with reference to the significant signal according to this fourteenth embodiment can be applied to the image decoding apparatuses according to the ninth, tenth, and twelfth embodiments by appropriate setting. Also in these cases, decoding of divided data is possible.

Further, when data is divided into plural areas in the coding process, if the size of each area is set to $2^n$ for high-speed processing, in the decoding process, the horizontal pixel number and the vertical pixel number of the square area should be set to $2^n$ for high-speed processing.

Embodiment 15

An image decoding apparatus according to a fifteenth embodiment of the invention decodes coded data obtained by division into small rectangle areas including significant pixels and compressive coding, according to scanning in different two directions.

Figure 26:
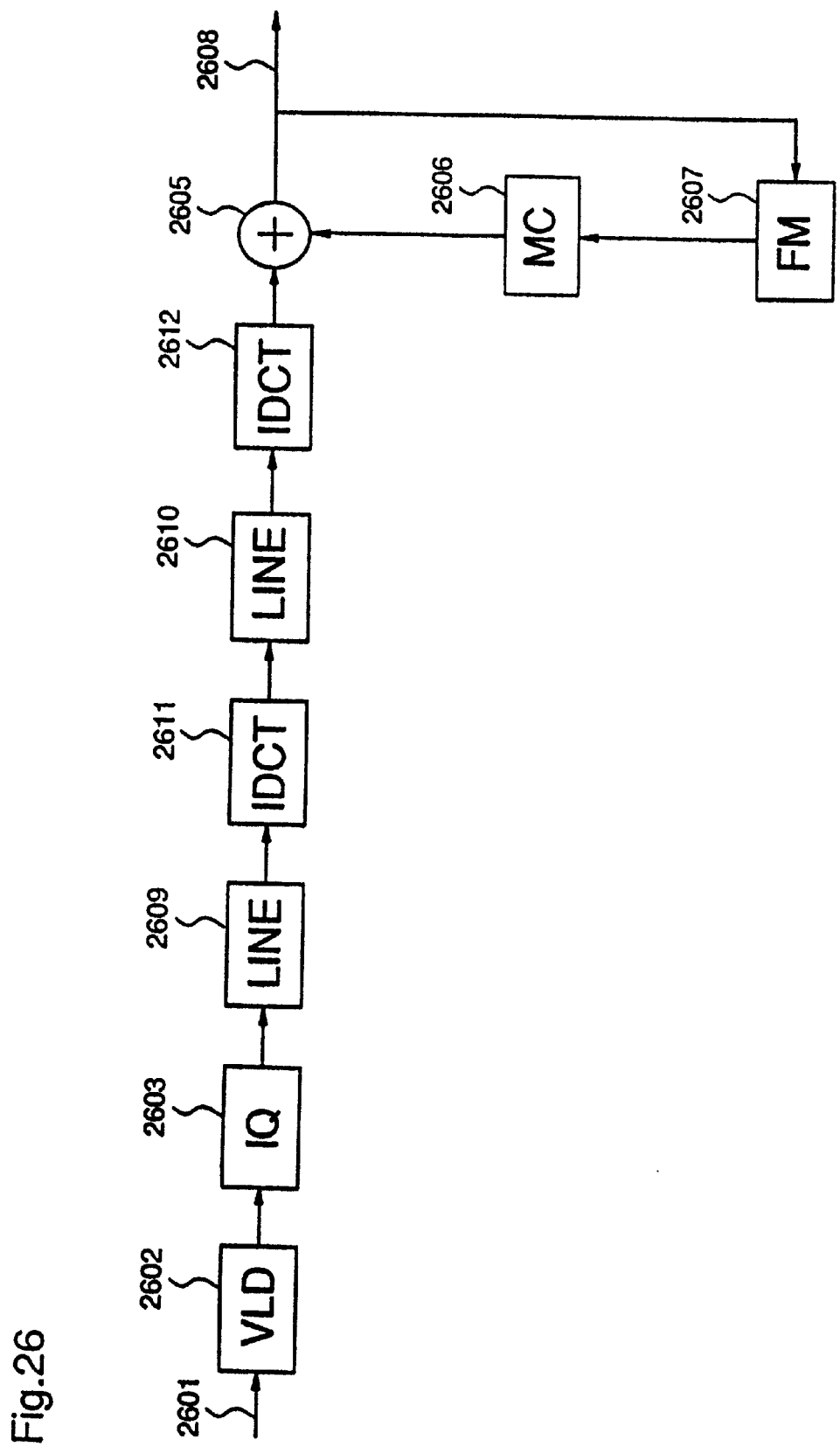
FIG. 26 is a block diagram illustrating an image decoding apparatus according to a fifteenth embodiment of the present invention.
Figure 27:
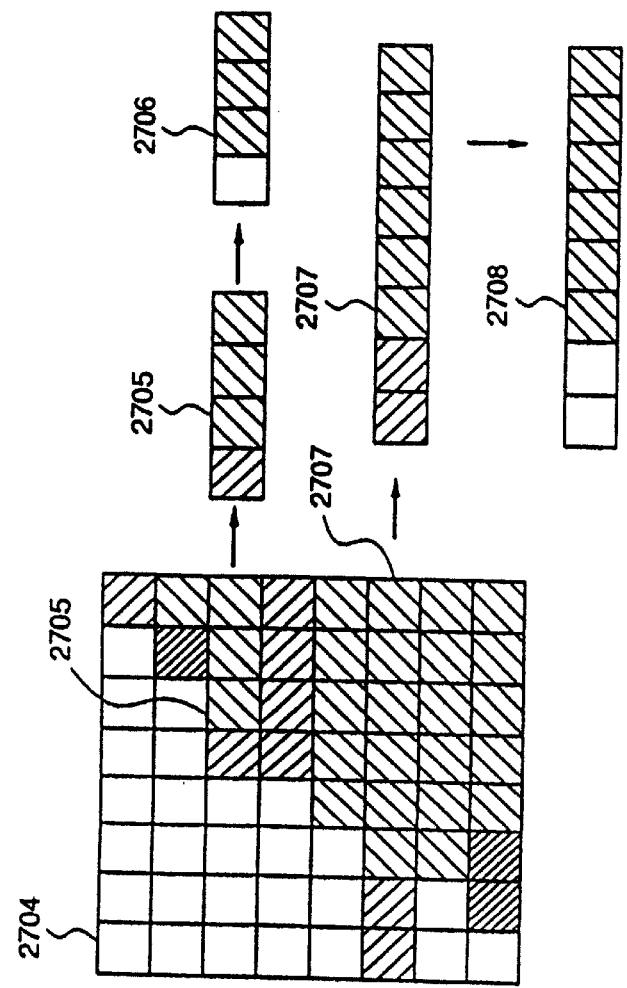
FIGS. 27(a) and 27(b) are diagrams for explaining a decoding process according to the fifteenth embodiment of the invention.

FIG. 26 is a block diagram illustrating an image decoding apparatus according to the fifteenth embodiment of the invention. In the figure, first and second rectangle area dividers 2609 and 2601 divide decoded data into small rectangle areas including significant pixels according to a significant signal. First and second inverse orthogonal transformers 2611 and 2612 performs inverse orthogonal transform, which is the inverse of orthogonal transform, according to the significant signal. Other parts are identical to those already described for the ninth embodiment shown in FIG. 16. FIGS. 27(*a*) and 27(*b*) are diagrams for explaining decoding performed by the image decoding apparatus according to this fourteenth embodiment.

The operation of the image decoding apparatus so constructed will be described hereinafter using FIGS. 27(*a*) and 27(*b*). Initially, an input signal 2601 shown in FIG. 26 is subjected to variable-length decoding and, as shown in FIG. 27(*a*), decoded data is divided into small rectangle areas specified by the significant signal, and each area is rearranged, providing data 2701 having the arrangement before coding. Then, for each small rectangle area, an inverse quantization table is selected, and inverse quantization is performed using the table, providing inversely quantized data. For example, as shown in FIG. 27(*a*), for a one-dimensional area 2702 having the size of $2^n$, which is divided in the vertical direction, is subjected to inverse quantization, providing inversely quantized data 2703. Then, for each inversely quantized data, a calculation base specified by the significant signal is selected, and inverse orthogonal transform is executed using the calculation base, providing inversely transformed data 2704.

Thereafter, as shown in FIG. 27(*b*), the inversely transformed data 2704 is divided, in the horizontal direction, into plural one-dimensional areas each having the size of $2^n$. For example, small areas 2705 and 2707 are obtained by the division. For each small area, a calculation base specified by the significant signal is selected, and inverse orthogonal transform is executed using the calculation base, providing inversely transformed data 2706 and 2708.

Figure 28:
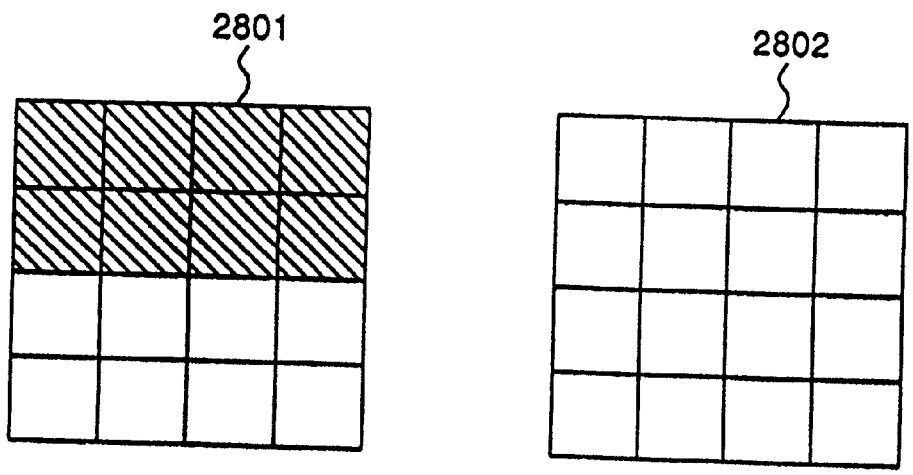
FIGS. 28(a) and 28(b) are diagrams for explaining a decoding process according to the fifteenth embodiment of the invention.
Figure 28:
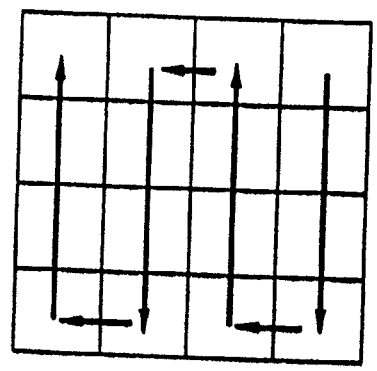

Further, it is possible to decode data which has been coded by zigzag scanning of a specified pattern, by setting the variable-length decoder 2602. FIGS. 28(*a*) and 28(*b*) are diagrams for explaining zigzag scanning. In FIG. 28(*a*), reference numeral 2801 designates a significant signal. Referring to the significant signal, the variable-length decoder 2602 estimates the distribution of compressively coded components to be decoded, and decides the pattern of zigzag scanning to the coded data 2802 according to the significant signal 2801, as shown in FIG. 28(*b*). Further, the variable-length decoder 2602 can perform decoding by changing plural zigzag scanning patterns with reference to the significant signal.

As described above, the image decoding apparatus according to this fifteenth embodiment is equipped with the variable-length decoder 2602, the inverse quantizer 2603, the first and second rectangle area dividers 2609 and 2610, and the first and second inverse orthogonal transformers 2611 and 2612, and the inverse of coding, i.e., decoding, is performed on the basis of the significant signal. Therefore, it is possible to produce a decoded image by decoding coded data which is obtained by division into rectangle areas including significant pixels according to scanning in different two directions. Further, when the variable-length decoder 2602 is set so that it decides the pattern of zigzag scanning with reference to the significant signal, the decoder can perform efficient decoding adaptively to coded data which is obtained by scanning with a particular zigzag pattern or by scanning using plural zigzag patterns.

The above-mentioned decoding process with reference to the significant signal according to this fourteenth embodiment can be applied to the image decoding apparatuses according to the ninth, tenth, and twelfth embodiments by appropriate setting. Also in these cases, decoding of divided data, or decoding of data obtained by specified zigzag scanning pattern, is possible.

Embodiment 16

In an image coding apparatus according to a sixteenth embodiment of the present invention, a prediction image is subjected to padding, and data used for the padding is added to coded data.

Figure 29:
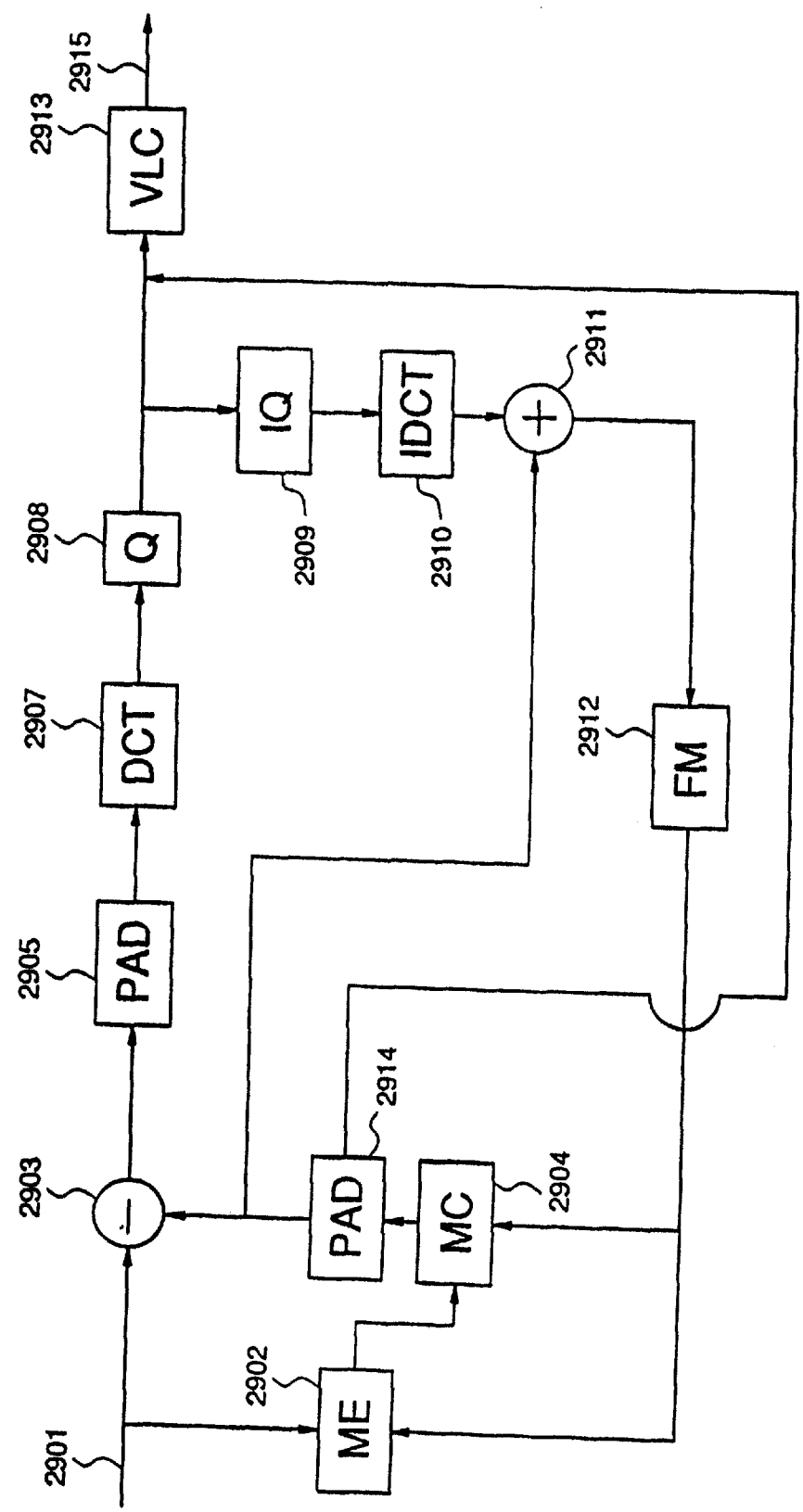
FIG. 29 is a block diagram illustrating an image coding apparatus according to a sixteenth embodiment of the present invention.

FIG. 29 is a block diagram illustrating an image coding apparatus according to the sixteenth embodiment of the invention. In the figure, a prediction image pixel generator 2914 generates a padding pixel value for a prediction image and performs padding of the prediction image using the padding pixel value. The prediction image pixel generator 2914 outputs the padding pixel value to the variable-length coder 2913, and the variable-length coder 2913 outputs coded data 2915 to which the padding pixel value is added as additional information. Other parts and operations thereof are identical to those described for the image coding apparatus according to the eighth embodiment shown in FIG. 15.

As described above, in the image coding apparatus according to the sixteenth embodiment, since the padding pixel value used for padding by the prediction image pixel generator 2914 is added to the coded data as additional information, when this coded data is decoded, the additional information can be used.

Embodiment 17

An image decoding apparatus according to a seventeenth embodiment of the present invention performs padding at decoding using additional information added to coded data.

Figure 30:
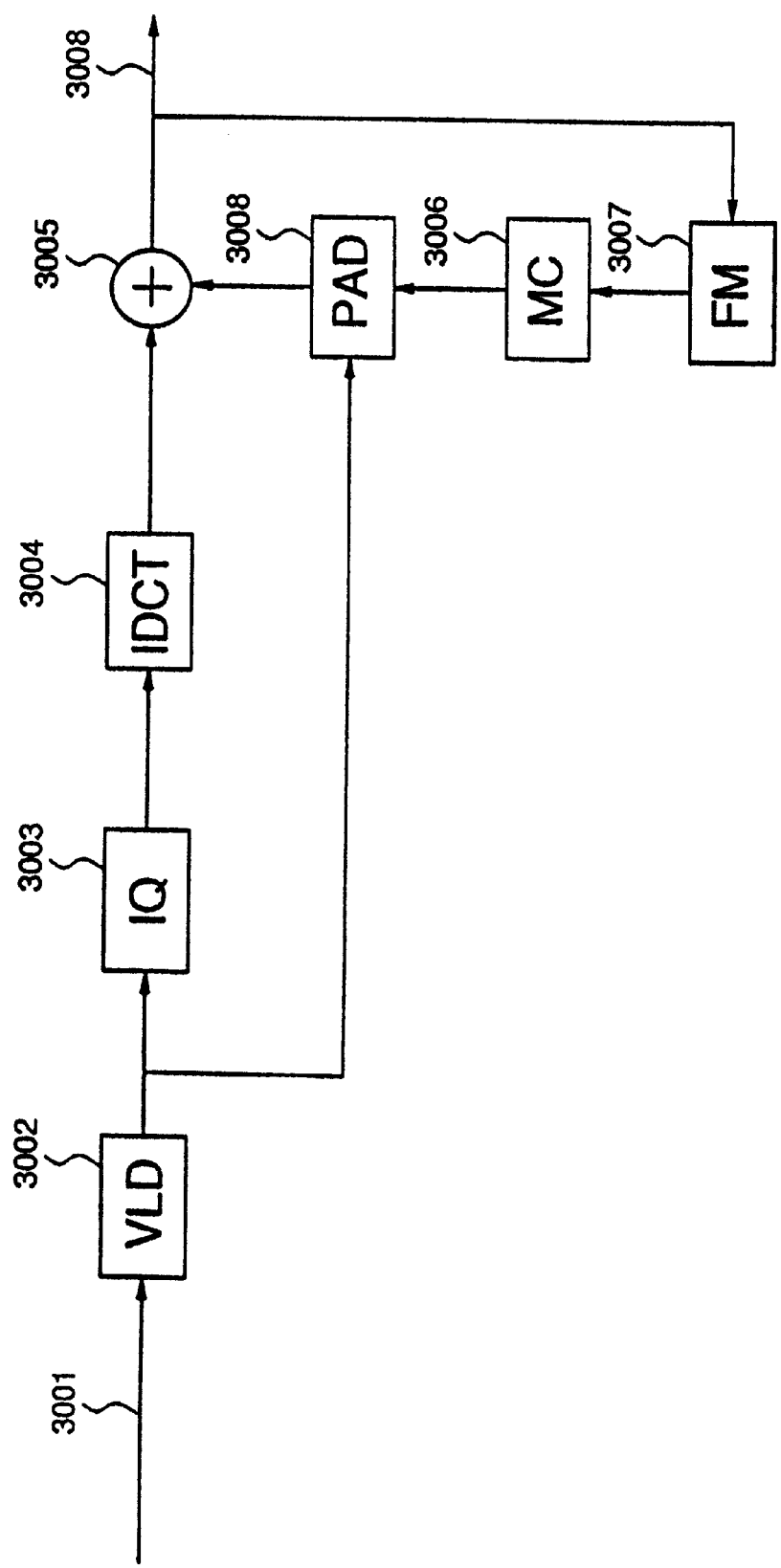
FIG. 30 is a block diagram illustrating an image decoding apparatus according to a seventeenth embodiment of the present invention.

FIG. 30 is a block diagram illustrating an image decoding apparatus according to the seventeenth embodiment of the invention. This image decoding apparatus receives, as an input signal, coded data (2915 in FIG. 29) with additional information (padding pixel value) obtained by the image coding apparatus according to the sixteenth embodiment, and a variable-length decoder 3002 outputs a padding pixel value, which is obtained by decoding as additional information, to a pixel generator 3008. Then, the pixel generator 3008 performs padding to a prediction image using the padding pixel value. Other parts and operations thereof are identical to those described for the image decoding apparatus according to the tenth embodiment shown in FIG. 17.

As described above, in the image decoding apparatus according to this sixteenth embodiment, since the padding pixel value input to the apparatus as additional information in the input signal is used as a padding pixel value used for padding by the pixel generator 3008, the process of the pixel generator 3008 is simplified.

Embodiment 18

An image coding apparatus according to an eighteenth embodiment of the invention performs motion compensation only to significant pixels to improve coding efficiency.

Figure 31:
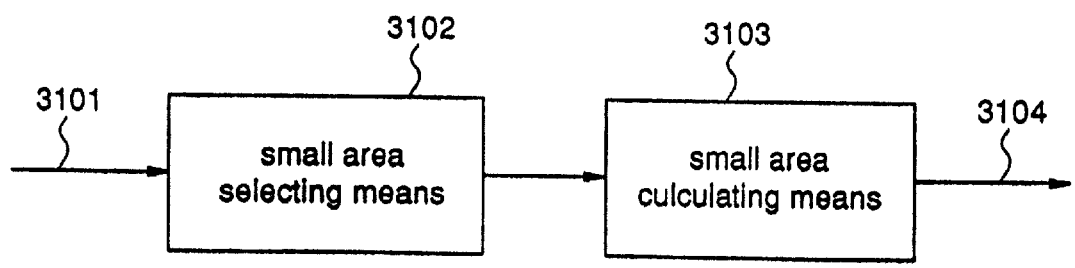
FIG. 31 is a block diagram illustrating a prediction image generator included in an image coding apparatus according to an eighteenth embodiment of the present invention.
Figure 32:
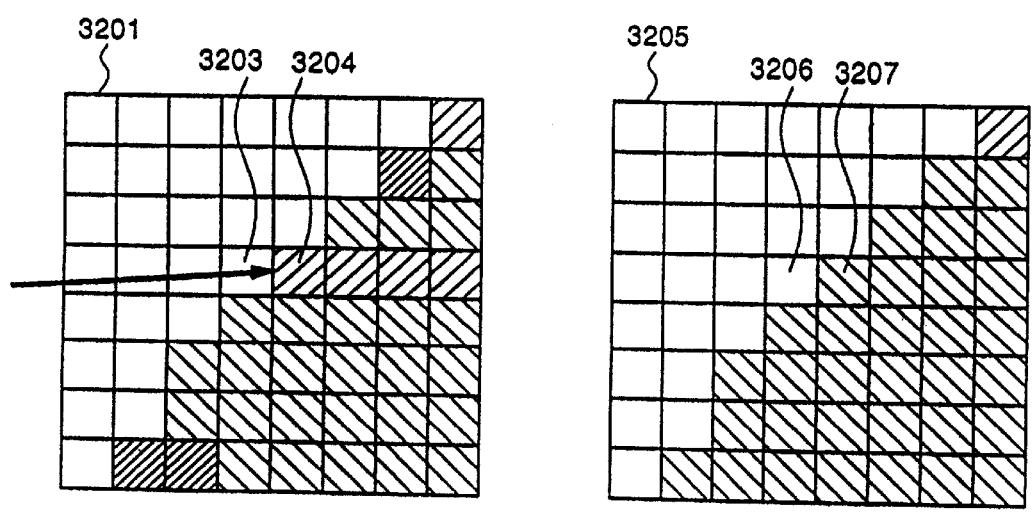
FIG. 32 is a diagram for explaining a coding process according to the eighteenth embodiment of the invention.

The entire structure of the image coding apparatus according to this eighteenth embodiment is identical to the image coding apparatus according to the first embodiment except the structure of the prediction image generator 104. FIG. 31 is a block diagram illustrating the structure of the prediction image generator according to this eighteenth embodiment. FIG. 32 is a diagram for explaining motion compensation performed by the prediction image generator.

The operation of the image coding apparatus according to this image coding apparatus is identical to that of the apparatus according to the first embodiment except the motion compensation and, therefore, only the motion compensation is described using FIGS. 31 and 32.

In FIG. 31, reference numeral 3101 designates an input signal to the prediction image generator, and the input signal comprises a reference image corresponding to each small area to be coded (target area) and a significant signal corresponding to the reference image. A small area selecting means 3102 selects a small area to be the target of prediction from the reference signal. A small area calculating means 3103 generates a significant small area 2904, with reference to a significant signal corresponding to the prediction target area selected by the small area selecting means 3102, using only pixel values of significant pixels in the prediction target area.

The generation of the significant small area by the small area calculating means 3103 will be described using FIG. 32. In FIG. 32, reference numeral 3201 designates a reference image for motion compensation, and numeral 3205 designates a significant signal corresponding to the reference image 3201. Reference numeral 3202 designates a motion vector showing a point to be the target of motion compensation. The motion vector 3202 specifies a point on the reference image 3201 with a half-pixel precision. Accordingly, the target point of motion compensation is calculated from pixels 3203 and 3204. At this time, in the significant signal 3205, a pixel 3206 corresponding to the pixel 3203 shows "insignificant" and a pixel 3207 corresponding to the pixel 3204 shows "significant". Accordingly, the pixel 3204 is not the target of calculation.

As described above, in the image coding apparatus according to this eighteenth embodiment, the prediction image generator is equipped with the small area selecting means 3102 and the small area calculating means 3103, and only significant pixels are used for calculation in motion compensation. Therefore, unwanted reduction in accuracy in motion compensation due to pixel values of insignificant pixels is avoided.

Although in this eighteenth embodiment the structure of prediction image generator shown in FIG. 31 is applied to the image coding apparatus according to the first embodiment, it may be applied to the image coding (decoding) apparatuses according to other embodiments of the invention for improved accuracy in motion compensation.

Embodiment 19

In an image coding apparatus according to a nineteenth embodiment of the invention, variable-length coding is performed with reference to a significant signal.

Figure 33:
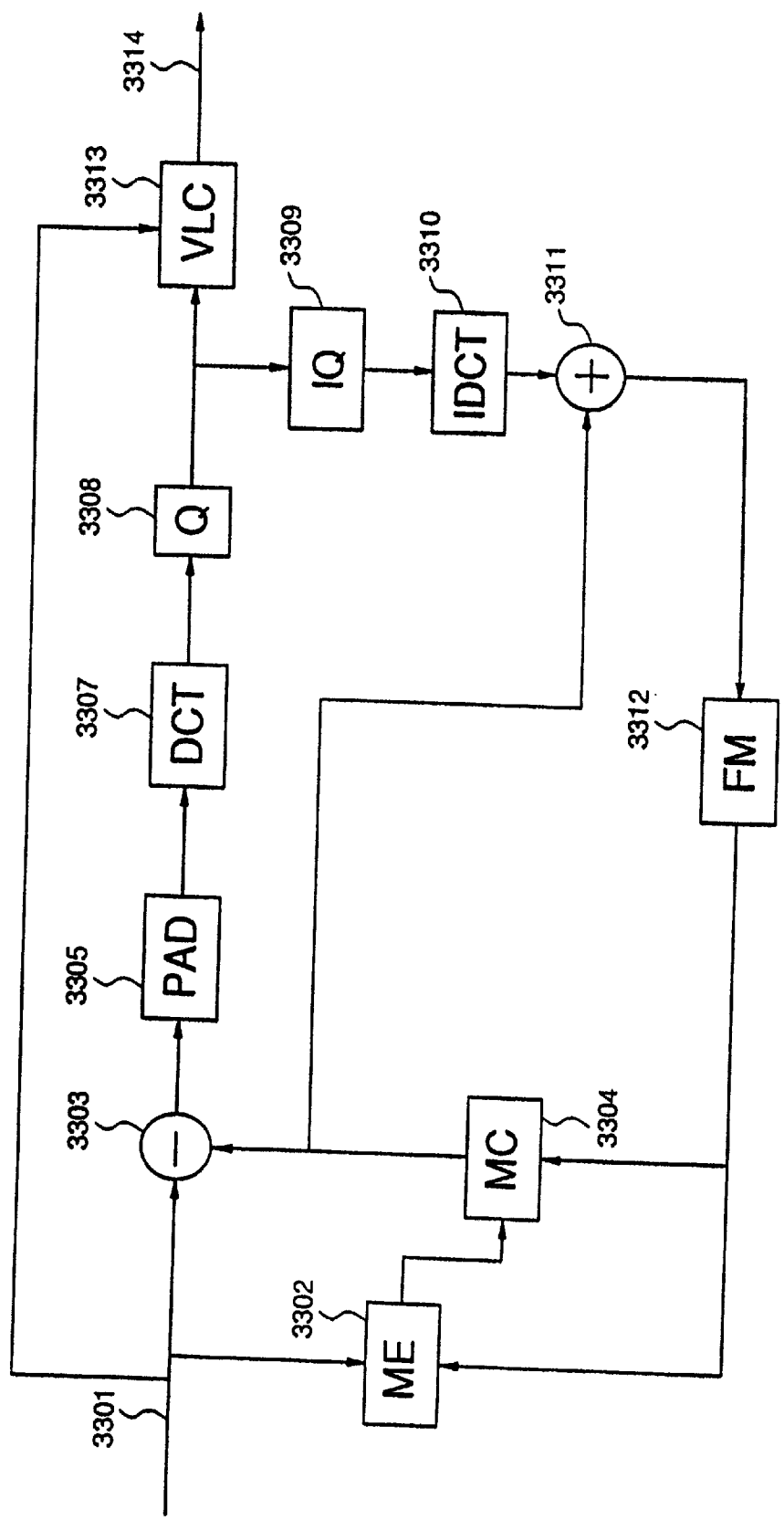
FIG. 33 is a block diagram illustrating an image coding apparatus according to a nineteenth embodiment of the present invention.
Figure 34:
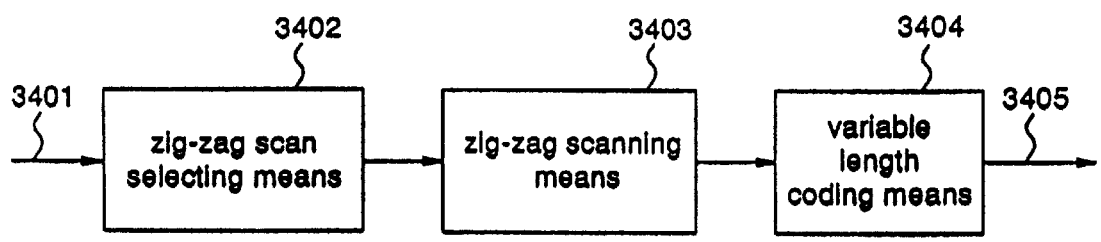
FIG. 34 is a block diagram illustrating a variable-length coder included in the image coding apparatus according to a nineteenth embodiment of the present invention.

FIG. 33 is a block diagram illustrating an image coding apparatus according to the nineteenth embodiment of the invention. In the figure, variable-length coder 3313 receives a significant signal included in an input signal 3301, and performs variable-length coding of quantized data with reference to the significant signal. FIG. 34 is a block diagram illustrating the internal structure of the variable-length coder 3313. Other parts are identical to those described for the fourth embodiment of the invention.

The operation of the image coding apparatus according to the nineteenth embodiment is identical to that of the apparatus according to the fourth embodiment except the variable-length coding process and, therefore, only the variable-length coding will be described using FIG. 34.

In FIG. 34, reference numeral 3401 designates an input signal comprising quantized data output from the quantizer 3308 and the above-mentioned significant signal. A zigzag scan selecting means 3402 selects a pattern of zigzag scanning performed in variable-length coding, according to the significant signal. A zigzag scanning means 3403 executes zigzag scanning according to the pattern selected by the zigzag scan selecting means 3402. A variable-length coding means 3404 performs variable-length coding of pixels selected by the zigzag scanning. The selection of zigzag scanning pattern by the selecting means 3402 is carried out so that pixels (rows) of higher correlation are scanned with higher priority, like the fourth embodiment of the invention.

As described above, in the image coding apparatus according to the nineteenth embodiment of the invention, since the variable-length coder 3313 is equipped with the zigzag scan selecting means 3402, significant pixels are coded with priority, whereby the coding efficiency is improved.

Embodiment 20

In an image decoding apparatus according to a twentieth embodiment of the invention, variable-length decoding is performed with reference to a significant signal.

The structure of the image decoding apparatus according to this twentieth embodiment is identical to the image decoding apparatus according to the ninth embodiment shown in FIG. 16. The operation of the apparatus is also identical to that according to the ninth embodiment except the variable-length decoding process and, therefore, only the variable-length decoding will be described hereinafter using FIG. 35.

Figure 35:
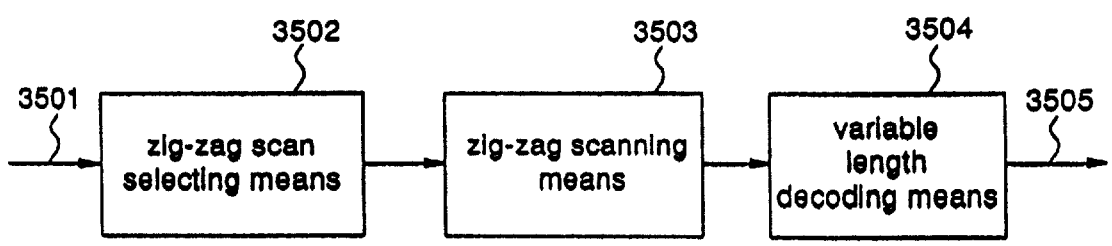
FIG. 35 is a block diagram illustrating a variable-length decoder included in an image decoding apparatus according to a twentieth embodiment of the present invention.

FIG. 35 is a block diagram illustrating a variable-length decoder according to this twentieth embodiment. In FIG. 35, reference numeral 3501 designates an input signal comprising a coded image signal and a significant signal corresponding to the image signal. A zigzag scan selecting means 3502 selects a pattern of zigzag scanning in variable-length decoding, according to the significant signal. A zigzag scanning means 3503 executes zigzag scanning according to the pattern selected by the zigzag scan selecting means 3502. A variable-length decoding means 3504 performs variable-length decoding of pixels selected by the zigzag scanning. The selection of zigzag scanning pattern by the selecting means 3502 is carried out so that pixels (rows) of higher correlation are scanned with higher priority, like the fifteenth embodiment of the invention.

As described above, in the image decoding apparatus according to the twentieth embodiment of the invention, since the variable-length decoder is equipped with the zigzag scan selecting means 3502, significant pixels are decoded with priority. Therefore, this decoding apparatus performs decoding adaptively to coded data which is obtained by zigzag scanning using a particular scanning pattern.

Although the image decoding apparatus according to this twentieth embodiment is based on the ninth embodiment, it may be based on the tenth or twelfth embodiment. Also in this case, decoding of similar coded data is possible.

The image coding (decoding) apparatus according to any of the first to twentieth embodiments of the invention can be implemented in a personal computer or a work station by recording an image coding (decoding) program that executes an appropriate image coding (decoding) method in a recording medium, such as a floppy disk, and executing the recorded program.

In the image coding apparatus and the image decoding apparatus according to the first to twentieth embodiments of the invention, image coding and decoding are performed using blocks of 8×8 and 4×4. However, these are merely examples, and any apparatus according to the present invention can process the target as a block of n×m (n,m=natural number) according to the performance of the apparatus and the characteristics of the processing target.

What is claimed is:

1. An image coding apparatus for coding an input signal comprising an image signal being an array of pixels having pixel values, and a significant signal showing whether the image signal is significant or not, said apparatus comprising:

prediction image generating means for specifying, as a target area, an area of the input image signal to be the target of coding, on the basis of the input significant signal, and generating a prediction image for the target area, using a locally reproduced image which is described later;

subtraction means for dividing the prediction image into a plurality of small prediction areas, dividing the target area into a plurality of small target areas, subtracting each small prediction area from corresponding small target area, and outputting a differential signal;

first area dividing means for dividing a rectangle area including significant pixels from the differential signal in a first direction using the significant signal, and outputting the rectangle area as a first significant area;

pixel generating means for generating a padding pixel value using a prescribed first function on the basis of pixel values of the significant pixels in the first significant area, replacing pixel values of insignificant pixels in the significant area with the padding pixel value, and outputting a padded signal;

first coding means for coding the padded signal and outputting a first coded signal;

second area dividing means for dividing an area from the first coded signal in a second direction different from the first direction, and outputting the area as a second significant area;

padding component generating means for generating a padding coded component using a second function on the basis of coded components of the first coded signal when the coded components of the first coded signal do not exist in the second significant area, replacing coded components which are not the coded components of the first coded signal in the second significant area, with the padding coded component, and outputting a padded coded signal;

second coding means for coding the padded coded signal and outputting a second coded signal;

decoding means for decoding the second coded signal and outputting a decoded signal;

addition means for adding the decoded signal and the prediction image to generate a locally reproduced image; and storage means for temporality storing the locally reproduced image for use in the prediction image generating means.

2. The image coding apparatus of claim 1 wherein the first area dividing means and the second area dividing means perform division so that the significant area becomes a one-dimensional area including pixels of the n-th power of 2 ($2^n$) in number.

3. An image coding apparatus for coding an input signal comprising an image signal being an array of pixels having pixel values, and a significant signal showing whether the image signal is significant or not, said apparatus comprising:

prediction image generating means for specifying, as a target area, an area of the input image signal to be the target of coding, on the basis of the input significant signal, and generating a prediction image for the target area, using a locally reproduced image which is described later;

subtraction means for dividing the prediction image into a plurality of small prediction areas, dividing the target area into a plurality of small target areas, subtracting each small prediction area from corresponding small target area, and outputting a differential signal;

area dividing means for dividing a rectangle area including significant pixels from the differential signal using the significant signal, and outputting the rectangle area as a significant area;

pixel generating means for performing first padding and second padding, said first padding comprising generating a first padding pixel value using a first function on the basis of pixel values of significant pixels in the significant area, replacing pixel values of insignificant pixels in the significant area with the first padding pixel value, and outputting a first padded signal, and the second padding comprising generating a second padding pixel value using a second function, and using, as boundary pixels, the replaced pixels abutting on the significant pixels in the significant area, on the basis of pixel values of pixels in the vicinity of the boundary pixels, replacing the pixel values of the boundary pixels with the second padding pixel value, and outputting a second padded signal, said second padded signal being output as a padded signal;

coding means for coding the padded signal and outputting a coded signal;

decoding means for decoding the coded signal and outputting a decoded signal;

addition means for adding the decoded signal and the prediction image to generate a locally reproduced image; and storage means for temporality storing the locally reproduced image for use in the prediction image generating means.

4. The image coding apparatus of claim 3 wherein the pixel generating means generates the second padding pixel value on the basis of pixel values of significant pixels adjacent to the boundary pixels.

5. An image coding apparatus for coding an input signal comprising an image signal being an array of pixels having pixel values, and a significant signal showing whether the image signal is significant or not, said apparatus comprising:

prediction image generating means for specifying, as a target area, an area of the input image signal to be the target of coding, on the basis of the input significant signal, and generating a prediction image for the target area, using a locally reproduced image which is described later;

subtraction means for dividing the prediction image into a plurality of small prediction areas, dividing the target area into a plurality of small target areas, subtracting each small prediction area from corresponding small target area, and outputting a differential signal;

pixel generating means for generating a padding pixel value using a prescribed function on the basis of pixel values of the significant pixels in the signal output from the subtraction means, replacing pixel values of insignificant pixels in the significant area with the padding pixel value, and outputting a padded signal;

shape adaptive orthogonal transform means for orthogonally transforming only the pixel values of the significant pixels in the padded signal, and outputting a shape adaptive orthogonally transformed signal;

coding means for coding the shape adaptive orthogonally transformed signal and outputting a shape adaptive coded signal;

decoding means for decoding the shape adaptive coded signal and outputting a shape adaptive decoded signal;

inverse orthogonal transform means for inversely and orthogonally transforming the decoded signal and outputting a shape adaptive inversely and orthogonally transformed signal;

addition means for adding the shape adaptive inversely and orthogonally transformed signal and the prediction image to generate a locally reproduced image; and storage means for temporarily storing the locally reproduced image for use in the prediction image generating means.

6. An image coding apparatus for coding an input signal comprising an image signal being an array of pixels having pixel values, and a significant signal showing whether the image signal is significant or not, said apparatus comprising:

prediction image generating means for specifying, as a target area, an area of the input image signal to be the target of coding, on the basis of the input significant signal, and generating a prediction image for the target area, using a locally reproduced image which is described later;

subtraction means for dividing the prediction image into a plurality of small prediction areas, dividing the target area into a plurality of small target areas, subtracting each small prediction area from corresponding small target area, and outputting a differential signal;

area dividing means for dividing a rectangle area including significant pixels from the differential signal output from the subtraction means using the significant signal, and outputting the rectangle area as a significant area;

pixel generating means for generating a padding pixel value using a prescribed function on the basis of pixel values of the significant pixels in the significant area, replacing pixel values of insignificant pixels in the significant area with the padding pixel value, and outputting a padded signal;

shape adaptive orthogonal transform means for orthogonally transforming only the pixel values of the significant pixels in the padded signal, and outputting a shape adaptive orthogonally transformed signal;

coding means for coding the shape adaptive orthogonally transformed signal and outputting a shape adaptive coded signal;

decoding means for decoding the shape adaptive coded signal and outputting a shape adaptive decoded signal;

inverse orthogonal transform means for inversely and orthogonally transforming the decoded signal and outputting a shape adaptive inversely and orthogonally transformed signal;

addition means for adding the shape adaptive inversely and orthogonally transformed signal and the prediction image to generate a locally reproduced image; and storage means for temporarily storing the locally reproduced image for use in the prediction image generating means.

7. An image coding apparatus for coding an input signal comprising an image signal being an array of pixels having pixel values, and a significant signal showing whether the image signal is significant or not, said apparatus comprising:

prediction image generating means for specifying, as a target area, an area of the input image signal to be the target of coding, on the basis of the input significant signal, and generating a prediction image for the target area, using a locally reproduced image which is described later;

subtraction means for dividing the prediction image into a plurality of small prediction areas, dividing the target area into a plurality of small target areas, subtracting each small prediction area from corresponding small target area, and outputting a differential signal;

pixel generating means for generating a padding pixel value using a prescribed function on the basis of pixel values of the significant pixels in the differential signal, replacing pixel values of insignificant pixels in the significant area with the padding pixel value, and outputting a padded signal;

first coding means for coding the padded signal and outputting a first coded signal;

second coding means for deciding the order of coding for coded components included in the first coded signal on the basis of the significant signal, and coding the first coded signal according to the decided order, and outputting a second coded signal;

addition means for adding the decoded signal and the prediction image to generate a locally reproduced image; and storage means for temporarily storing the locally reproduced image for use in the prediction image generating means.

8. The image coding apparatus of claim 7 wherein the second coding means decides the order according to the positions of the significant pixels obtained on the basis of the significant signal.

9. The image coding apparatus of claim 7 further comprising coding selecting means for selecting a coding method used by the second coding means, with reference to the significant pixels obtained on the basis of the significant signal.

10. An image coding apparatus for coding an input signal comprising an image signal being an array of pixels having pixel values, and a significant signal showing whether the image signal is significant or not, said apparatus comprising:

motion predicting means for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal;

prediction image generating means for performing motion compensation using the locally reproduced image and the motion prediction signal, and outputting a prediction image;

subtraction means for dividing the prediction image into a plurality of small prediction areas, dividing the target area into a plurality of small target areas, subtracting each small prediction area from corresponding small target area, and outputting a differential signal;

coding means for coding the differential signal and outputting a coded signal;

decoding means for decoding the coded signal and outputting a decoded signal;

addition means for adding the decoded signal and the prediction image to generate a locally reproduced image; and storage means for temporarily storing the locally reproduced image for use in the prediction image generating means.

11. The image coding apparatus of claim 10 wherein the motion predicting means performs:

a prediction image pixel generating process in which small prediction areas, each area having the same size as the target small area, are obtained by division from at least one locally reproduced image; a prediction image padding pixel value is generated using a prescribed function on the basis of pixel values of significant pixels in each small prediction area; pixel values of insignificant pixels in the small prediction area are replaced with the prediction image padding pixel value; and padded small prediction areas are output; and an optimum small prediction area selecting process in which an optimum small prediction area having a smallest error from the target small area is selected from the padded small prediction areas.

12. The image coding apparatus of claim 11 wherein the prediction image pixel generating process employs a function that provides the average of the pixel values of the significant pixels.

13. An image coding apparatus for coding an input signal comprising an image signal being an array of pixels having pixel values, and a significant signal showing whether the image signal is significant or not, said apparatus comprising:

pixel generating means for specifying, as a target area, an area of the input image signal to be the target of coding, on the basis of the input significant signal, dividing the target area into a plurality of small target areas, generating a padding pixel value using a prescribed function on the basis of pixel values of significant pixels in each target small area, replacing pixel values of insignificant pixels in the target small area with the padding pixel value, and outputting a padded target small area;

motion predicting means for performing motion prediction to the padded target small area using a locally reproduced image that is described later, and outputting a motion prediction signal;

prediction image generating means for performing motion compensation using the locally reproduced image and the motion prediction signal, and outputting a prediction image;

subtraction means for dividing the prediction image into a plurality of small prediction areas, subtracting each small prediction area from corresponding small target area, and outputting a differential signal;

coding means for coding the differential signal and outputting a coded signal;

decoding means for decoding the coded signal and outputting a decoded signal;

addition means for adding the decoded signal and the prediction image to generate a locally reproduced image; and storage means for temporarily storing the locally reproduced image for use in the prediction image generating means.

14. The image coding apparatus of claim 13 wherein the motion predicting means performs:

a prediction image pixel generating process in which small prediction areas, each area having the same size as the target small area, are obtained by division from at least one locally reproduced image; a prediction image padding pixel value is generated using a prescribed function on the basis of pixel values of significant pixels in each small prediction area; pixel values of insignificant pixels in the small prediction area are replaced with the prediction image padding pixel value; and padded small prediction areas are output; and an optimum small prediction area selecting process in which an optimum small prediction area having a smallest error from the target small area is selected from the padded small prediction areas.

15. The image coding apparatus of claim 14 wherein the prediction image pixel generating process employs a function that provides the average of the pixel values of the significant pixels.

16. The image coding apparatus of claim 13 wherein the pixel generating means employs a function that provides the average of the pixel values of the significant pixels.

17. An image coding apparatus for coding an input signal comprising an image signal being an array of pixels having pixel values, and a significant signal showing whether the image signal is significant or not, said apparatus comprising:

temporally close image applicable prediction image generating means for generating a prediction image using an image of the image signal to be the target of coding and an image signal of an image displayed close in time to the target image;

subtraction means for producing a difference between the input image and the prediction image, and outputting a differential signal;

coding means for coding the differential signal and outputting a coded signal;

decoding means for decoding the coded signal and outputting a decoded signal;

addition means for adding the decoded signal and the prediction image to generate a locally reproduced image; and storage means for temporarily storing the locally reproduced image for use in the prediction image generating means, wherein the temporally close image applicable prediction image generating means generates the prediction image by performing:

a target area dividing process in which an area of the input image signal to be the target of coding is specified as a target area according to the significant signal, and at least one small target area is divided from the target area;

a small prediction area obtaining process in which small prediction areas corresponding to the target small area and at least one small area adjacent to the target small area are obtained using an image signal of an image displayed temporally before or after the image to be the target of coding;

a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

18. The image coding apparatus of claim 17 further comprising:

area dividing means for dividing a rectangle area including significant pixels from the differential signal output from the subtraction means using the significant signal, and outputting the divided rectangle area as a significant area; and pixel generating means for generating a padding pixel value using a prescribed function on the basis of pixel values of significant pixels in the significant area, replacing pixel values of insignificant pixels in the significant area with the padding pixel value, and outputting a padded signal;

wherein said coding means codes the padded signal.

19. An image coding apparatus for coding an input signal comprising an image signal being an array of pixels having pixel values, and a significant signal showing whether the image signal is significant or not, said apparatus comprising:

temporally close image applicable prediction image generating means for generating a prediction image using an image of the image signal to be the target of coding and an image signal of an image displayed close in time to the target image;

subtraction means for producing a difference between the input image and the prediction image, and outputting a differential signal;

coding means for coding the differential signal and outputting a coded signal;

decoding means for decoding the coded signal and outputting a decoded signal;

addition means for adding the decoded signal and the prediction image to generate a locally reproduced image; and storage means for temporarily storing the locally reproduced image for use in the prediction image generating means, wherein the temporally close image applicable prediction image generating means performs:

a first prediction process in which a first prediction signal is generated using an image signal of an image displayed temporally before an image of an image signal being the target of coding, and the significant signal; and a second prediction process in which a second prediction signal is generated using an image signal of an image displayed temporally after the image of the image signal being the target of coding, and the significant signal.

20. The image coding apparatus of claim 19 wherein the temporally close image applicable prediction image generating means generates the prediction image by performing:

a first padding process in which at least one small area is divided from the first prediction signal; a first prediction padding pixel value is obtained for each first small prediction area that is obtained by the division, on the basis of pixel values of significant pixels in the small area, using a first function; pixel values of insignificant pixels in the small area are replaced with the first prediction padding pixel value to generate a first padded small prediction area;

a second padding process in which at least one small area is divided from the second prediction signal; a second prediction padding pixel value is obtained for each second small prediction area obtained by the division, on the basis of pixel values of significant pixels in the small area, using a second function; pixel values of insignificant pixels in the small area are replaced with the second prediction padding pixel value to generate a second padded small prediction area; and an averaging process in which corresponding first and second padded small prediction areas are subjected to a weighted averaging process using a third function to obtain an optimum prediction image.

21. The image coding apparatus of claim 20 wherein a weighted average of significant pixels is obtained, and the pixel values of the insignificant pixels are replaced with the weighted average padding pixel value so obtained.

22. The image coding apparatus of claim 19 wherein the temporally close image applicable prediction image generating means compares, pixel by pixel, the first prediction signal with the second prediction signal and, when both of the compared pixels are significant, the means employs a weighted average of the pixel values of these pixels and, when either of the compared pixels is significant, the means employs the pixel value of the significant pixel, thereby to generate the optimum prediction image, whereby the prediction image is generated.

23. An image coding apparatus for coding an input signal comprising an image signal being an array of pixels having pixel values, and a significant signal showing whether the image signal is significant or not, said apparatus comprising:

temporally close image applicable prediction image generating means for generating a prediction image using an image of the image signal to be the target of coding and an image signal of an image displayed close in time to the target image;

subtraction means for producing a difference between the input image and the prediction image, and outputting a differential signal;

coding means for coding the differential signal and outputting a coded signal;

decoding means for decoding the coded signal and outputting a decoded signal;

addition means for adding the decoded signal and the prediction image to generate a locally reproduced image;

storage means for temporarily storing the locally reproduced image for use in the prediction image generating means; and shape adaptive orthogonal transform means for orthogonally transforming only pixel values of significant pixels in the differential signal, and outputting a shape adaptive orthogonally transformed signal;

wherein the coding means codes the shape adaptive orthogonally transformed signal.

24. The image coding apparatus of claim 19 further comprising:

shape adaptive orthogonal transform means for orthogonally transforming only pixel values of significant pixels in the differential signal, and outputting a shape adaptive orthogonally transformed signal;

wherein the coding means codes the shape adaptive orthogonally transformed signal.

25. An image coding apparatus for coding an input signal comprising an image signal being an array of pixels having pixel values and a significant signal showing whether the image signal is significant or not, said apparatus comprising:

motion predicting means for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal;

prediction image generating means for performing motion compensation using the locally reproduced image and the motion prediction signal, and outputting a prediction image;

prediction image pixel generating means for dividing at least one small prediction area from an area used for coding, generating a prediction image padding pixel value for each small prediction area, using a prescribed function, on the basis of pixel values of the significant pixels in the small prediction area, replacing pixel values of insignificant pixels in the small prediction area with the prediction image padding pixel value, and outputting a padded small prediction area;

subtraction means for subtracting the corresponding padded small prediction area from each target small area, and outputting a differential signal;

shape adaptive orthogonal transform means for orthogonally transforming only the pixel values of the significant pixels in the differential signal, and outputting a shape adaptive orthogonally transformed signal;

quantization means for quantizing the shape adaptive orthogonally transformed signal and outputting a quantized signal;

variable-length coding means for coding the quantized signal and outputting a variable-length coded signal;

inverse quantization means for inversely quantizing the coded signal and outputting an inversely quantized signal;

inverse orthogonal transform means for inversely and orthogonally transforming the inversely quantized signal and outputting an inversely transformed signal;

addition means for adding the inversely transformed signal and the padded small prediction area and outputting a locally reproduced image; and storage means for temporarily storing the locally reproduced image for use in the prediction image generating means.

26. An image coding apparatus for coding an input signal comprising an image signal being an array of pixels having pixel values, and a significant signal showing whether the image signal is significant or not, said apparatus comprising:

motion predicting means for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal;

prediction image generating means for performing motion compensation using the locally reproduced image and the motion prediction signal, and outputting a prediction image;

prediction image pixel generating means for dividing at least one small prediction area from an area used for coding, generating a prediction image padding pixel value for each small prediction area, using a prescribed function, on the basis of pixel values of the significant pixels in the small prediction area, replacing pixel values of insignificant pixels in the small prediction area with the prediction image padding pixel value, and outputting a padded small prediction area;

subtraction means for subtracting the corresponding padded small prediction area from each target small area, and outputting a differential signal;

coding means for coding the differential signal and outputting a coded signal;

decoding means for decoding the coded signal and outputting a decoded signal;

addition means for adding the decoded signal and the prediction image to generate a locally reproduced image;

storage means for temporarily storing the locally reproduced image for use in the prediction image generating means; and coding and outputting means for outputting the coded signal, and coding the prediction image padding pixel value for each small prediction area when insignificant pixels exist in the small prediction area and outputting the coded pixel value as additional information.

27. An image coding apparatus for coding an input signal comprising an image signal being an array of pixels having pixel values, and a significant signal showing whether the image signal is significant or not, said apparatus comprising:

prediction image generating means for specifying, as a target area, an area of the input image signal to be the target of coding, on the basis of the input significant signal, and generating a prediction image for the target area, using pixel values of significant pixels in a locally reproduced image which is described later;

subtraction means for dividing the prediction image into a plurality of small prediction areas, dividing the target area into a plurality of small target areas, subtracting each small prediction area from corresponding small target area, and outputting a differential signal;

area dividing means for dividing a rectangle area including significant pixels from the differential signal output from the subtraction means using the significant signal, and outputting the rectangle area as a significant area;

pixel generating means for generating a padding pixel value using a prescribed function on the basis of pixel values of the significant pixels in the significant area, replacing pixel values of insignificant pixels in the significant area with the padding pixel value, and outputting a padded signal;

coding means for coding the padded signal and outputting a coded signal;

decoding means for decoding the coded signal and outputting a decoded signal;

addition means for adding the decoded signal and the prediction image to generate a locally reproduced image; and storage means for temporarily storing the locally reproduced image for use in the prediction image generating means.

28. The image coding apparatus of claim 27 wherein the prediction image generating means uses the pixel values of the significant pixels in the locally reproduced image, according to the significant signal.

29. An image decoding apparatus for decoding a coded signal including an image coded signal which is obtained by coding an image, comprising:

decoding means for decoding the coded signal input to the apparatus, and outputting a decoded signal, the input signal being a coded signal output from an image coding apparatus according to claim 1;

prediction signal generating means for generating a prediction signal on the basis of a reference signal described later;

addition means for adding the decoded signal and the prediction signal, and outputting a decoded image signal; and storage means for temporarily storing the decoded image signal as a reference signal for use in the prediction signal generating means.

30. An image decoding apparatus for decoding a coded signal including an image coded signal which is obtained by coding an image, comprising:

decoding means for decoding the coded signal input to the apparatus, and outputting a decoded signal, the input signal being a coded signal output from an image coding apparatus according to claim 23;

prediction signal generating means for generating a prediction signal on the basis of a reference signal described later;

prediction image pixel generating means for generating a padding pixel value using a prescribed function on the basis of pixel values of significant pixels in the prediction signal, replacing pixel values of insignificant pixels in the prediction signal with the padding pixel value, and outputting a padded prediction signal;

addition means for adding the decoded signal and the padded prediction signal, and outputting a decoded image signal; and storage means for temporarily storing the decoded image signal as a reference signal for use in the prediction signal generating means.

31. An image decoding apparatus for decoding a coded signal including an image coded signal which is obtained by coding an image, comprising:

decoding means for decoding the coded signal input to the apparatus, and outputting a decoded signal;

temporally close image applicable prediction image generating means for generating a prediction image using an image signal of an image which is displayed close in time to an image of a target image signal;

addition means for adding the decoded signal and the prediction signal, and outputting a decoded image signal; and storage means for temporarily storing the decoded image signal as a reference signal for use in the temporally close image applicable prediction signal generating means, wherein the temporally close image applicable prediction image generating means generates the prediction image by performing:

a target area dividing process in which an area of the input image signal to be the target of coding is specified as a target area according to the input significant signal, and at least one small target area is divided from the target area;

a small prediction area obtaining process in which small prediction areas corresponding to the target small area and at least one small area adjacent to the target small area are obtained using an image signal of an image displayed temporally before or after the image to be the target of coding;

a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

32. An image decoding apparatus for decoding a coded signal including an image coded signal which is obtained by coding an image, comprising:

decoding means for decoding the coded signal input to the apparatus, and outputting a decoded signal, the input signal being a coded signal output from an image coding apparatus according to claim 17;

temporally close image applicable prediction image generating means for generating a prediction image using an image signal of an image which is displayed close in time to an image of a target image signal, said temporally close image applicable prediction generating means generating the prediction image by performing:

a target area dividing process in which an area of the input image signal to be the target of coding is specified as a target area according to the input significant signal, and at least one small target area is divided from the target area;

a small prediction area obtaining process in which small prediction areas corresponding to the target small area and at least one small area adjacent to the target small area are obtained using an image signal of an image displayed temporally before or after the image to be the target of coding;

a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area;

addition means for adding the decoded signal and the prediction signal, and outputting a decoded image signal; and storage means for temporarily storing the decoded image signal as a reference signal for use in the temporally close image applicable prediction signal generating means.

33. An image decoding apparatus for decoding a coded signal including an image coded signal which is obtained by coding an image, comprising:

decoding means for decoding the coded signal input to the apparatus, and outputting a decoded signal;

temporally close image applicable prediction image generating means for generating a prediction image using an image signal of an image which is displayed close in time to an image of a target image signal;

addition means for adding the decoded signal and the prediction signal, and outputting a decoded image signal; and storage means for temporarily storing the decoded image signal as a reference signal for use in the temporally close image applicable prediction signal generating means, wherein the temporally close image applicable prediction image generating means generates a padding pixel value of the prediction image by performing:

a target area dividing process in which an area of the input image signal to be the target of coding is specified as a target area according to the input significant signal, and at least one small target area is divided from the target area;

a small prediction area obtaining process in which small prediction areas corresponding to the target small area and at least one small area adjacent to the target small area are obtained using an image signal of an image displayed temporally before or after the image to be the target of coding;

a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

34. An image decoding apparatus for decoding a coded signal including an image coded signal which is obtained by coding an image, comprising:

decoding means for decoding the coded signal input to the apparatus, and outputting a decoded signal, the input signal being a coded signal output from an image coding apparatus according to claim 17;

temporally close image applicable prediction image generating means for generating a prediction image using an image signal of an image which is displayed close in time to an image of a target image signal, the temporally close image applicable prediction image generating means generating a padding pixel value of the prediction image by performing:

a target area dividing process in which an area of the input image signal to be the target of coding is specified as a target area according to the input significant signal, and at least one small target area is divided from the target area;

a small prediction area obtaining process in which small prediction areas corresponding to the target small area and at least one small area adjacent to the target small area are obtained using an image signal of an image displayed temporally before or after the image to be the target of coding;

a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area;

addition means for adding the decoded signal and the prediction signal, and outputting a decoded image signal; and storage means for temporarily storing the decoded image signal as a reference signal for use in the temporally close image applicable prediction signal generating means.

35. The image decoding apparatus of claim 33 wherein the pixel generating means employs a function that provides the average of the pixel values of the significant pixels.

36. An image decoding apparatus for decoding a coded signal including an image coded signal which is obtained by coding an image, comprising:

decoding means for decoding the coded signal input to the apparatus, and outputting a decoded signal;

temporally close image applicable prediction image generating means for generating a prediction image using an image signal of an image which is displayed close in time to an image of a target image signal;

addition means for adding the decoded signal and the prediction signal, and outputting a decoded image signal; and storage means for temporarily storing the decoded image signal as a reference signal for use in the temporally close image applicable prediction signal generating means, wherein the temporally close image applicable prediction image generating means performs:

a first prediction process for generating a first prediction signal using an image signal of an image displayed temporally before an image of an image signal being the target, and a significant signal; and a second prediction process for generating a second prediction signal using an image signal of an image displayed temporally after the image of the image signal being the target, and the significant signal.

37. The image decoding apparatus of claim 36 wherein the temporally close image applicable prediction image generating means generates the prediction image by performing:
 a first padding process in which at least one small area is divided from the first prediction signal; a first prediction padding pixel value is obtained for each first small prediction area that is obtained by the division, on the basis of pixel values of significant pixels in the small area, using a first function; pixel values of insignificant pixels in the small area are replaced with the first prediction padding pixel value to generate a first padded small prediction area;
 a second padding process in which at least one small area is divided from the second prediction signal; a second prediction padding pixel value is obtained for each second small prediction area obtained by the division, on the basis of pixel values of significant pixels in the small area, using a second function; pixel values of insignificant pixels in the small area are replaced with the second prediction padding pixel value to generate a second padded small prediction area; and
 an averaging process in which corresponding first and second padded small prediction areas are subjected to a weighted averaging process using a third function to obtain an optimum prediction image.

38. An image decoding apparatus for decoding a coded signal including an image coded signal which is obtained by coding an image, comprising:
 decoding means for decoding the coded signal input to the apparatus, and outputting a decoded signal;
 temporally close image applicable prediction image generating means for generating a prediction image using an image signal of an image which is displayed close in time to an image of a target image signal;
 addition means for adding the decoded signal and the prediction signal, and outputting a decoded image signal; and
 storage means for temporarily storing the decoded image signal as a reference signal for use in the temporally close image applicable prediction signal generating means,
 wherein the decoding means includes a shape adaptive inverse orthogonal transform means performing inverse orthogonal transform to coding components obtained by orthogonal transform of only significant pixels in the input signal.

39. The image decoding apparatus of claim 36 wherein the decoding means includes a shape adaptive inverse orthogonal transform means performing inverse orthogonal transform to coding components obtained by orthogonal transform of only significant pixels in the input signal.

40. An image decoding apparatus for decoding a coded signal including an image coded signal which is obtained by coding an image, comprising:
 decoding means for decoding the coded signal input to the apparatus, and outputting a decoded signal, the input signal being a coded signal output from an image coding apparatus according to claim 25;
 prediction signal generating means for generating a prediction signal on the basis of a reference signal described later;
 addition means for adding the decoded signal and the prediction signal, and outputting a decoded image signal; and
 storage means for temporarily storing the decoded image signal as a reference signal for use in the prediction signal generating means.

41. An image coding method for coding an input signal comprising an image signal being an array of pixels having pixel values, and a significant signal showing whether the image signal is significant or not, said method comprising:
 prediction image generating step for specifying, as a target area, an area of the input image signal to be the target of coding, on the basis of the input significant signal, and generating a prediction image for the target area, using a locally reproduced image which is described later;
 subtraction step for dividing the prediction image into a plurality of small prediction areas, dividing the target area into a plurality of small target areas, subtracting each small prediction area from corresponding small target area, and outputting a differential signal;
 first area dividing step for dividing a rectangle area including significant pixels from the differential signal in a first direction using the significant signal, and outputting the rectangle area as a first significant area;
 pixel generating step for generating a padding pixel value using a prescribed first function on the basis of pixel values of the significant pixels in the first significant area, replacing pixel values of insignificant pixels in the significant area with the padding pixel value, and outputting a padded signal;
 first coding step for coding the padded signal and outputting a first coded signal;
 second area dividing step for dividing an area from the first coded signal in a second direction different from the first direction, and outputting the area as a second significant area;
 padding component generating step for generating a padding coded component using a second function on the basis of coded components of the first coded signal when the coded components of the first coded signal do not exist in the second significant area, replacing coded components which are not the coded components of the first coded signal in the second significant area, with the padding coded component, and outputting a padded coded signal;
 second coding step for coding the padded coded signal and outputting a second coded signal;
 decoding step for decoding the second coded signal and outputting a decoded signal;
 addition step for adding the decoded signal and the prediction image to generate a locally reproduced image; and
 storage step for temporality storing the locally reproduced image for use in the prediction image generating step.

42. The image coding method of claim 41 wherein the first area dividing step and the second area dividing step perform division so that the significant area becomes a one-dimensional area including pixels of the n-th power of 2 ($2^n$) in number.

43. The image coding method of claim 42 further comprising division selecting step for selecting an area division method according to the size of the significant area in the signal being the target of division.

44. An image coding method for coding an input signal comprising an image signal being an array of pixels having pixel values, and a significant signal showing whether the image signal is significant or not, said method comprising:

prediction image generating step for specifying, as a target area, an area of the input image signal to be the target of coding, on the basis of the input significant signal, and generating a prediction image for the target area, using a locally reproduced image which is described later;

subtraction step for dividing the prediction image into a plurality of small prediction areas, dividing the target area into a plurality of small target areas, subtracting each small prediction area from corresponding small target area, and outputting a differential signal;

area dividing step for dividing a rectangle area including significant pixels from the differential signal using the significant signal, and outputting the rectangle area as a significant area;

pixel generating step for performing first padding and second padding, said first padding comprising generating a first padding pixel value using a first function on the basis of pixel values of significant pixels in the significant area, replacing pixel values of insignificant pixels in the significant area with the first padding pixel value, and outputting a first padded signal, and the second padding comprising generating a second padding pixel value using a second function, and using, as boundary pixels, the replaced pixels abutting on the significant pixels in the significant area, on the basis of pixel values of pixels in the vicinity of the boundary pixels, replacing the pixel values of the boundary pixels with the second padding pixel value, and outputting a second padded signal, said second padded signal being output as a padded signal;

coding step for coding the padded signal and outputting a coded signal;

decoding step for decoding the coded signal and outputting a decoded signal;

addition step for adding the decoded signal and the prediction image to generate a locally reproduced image; and storage step for temporality storing the locally reproduced image for use in the prediction image generating step.

45. The image coding method of claim 44 wherein the pixel generating step generates the second padding pixel value on the basis of pixel values of significant pixels adjacent to the boundary pixels.

46. An image coding method for coding an input signal comprising an image signal being an array of pixels having pixel values, and a significant signal showing whether the image signal is significant or not, said method comprising:

prediction image generating step for specifying, as a target area, an area of the input image signal to be the target of coding, on the basis of the input significant signal, and generating a prediction image for the target area, using a locally reproduced image which is described later;

subtraction step for dividing the prediction image into a plurality of small prediction areas, dividing the target area into a plurality of small target areas, subtracting each small prediction area from corresponding small target area, and outputting a differential signal;

pixel generating step for generating a padding pixel value using a prescribed function on the basis of pixel values of the significant pixels in the signal output from the subtraction step, replacing pixel values of insignificant pixels in the significant area with the padding pixel value, and outputting a padded signal;

shape adaptive orthogonal transform step for orthogonally transforming only the pixel values of the significant pixels in the padded signal, and outputting a shape adaptive orthogonally transformed signal;

coding step for coding the shape adaptive orthogonally transformed signal and outputting a shape adaptive coded signal;

decoding step for decoding the shape adaptive coded signal and outputting a shape adaptive decoded signal;

inverse orthogonal transform step for inversely and orthogonally transforming the decoded signal and outputting a shape adaptive inversely and orthogonally transformed signal;

addition step for adding the shape adaptive inversely and orthogonally transformed signal and the prediction image to generate a locally reproduced image; and storage step for temporarily storing the locally reproduced image for use in the prediction image generating step.

47. An image coding method for coding an input signal comprising an image signal being an array of pixels having pixel values, and a significant signal showing whether the image signal is significant or not, said method comprising:

prediction image generating step for specifying, as a target area, an area of the input image signal to be the target of coding, on the basis of the input significant signal, and generating a prediction image for the target area, using a locally reproduced image which is described later;

subtraction step for dividing the prediction image into a plurality of small prediction areas, dividing the target area into a plurality of small target areas, subtracting each small prediction area from corresponding small target area, and outputting a differential signal;

area dividing step for dividing a rectangle area including significant pixels from the differential signal output from the subtraction step using the significant signal, and outputting the rectangle area as a significant area;

pixel generating step for generating a padding pixel value using a prescribed function on the basis of pixel values of the significant pixels in the significant area, replacing pixel values of insignificant pixels in the significant area with the padding pixel value, and outputting a padded signal;

shape adaptive orthogonal transform step for orthogonally transforming only the pixel values of the significant pixels in the padded signal, and outputting a shape adaptive orthogonally transformed signal;

coding step for coding the shape adaptive orthogonally transformed signal and outputting a shape adaptive coded signal;

decoding step for decoding the shape adaptive coded signal and outputting a shape adaptive decoded signal;

inverse orthogonal transform step for inversely and orthogonally transforming the decoded signal and outputting a shape adaptive inversely and orthogonally transformed signal;

addition step for adding the shape adaptive inversely and orthogonally transformed signal and the prediction image to generate a locally reproduced image; and storage step for temporarily storing the locally reproduced image for use in the prediction image generating step.

48. An image coding method for coding an input signal comprising an image signal being an array of pixels having pixel values, and a significant signal showing whether the image signal is significant or not, said method comprising:

prediction image generating step for specifying, as a target area, an area of the input image signal to be the target of coding, on the basis of the input significant signal, and generating a prediction image for the target area, using a locally reproduced image which is described later;

subtraction step for dividing the prediction image into a plurality of small prediction areas, dividing the target area into a plurality of small target areas, subtracting each small prediction area from corresponding small target area, and outputting a differential signal;

pixel generating step for generating a padding pixel value using a prescribed function on the basis of pixel values of the significant pixels in the differential signal, replacing pixel values of insignificant pixels in the significant area with the padding pixel value, and outputting a padded signal;

first coding step for coding the padded signal and outputting a first coded signal;

second coding step for deciding the order of coding for coded components included in the first coded signal on the basis of the significant signal, and coding the first coded signal according to the decided order, and outputting a second coded signal;

addition step for adding the decoded signal and the prediction image to generate a locally reproduced image; and storage step for temporarily storing the locally reproduced image for use in the prediction image generating step.

49. The image coding method of claim 48 wherein the second coding step decides the order according to the positions of the significant pixels obtained on the basis of the significant signal.

50. The image coding method of claim 48 further comprising coding selecting step for selecting a coding method used by the second coding step, with reference to the significant pixels obtained on the basis of the significant signal.

51. An image coding method for coding an input signal comprising an image signal being an array of pixels having pixel values, and a significant signal showing whether the image signal is significant or not, said method comprising:

motion predicting step for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal;

prediction image generating step for performing motion compensation using the locally reproduced image and the motion prediction signal, and outputting a prediction image;

subtraction step for dividing the prediction image into a plurality of small prediction areas, dividing the target area into a plurality of small target areas, subtracting each small prediction area from corresponding small target area, and outputting a differential signal;

coding step for coding the differential signal and outputting a coded signal;

decoding step for decoding the coded signal and outputting a decoded signal;

addition step for adding the decoded signal and the prediction image to generate a locally reproduced image; and storage step for temporarily storing the locally reproduced image for use in the prediction image generating step.

52. An image coding method for coding an input signal comprising an image signal being an array of pixels having pixel values, and a significant signal showing whether the image signal is significant or not, said method comprising:

pixel generating step for specifying, as a target area, an area of the input image signal to be the target of coding, on the basis of the input significant signal, dividing the target area into a plurality of small target areas, generating a padding pixel value using a prescribed function on the basis of pixel values of significant pixels in each target small area, replacing pixel values of insignificant pixels in the target small area with the padding pixel value, and outputting a padded target small area;

motion predicting step for performing motion prediction to the padded target small area using a locally reproduced image that is described later, and outputting a motion prediction signal;

prediction image generating step for performing motion compensation using the locally reproduced image and the motion prediction signal, and outputting a prediction image;

subtraction step for dividing the prediction image into a plurality of small prediction areas, subtracting each small prediction area from corresponding small target area, and outputting a differential signal;

coding step for coding the differential signal and outputting a coded signal;

decoding step for decoding the coded signal and outputting a decoded signal;

addition step for adding the decoded signal and the prediction image to generate a locally reproduced image; and storage step for temporarily storing the locally reproduced image for use in the prediction image generating step.

53. An image coding method for coding an input signal comprising an image signal being an array of pixels having pixel values, and a significant signal showing whether the image signal is significant or not, said method comprising:

temporally close image applicable prediction image generating step for generating a prediction image using an image of the image signal to be the target of coding and an image signal of an image displayed close in time to the target image;

subtraction step for producing a difference between the input image and the prediction image, and outputting a differential signal;

coding step for coding the differential signal and outputting a coded signal;

decoding step for decoding the coded signal and outputting a decoded signal;

addition step for adding the decoded signal and the prediction image to generate a locally reproduced image;

storage step for temporarily storing the locally reproduced image for use in the prediction image generating step;

area dividing step for dividing a rectangle area including significant pixels from the differential signal output from the subtraction step using the significant signal, and outputting the divided rectangle area as a significant area; and pixel generating step for generating a padding pixel value using a prescribed function on the basis of pixel values of significant pixels in the significant area, replacing pixel values of insignificant pixels in the significant area with the padding pixel value, and outputting a padded signal;

wherein said coding step codes the padded signal.

54. An image coding method for coding an input signal comprising an image signal being an array of pixels having pixel values, and a significant signal showing whether the image signal is significant or not, said method comprising:

temporally close image applicable prediction image generating step for generating a prediction image using an image of the image signal to be the target of coding and an image signal of an image displayed close in time to the target image;

subtraction step for producing a difference between the input image and the prediction image, and outputting a differential signal;

coding step for coding the differential signal and outputting a coded signal;

decoding step for decoding the coded signal and outputting a decoded signal;

addition step for adding the decoded signal and the prediction image to generate a locally reproduced image;

storage step for temporarily storing the locally reproduced image for use in the prediction image generating step shape adaptive orthogonal transform step for orthogonally transforming only pixel values of significant pixels in the differential signal, and outputting a shape adaptive orthogonally transformed signal;

wherein the coding step codes the shape adaptive orthogonally transformed signal.

55. An image coding method for coding an input signal comprising an image signal being an array of pixels having pixel values, and a significant signal showing whether the image signal is significant or not, said method comprising:

motion predicting step for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal;

prediction image generating step for performing motion compensation using the locally reproduced image and the motion prediction signal, and outputting a prediction image;

prediction image pixel generating step for dividing at least one small prediction area from an area used for coding, generating a prediction image padding pixel value for each small prediction area, using a prescribed function, on the basis of pixel values of the significant pixels in the small prediction area, replacing pixel values of insignificant pixels in the small prediction area with the prediction image padding pixel value, and outputting a padded small prediction area;

subtraction step for subtracting the corresponding padded small prediction area from each target small area, and outputting a differential signal;

shape adaptive orthogonal transform step for orthogonally transforming only the pixel values of the significant pixels in the differential signal, and outputting a shape adaptive orthogonally transformed signal;

quantization step for quantizing the shape adaptive orthogonally transformed signal and outputting a quantized signal;

variable-length coding step for coding the quantized signal and outputting a variable-length coded signal;

inverse quantization step for inversely quantizing the coded signal and outputting an inversely quantized signal;

inverse orthogonal transform step for inversely and orthogonally transforming the inversely quantized signal and outputting an inversely transformed signal;

addition step for adding the inversely transformed signal and the padded small prediction area and outputting a locally reproduced image; and storage step for temporarily storing the locally reproduced image for use in the prediction image generating step.

56. An image coding method for coding an input signal comprising an image signal being an array of pixels having pixel values, and a significant signal showing whether the image signal is significant or not, said method comprising:

motion predicting step for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal;

prediction image generating step for performing motion compensation using the locally reproduced image and the motion prediction signal, and outputting a prediction image;

prediction image pixel generating step for dividing at least one small prediction area from an area used for coding, generating a prediction image padding pixel value for each small prediction area, using a prescribed function, on the basis of pixel values of the significant pixels in the small prediction area, replacing pixel values of insignificant pixels in the small prediction area with the prediction image padding pixel value, and outputting a padded small prediction area;

subtraction step for subtracting the corresponding padded small prediction area from each target small area, and outputting a differential signal;

coding step for coding the differential signal and outputting a coded signal;

decoding step for decoding the coded signal and outputting a decoded signal;

addition step for adding the decoded signal and the prediction image to generate a locally reproduced image;

storage step for temporarily storing the locally reproduced image for use in the prediction image generating step; and coding and outputting step for outputting the coded signal, and coding the prediction image padding pixel value for each small prediction area when insignificant pixels exist in the small prediction area and outputting the coded pixel value as additional information.

57. An image coding method for coding an input signal comprising an image signal being an array of pixels having pixel values, and a significant signal showing whether the image signal is significant or not, said method comprising:

prediction image generating step for specifying, as a target area, an area of the input image signal to be the target of coding, on the basis of the input significant signal, and generating a prediction image for the target area, using pixel values of significant pixels in a locally reproduced image which is described later;

subtraction step for dividing the prediction image into a plurality of small prediction areas, dividing the target area into a plurality of small target areas, subtracting each small prediction area from corresponding small target area, and outputting a differential signal;

area dividing step for dividing a rectangle area including significant pixels from the differential signal output from the subtraction step using the significant signal, and outputting the rectangle area as a significant area;

pixel generating step for generating a padding pixel value using a prescribed function on the basis of pixel values of the significant pixels in the significant area, replacing pixel values of insignificant pixels in the significant area with the padding pixel value, and outputting a padded signal;

coding step for coding the padded signal and outputting a coded signal;

decoding step for decoding the coded signal and outputting a decoded signal;

addition step for adding the decoded signal and the prediction image to generate a locally reproduced image; and storage step for temporarily storing the locally reproduced image for use in the prediction image generating step.

58. An image decoding method for decoding a coded signal including an image coded signal which is obtained by coding an image, comprising:

decoding step for decoding the input coded signal, and outputting a decoded signal;

temporally close image applicable prediction image generating step for generating a prediction image using an image signal of an image which is displayed close in time to an image of a target image signal;

addition step for adding the decoded signal and the prediction signal, and outputting a decoded image signal; and storage step for temporarily storing the decoded image signal as a reference signal for use in the temporally close image applicable prediction signal generating step, wherein the temporally close image applicable prediction image generating step comprises:

a target area dividing process in which an area of the input image signal to be the target of coding is specified as a target area according to the input significant signal, and at least one small target area is divided from the target area;

a small prediction area obtaining process in which small prediction areas corresponding to the target small area and at least one small area adjacent to the target small area are obtained using an image signal of an image displayed temporally before or after the image to be the target of coding;

a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

59. An image decoding method for decoding a coded signal including an image coded signal which is obtained by coding an image, comprising:

decoding step for decoding the input coded signal, and outputting a decoded signal;

temporally close image applicable prediction image generating step for generating a prediction image using an image signal of an image which is displayed close in time to an image of a target image signal;

addition step for adding the decoded signal and the prediction signal, and outputting a decoded image signal; and storage step for temporarily storing the decoded image signal as a reference signal for use in the temporally close image applicable prediction signal generating step, wherein the temporally close image applicable prediction image generating step comprises:

a target area dividing process in which an area of the input image signal to be the target of coding is specified as a target area according to the input significant signal, and at least one small target area is divided from the target area;

a small prediction area obtaining process in which small prediction areas corresponding to the target small area and at least one small area adjacent to the target small area are obtained using an image signal of an image displayed temporally before or after the image to be the target of coding;

a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

60. An image decoding method for decoding a coded signal including an image coded signal which is obtained by coding an image, comprising:

decoding step for decoding the input coded signal, and outputting a decoded signal;

temporally close image applicable prediction image generating step for generating a prediction image using an image signal of an image which is displayed close in time to an image of a target image signal;

addition step for adding the decoded signal and the prediction signal, and outputting a decoded image signal; and storage step for temporarily storing the decoded image signal as a reference signal for use in the temporally close image applicable prediction signal generating step, wherein the decoding step includes a shape adaptive inverse orthogonal transform step of performing inverse orthogonal transform to coding components obtained by orthogonal transform of only significant pixels in the input signal.

61. An image coding program recording medium in which an image coding program is recorded, which program is for coding an input signal comprising an image signal being an array of pixels having pixel values and a significant signal showing whether the image signal is significant or not, said program comprising:

prediction image generating step for specifying, as a target area, an area of the input image signal to be the target of coding, on the basis of the input significant signal, and generating a prediction image for the target area, using a locally reproduced image which is described later;

subtraction step for dividing the prediction image into a plurality of small prediction areas, dividing the target area into a plurality of small target areas, subtracting each small prediction area from corresponding small target area, and outputting a differential signal;

first area dividing step for dividing a rectangle area including significant pixels from the differential signal in a first direction using the significant signal, and outputting the rectangle area as a first significant area;

pixel generating step for generating a padding pixel value using a prescribed first function on the basis of pixel values of the significant pixels in the first significant area, replacing pixel values of insignificant pixels in the significant area with the padding pixel value, and outputting a padded signal;

first coding step for coding the padded signal and outputting a first coded signal;

second area dividing step for dividing an area from the first coded signal in a second direction different from the first direction, and outputting the area as a second significant area;

padding component generating step for generating a padding coded component using a second function on the basis of coded components of the first coded signal when the coded components of the first coded signal do not exist in the second significant area, replacing coded components which are not the coded components of the first coded signal in the second significant area, with the padding coded component, and outputting a padded coded signal;

second coding step for coding the padded coded signal and outputting a second coded signal;

decoding step for decoding the second coded signal and outputting a decoded signal;

addition step for adding the decoded signal and the prediction image to generate a locally reproduced image; and storage step for temporality storing the locally reproduced image for use in the prediction image generating step.

62. The image coding program recording medium of claim 61 wherein the first area dividing step and the second area dividing step perform division so that the significant area becomes a one-dimensional area including pixels of the n-th power of 2 ($2^n$) in number.

63. An image coding program recording medium in which an image coding program is recorded, which program is for coding an input signal comprising an image signal being an array of pixels having pixel values and a significant signal showing whether the image signal is significant or not, said program comprising:

prediction image generating step for specifying, as a target area, an area of the input image signal to be the target of coding, on the basis of the input significant signal, and generating a prediction image for the target area, using a locally reproduced image which is described later;

subtraction step for dividing the prediction image into a plurality of small prediction areas, dividing the target area into a plurality of small target areas, subtracting each small prediction area from corresponding small target area, and outputting a differential signal;

area dividing step for dividing a rectangle area including significant pixels from the differential signal using the significant signal, and outputting the rectangle area as a significant area;

pixel generating step for performing first padding and second padding, said first padding comprising generating a first padding pixel value using a first function on the basis of pixel values of significant pixels in the significant area, replacing pixel values of insignificant pixels in the significant area with the first padding pixel value, and outputting a first padded signal, and the second padding comprising generating a second padding pixel value using a second function, and using, as boundary pixels, the replaced pixels abutting on the significant pixels in the significant area, on the basis of pixel values of pixels in the vicinity of the boundary pixels, replacing the pixel values of the boundary pixels with the second padding pixel value, and outputting a second padded signal, said second padded signal being output as a padded signal;

coding step for coding the padded signal and outputting a coded signal;

decoding step for decoding the coded signal and outputting a decoded signal;

addition step for adding the decoded signal and the prediction image to generate a locally reproduced image; and storage step for temporality storing the locally reproduced image for use in the prediction image generating step.

64. The image coding program recording medium of claim 63 wherein the pixel generating step generates the second padding pixel value on the basis of pixel values of significant pixels adjacent to the boundary pixels.

65. An image coding program recording medium in which an image coding program is recorded, which program is for coding an input signal comprising an image signal being an array of pixels having pixel values and a significant signal showing whether the image signal is significant or not, said program comprising:

prediction image generating step for specifying, as a target area, an area of the input image signal to be the target of coding, on the basis of the input significant signal, and generating a prediction image for the target area, using a locally reproduced image which is described later;

subtraction step for dividing the prediction image into a plurality of small prediction areas, dividing the target area into a plurality of small target areas, subtracting each small prediction area from corresponding small target area, and outputting a differential signal;

pixel generating step for generating a padding pixel value using a prescribed function on the basis of pixel values of the significant pixels in the signal output from the subtraction step, replacing pixel values of insignificant pixels in the significant area with the padding pixel value, and outputting a padded signal;

shape adaptive orthogonal transform step for orthogonally transforming only the pixel values of the significant pixels in the padded signal, and outputting a shape adaptive orthogonally transformed signal;

coding step for coding the shape adaptive orthogonally transformed signal and outputting a shape adaptive coded signal;

decoding step for decoding the shape adaptive coded signal and outputting a shape adaptive decoded signal;

inverse orthogonal transform step for inversely and orthogonally transforming the decoded signal and outputting a shape adaptive inversely and orthogonally transformed signal;

addition step for adding the shape adaptive inversely and orthogonally transformed signal and the prediction image to generate a locally reproduced image; and storage step for temporarily storing the locally reproduced image for use in the prediction image generating step.

66. An image coding program recording medium in which an image coding program is recorded, which program is for coding an input signal comprising an image signal being an array of pixels having pixel values and a significant signal showing whether the image signal is significant or not, said program comprising:

prediction image generating step for specifying, as a target area, an area of the input image signal to be the target of coding, on the basis of the input significant signal, and generating a prediction image for the target area, using a locally reproduced image which is described later;

subtraction step for dividing the prediction image into a plurality of small prediction areas, dividing the target area into a plurality of small target areas, subtracting each small prediction area from corresponding small target area, and outputting a differential signal;

area dividing step for dividing a rectangle area including significant pixels from the differential signal output from the subtraction step using the significant signal, and outputting the rectangle area as a significant area;

pixel generating step for generating a padding pixel value using a prescribed function on the basis of pixel values of the significant pixels in the significant area, replacing pixel values of insignificant pixels in the significant area with the padding pixel value, and outputting a padded signal;

shape adaptive orthogonal transform step for orthogonally transforming only the pixel values of the significant pixels in the padded signal, and outputting a shape adaptive orthogonally transformed signal;

coding step for coding the shape adaptive orthogonally transformed signal and outputting a shape adaptive coded signal;

decoding step for decoding the shape adaptive coded signal and outputting a shape adaptive decoded signal;

inverse orthogonal transform step for inversely and orthogonally transforming the decoded signal and outputting a shape adaptive inversely and orthogonally transformed signal;

addition step for adding the shape adaptive inversely and orthogonally transformed signal and the prediction image to generate a locally reproduced image; and storage step for temporarily storing the locally reproduced image for use in the prediction image generating step.

67. An image coding program recording medium in which an image coding program is recorded, which program is for coding an input signal comprising an image signal being an array of pixels having pixel values and a significant signal showing whether the image signal is significant or not, said program comprising:

prediction image generating step for specifying, as a target area, an area of the input image signal to be the target of coding, on the basis of the input significant signal, and generating a prediction image for the target area, using a locally reproduced image which is described later;

subtraction step for dividing the prediction image into a plurality of small prediction areas, dividing the target area into a plurality of small target areas, subtracting each small prediction area from corresponding small target area, and outputting a differential signal;

pixel generating step for generating a padding pixel value using a prescribed function on the basis of pixel values of the significant pixels in the differential signal, replacing pixel values of insignificant pixels in the significant area with the padding pixel value, and outputting a padded signal;

first coding step for coding the padded signal and outputting a first coded signal;

second coding step for deciding the order of coding for coded components included in the first coded signal on the basis of the significant signal, and coding the first coded signal according to the decided order, and outputting a second coded signal;

addition step for adding the decoded signal and the prediction image to generate a locally reproduced image; and storage step for temporarily storing the locally reproduced image for use in the prediction image generating step.

68. An image coding program recording medium in which an image coding program is recorded, which program is for coding an input signal comprising an image signal being an array of pixels having pixel values and a significant signal showing whether the image signal is significant or not, said program comprising:

motion predicting step for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal;

prediction image generating step for performing motion compensation using the locally reproduced image and the motion prediction signal, and outputting a prediction image;

subtraction step for dividing the prediction image into a plurality of small prediction areas, dividing the target area into a plurality of small target areas, subtracting each small prediction area from corresponding small target area, and outputting a differential signal;

coding step for coding the differential signal and outputting a coded signal;

decoding step for decoding the coded signal and outputting a decoded signal;

addition step for adding the decoded signal and the prediction image to generate a locally reproduced image; and storage step for temporarily storing the locally reproduced image for use in the prediction image generating step.

69. An image coding program recording medium in which an image coding program is recorded, which program is for coding an input signal comprising an image signal being an array of pixels having pixel values and a significant signal showing whether the image signal is significant or not, said program comprising:

pixel generating step for specifying, as a target area, an area of the input image signal to be the target of coding, on the basis of the input significant signal, dividing the target area into a plurality of small target areas, generating a padding pixel value using a prescribed function on the basis of pixel values of significant pixels in each target small area, replacing pixel values of insignificant pixels in the target small area with the padding pixel value, and outputting a padded target small area;

motion predicting step for performing motion prediction to the padded target small area using a locally reproduced image that is described later, and outputting a motion prediction signal;

prediction image generating step for performing motion compensation using the locally reproduced image and the motion prediction signal, and outputting a prediction image;

subtraction step for dividing the prediction image into a plurality of small prediction areas, subtracting each small prediction area from corresponding small target area, and outputting a differential signal;

coding step for coding the differential signal and outputting a coded signal;

decoding step for decoding the coded signal and outputting a decoded signal;

addition step for adding the decoded signal and the prediction image to generate a locally reproduced image; and storage step for temporarily storing the locally reproduced image for use in the prediction image generating step.

70. An image coding program recording medium in which an image coding program is recorded, which program is for coding an input signal comprising an image signal being an array of pixels having pixel values and a significant signal showing whether the image signal is significant or not, said program comprising:

temporally close image applicable prediction image generating step for generating a prediction image using an image of the image signal to be the target of coding and an image signal of an image displayed close in time to the target image;

subtraction step for producing a difference between the input image and the prediction image, and outputting a differential signal;

coding step for coding the differential signal and outputting a coded signal;

decoding step for decoding the coded signal and outputting a decoded signal;

addition step for adding the decoded signal and the prediction image to generate a locally reproduced image;

storage step for temporarily storing the locally reproduced image for use in the prediction image generating step; and said temporally close time applicable prediction image generating step comprising:

a target area dividing process in which an area of the input image signal to be the target of coding is specified as a target area according to the significant signal, and at least one small target area is divided from the target area;

a small prediction area obtaining process in which small prediction areas corresponding to the target small area and at least one small area adjacent to the target small area are obtained using an image signal of an image displayed temporally before or after the image to be the target of coding;

a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

71. An image coding program recording medium in which an image coding program is recorded, which program is for coding an input signal comprising an image signal being an array of pixels having pixel values and a significant signal showing whether the image signal is significant or not, said program comprising:

temporally close image applicable prediction image generating step for generating a prediction image using an image of the image signal to be the target of coding and an image signal of an image displayed close in time to the target image;

subtraction step for producing a difference between the input image and the prediction image, and outputting a differential signal;

coding step for coding the differential signal and outputting a coded signal;

decoding step for decoding the coded signal and outputting a decoded signal;

addition step for adding the decoded signal and the prediction image to generate a locally reproduced image;

storage step for temporarily storing the locally reproduced image for use in the prediction image generating step;

shape adaptive orthogonal transform step for orthogonally transforming only pixel values of significant pixels in the differential signal, and outputting a shape adaptive orthogonally transformed signal;

and the coding step codes the shape adaptive orthogonally transformed signal.

72. An image coding program recording medium in which an image coding program is recorded, which program is for coding an input signal comprising an image signal being an array of pixels having pixel values and a significant signal showing whether the image signal is significant or not, said program comprising:

motion predicting step for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal;

prediction image generating step for performing motion compensation using the locally reproduced image and the motion prediction signal, and outputting a prediction image;

prediction image pixel generating step for dividing at least one small prediction area from an area used for coding, generating a prediction image padding pixel value for each small prediction area, using a prescribed function, on the basis of pixel values of the significant pixels in the small prediction area, replacing pixel values of insignificant pixels in the small prediction area with the prediction image padding pixel value, and outputting a padded small prediction area;

subtraction step for subtracting the corresponding padded small prediction area from each target small area, and outputting a differential signal;

shape adaptive orthogonal transform step for orthogonally transforming only the pixel values of the significant pixels in the differential signal, and outputting a shape adaptive orthogonally transformed signal;

quantization step for quantizing the shape adaptive orthogonally transformed signal and outputting a quantized signal;

variable-length coding step for coding the quantized signal and outputting a variable-length coded signal;

inverse quantization step for inversely quantizing the coded signal and outputting an inversely quantized signal;

inverse orthogonal transform step for inversely and orthogonally transforming the inversely quantized signal and outputting an inversely transformed signal;

addition step for adding the inversely transformed signal and the padded small prediction area and outputting a locally reproduced image; and storage step for temporarily storing the locally reproduced image for use in the prediction image generating step.

73. An image coding program recording medium in which an image coding program is recorded, which program is for coding an input signal comprising an image signal being an array of pixels having pixel values and a significant signal showing whether the image signal is significant or not, said program comprising:

motion predicting step for specifying, as a target area, an area of the input image signal to be the target of coding, on the basis of the input significant signal, dividing the target area into a plurality of small target areas, performing motion prediction to the small target areas using a locally reproduced image that is described later, and outputting a motion prediction signal;

prediction image generating step for performing motion compensation using the locally reproduced image and the motion prediction signal, and outputting a prediction image;

prediction image pixel generating step for dividing at least one small prediction area from an area used for coding, generating a prediction image padding pixel value for each small prediction area, using a prescribed function, on the basis of pixel values of the significant pixels in the small prediction area, replacing pixel values of insignificant pixels in the small prediction area with the prediction image padding pixel value, and outputting a padded small prediction area;

subtraction step for subtracting the corresponding padded small prediction area from each target small area, and outputting a differential signal;

coding step for coding the differential signal and outputting a coded signal;

decoding step for decoding the coded signal and outputting a decoded signal;

addition step for adding the decoded signal and the prediction image to generate a locally reproduced image; storage step for temporarily storing the locally reproduced image for use in the prediction image generating step; and coding and outputting step for outputting the coded signal, and coding the prediction image padding pixel value for each small prediction area when insignificant pixels exist in the small prediction area and outputting the coded pixel value as additional information.

74. An image coding program recording medium in which an image coding program is recorded, which program is for coding an input signal comprising an image signal being an array of pixels having pixel values and a significant signal showing whether the image signal is significant or not, said program comprising:

prediction image generating step for specifying, as a target area, an area of the input image signal to be the target of coding, on the basis of the input significant signal, and generating a prediction image for the target area, using pixel values of significant pixels in a locally reproduced image which is described later;

subtraction step for dividing the prediction image into a plurality of small prediction areas, dividing the target area into a plurality of small target areas, subtracting each small prediction area from corresponding small target area, and outputting a differential signal;

area dividing step for dividing a rectangle area including significant pixels from the differential signal output from the subtraction step using the significant signal, and outputting the rectangle area as a significant area;

pixel generating step for generating a padding pixel value using a prescribed function on the basis of pixel values of the significant pixels in the significant area, replacing pixel values of insignificant pixels in the significant area with the padding pixel value, and outputting a padded signal;

coding step for coding the padded signal and outputting a coded signal;

decoding step for decoding the coded signal and outputting a decoded signal;

addition step for adding the decoded signal and the prediction image to generate a locally reproduced image; and storage step for temporarily storing the locally reproduced image for use in the prediction image generating step.

75. An image decoding program recording medium in which an image decoding program is recorded, which program is for decoding a coded signal including an image coded signal which is obtained by coding an image, said program comprising:

decoding step for decoding the input coded signal, and outputting a decoded signal;

temporally close image applicable prediction image generating step for generating a prediction image using an image signal of an image which is displayed close in time to an image of a target image signal;

addition step for adding the decoded signal and the prediction signal, and outputting a decoded image signal; and storage step for temporarily storing the decoded image signal as a reference signal for use in the temporally close image applicable prediction signal generating step, wherein the temporally close image applicable prediction image generating step comprises:

a target area dividing process in which an area of the input image signal to be the target of coding is specified as a target area according to the input significant signal, and at least one small target area is divided from the target area;

a small prediction area obtaining process in which small prediction areas corresponding to the target small area and at least one small area adjacent to the target small area are obtained using an image signal of an image displayed temporally before or after the image to be the target of coding;

a small prediction area selecting process in which a small prediction area having a smallest error is selected from the obtained small prediction areas; and a small prediction area calculating process in which the small prediction area is calculated using a prescribed function, on the basis of pixel values of significant pixels in the selected small prediction area.

76. An image decoding program recording medium in which an image decoding program is recorded, which program is for decoding a coded signal including an image coded signal which is obtained by coding an image, said program comprising:

decoding step for decoding the input coded signal, and outputting a decoded signal;

temporally close image applicable prediction image generating step for generating a prediction image using an image signal of an image which is displayed close in time to an image of a target image signal;

addition step for adding the decoded signal and the prediction signal, and outputting a decoded image signal; and storage step for temporarily storing the decoded image signal as a reference signal for use in the temporally close image applicable prediction signal generating step, wherein the temporally close image applicable prediction image generating step comprises:
- a target area dividing process in which an area of the input image signal to be the target of coding is specified as a target area according to the input significant signal, and at least one small target area is divided from the target area;
- a small prediction area obtaining process in which small prediction areas corresponding to the target small area and at least one small area adjacent to the target small area are obtained using an image signal of an image displayed temporally before or after the image to be the target of coding;
- a small prediction area selecting process in which a small prediction area having a smallest error is selected from the obtained small prediction areas; and
- a small prediction area calculating process in which the small prediction area is calculated using a prescribed function, on the basis of pixel values of significant pixels in the selected small prediction area.

77. An image decoding program recording medium in which an image decoding program is recorded, which program is for decoding a coded signal including an image coded signal which is obtained by coding an image, said program comprising:

decoding step for decoding the input coded signal, and outputting a decoded signal;

temporally close image applicable prediction image generating step for generating a prediction image using an image signal of an image which is displayed close in time to an image of a target image signal;

addition step for adding the decoded signal and the prediction signal, and outputting a decoded image signal; and storage step for temporarily storing the decoded image signal as a reference signal for use in the temporally close image applicable prediction signal generating step, wherein the decoding step includes a shape adaptive inverse orthogonal transform step of performing inverse orthogonal transform to coding components obtained by orthogonal transform of only significant pixels in the input signal.

* * * * *